Patented July 11, 1972 3,676,877

INVENTOR.
TETSUO KOBAYASHI
BY Eugene E. Geoffrey Jr.
ATTORNEY

Patented July 11, 1972 3,676,878

27 Sheets-Sheet 1

100 MONITORING SYSTEM

INVENTOR:
KENNETH C. LINDER
By Mason, Kolehmainen, Rathburn & Wyss
Attys.

200 HIGH FREQUENCY CLOCK

INVENTOR:
KENNETH C. LINDER
By Mason, Kolehmainen, Rathburn & Wyss
Attys.

FIG. 2G HIGH FREQUENCY CLOCK OUTPUT TIMING DIAGRAM
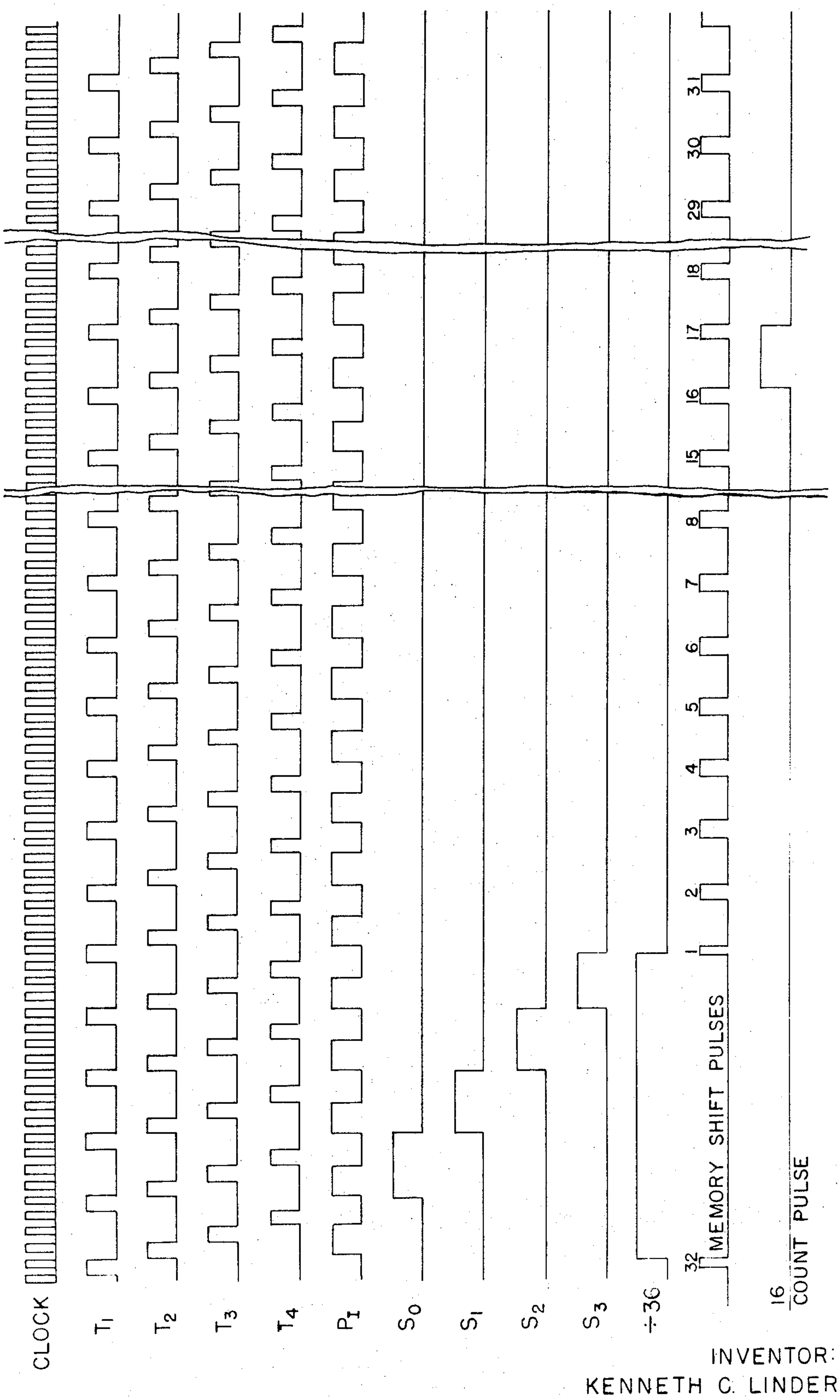
INVENTOR:
KENNETH C. LINDER
By
Attys.

INVENTOR:
KENNETH C. LINDER

By Mason, Kolehmainen, Rathburn & Wyss Attys.

400 ANNUNCIATOR CIRCUIT AND LOGIC

TYPICAL SET OF 10 POINT CARDS

TYPICAL POINT CARD

INVENTOR:
KENNETH C. LINDER
By Mason, Kolehmainen, Rathburn & Wyss
Attys.

FIG. 4D TYPICAL ANNUNCIATOR CIRCUIT
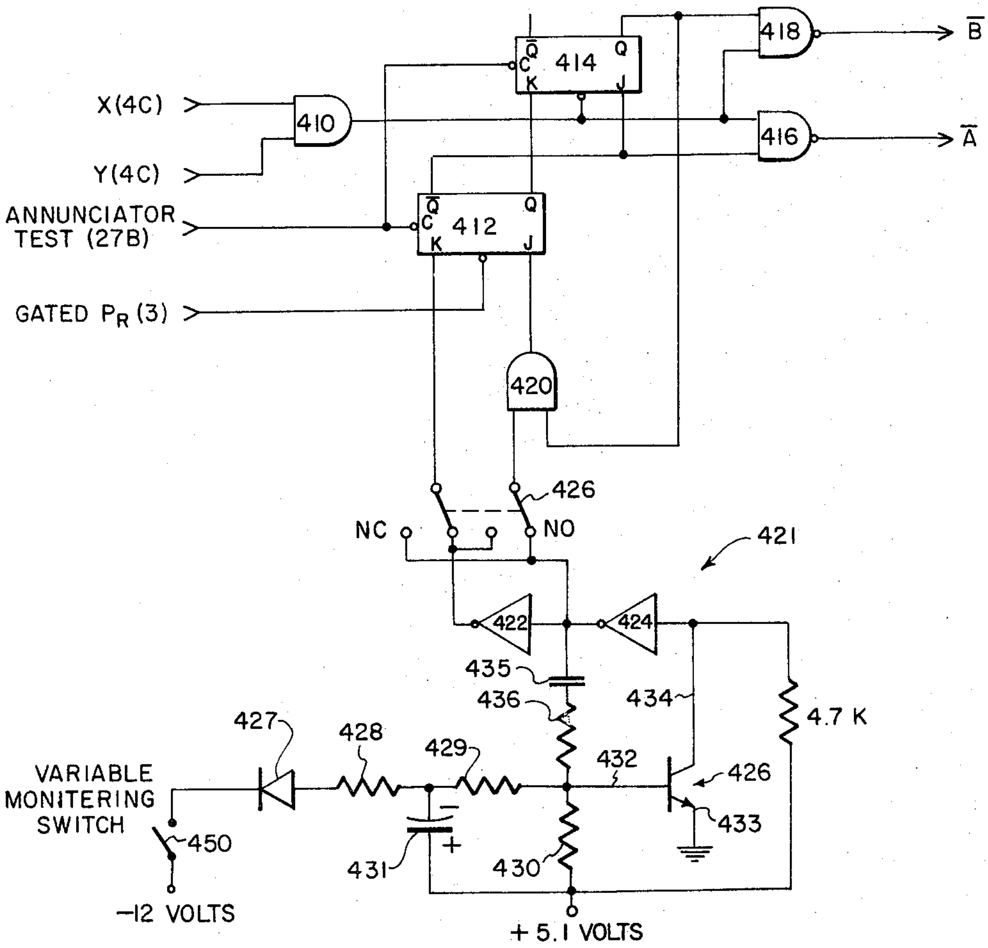
FIG. 4E
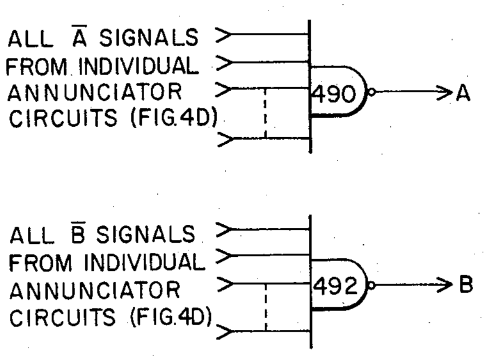
INVENTOR:
KENNETH C. LINDER
By Mason, Kolehmainen, Rathburn & Wyss
Attys.

500 EVENT LOGIC AND EVENT FLIP FLOP

600 ASSEMBLY SHIFT REGISTER CONTROL LOGIC

INVENTOR:
KENNETH C. LINDER
By Mason, Kolehmainen, Rathburn & Wyss
Attys.

INVENTOR:
KENNETH C. LINDER
By Mason, Kolehmainen, Rathburn & Wyss
Attys.

INVENTOR:
KENNETH C. LINDER
By Mason, Kolehmainen, Rathburn & Wyss
Attys.

INVENTOR:
KENNETH C. LINDER
By Mason, Kolehmainen, Rathburn & Wyss
Attys.

1100 MARKER BIT FLIP FLOP & LOGIC

1200 MEMORY FULL FLIP FLOP & LOGIC

INVENTOR:
KENNETH C. LINDER
By Mason, Kolehmainen, Rathburn & Wyss
Attys.

INVENTOR
KENNETH C. LINDER
By Mason, Kolehmainen, Rathburn & Wyss
Attorneys

Patented July 11, 1972 3,676,878

27 Sheets-Sheet 13

INVENTOR
KENNETH C. LINDER
By Mason, Kolehmainen, Rathburn & Wyss
Attorneys

1400 EXPANDABLE MEMORY FIG. 14

Patented July 11, 1972

3,676,878

27 Sheets-Sheet 14

FIG. 15 1500 TELEPRINTER OUTPUT LOGIC

INVENTOR
KENNETH C. LINDER
By Mason, Kolehmainen, Rathburn & Wyss
Attorneys

INVENTOR
KENNETH C. LINDER
By Mason, Kolehmainen
Rathburn & Wyss
Attorneys

1700 BIT AND CHARACTER COUNTERS

INVENTOR
KENNETH C. LINDER
By Mason, Kolehmainen Rathburn & Wyss
Attorneys

1800 TELEPRINTER PRINTOUT FORMAT CONTROL

INVENTOR
KENNETH C. LINDER
By Mason, Kolehmainen, Rathburn & Wyss
Attorneys

1900 COUNTER RESET CIRCUIT

2000 UPDATE PULSE GENERATOR

INVENTOR
KENNETH C. LINDER
By Mason, Kolehmainen, Rathburn & Wyss
Attorneys

2100 OVERLOAD BIT DETECTOR

2200 DATA SHIFT COMMAND GENERATOR

2300 CODE NUMBER TRANSLATOR

INVENTOR
KENNETH C. LINDER
By Mason, Kolehmainen, Rathburn & Wyss
Attorneys

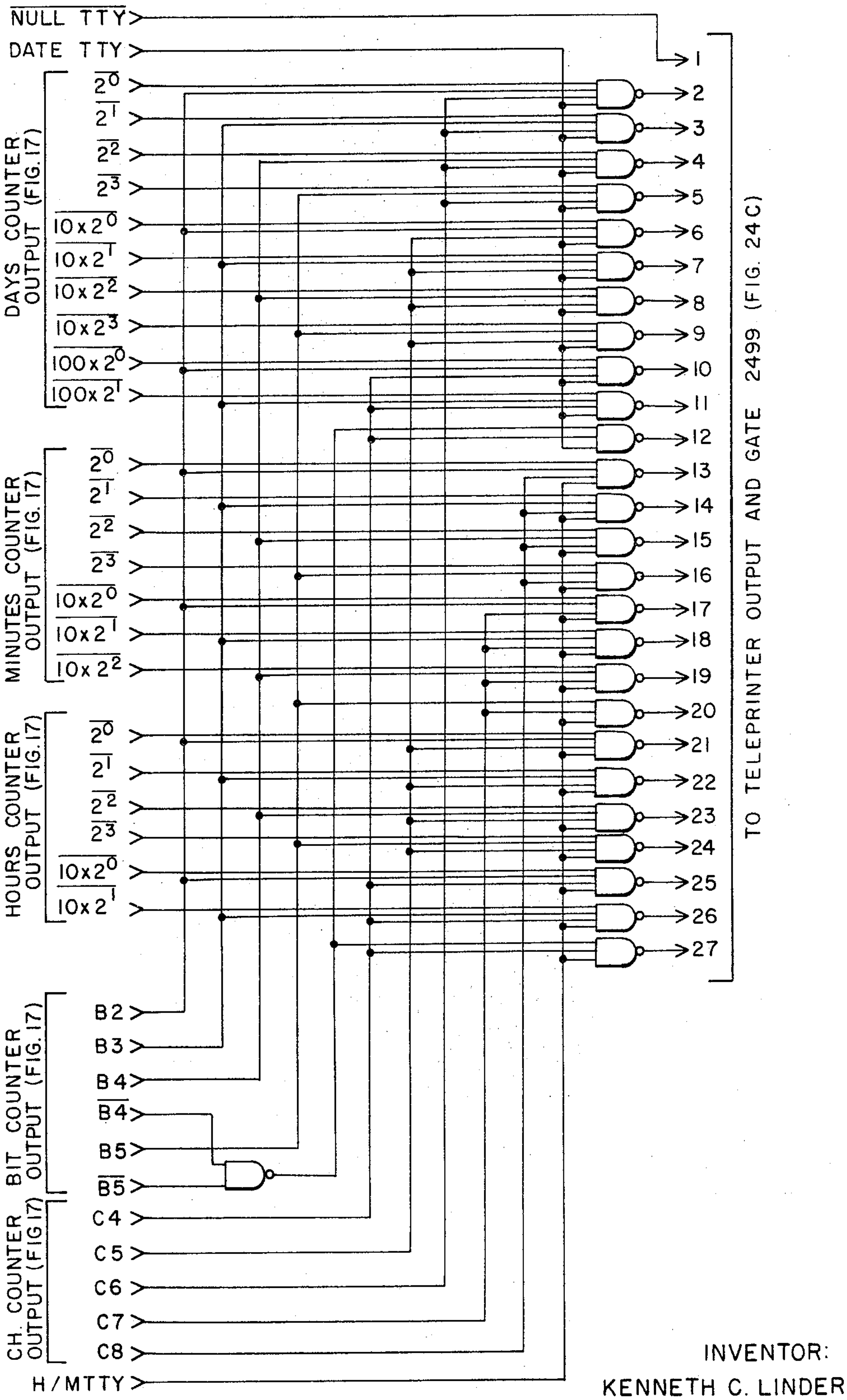
2400 TEL. SIG. GEN. LOGIC FIG. 24A
INVENTOR:
KENNETH C. LINDER
By Mason, Kolehmainen, Rathburn & Wyss
Attys.

FIG. 24B
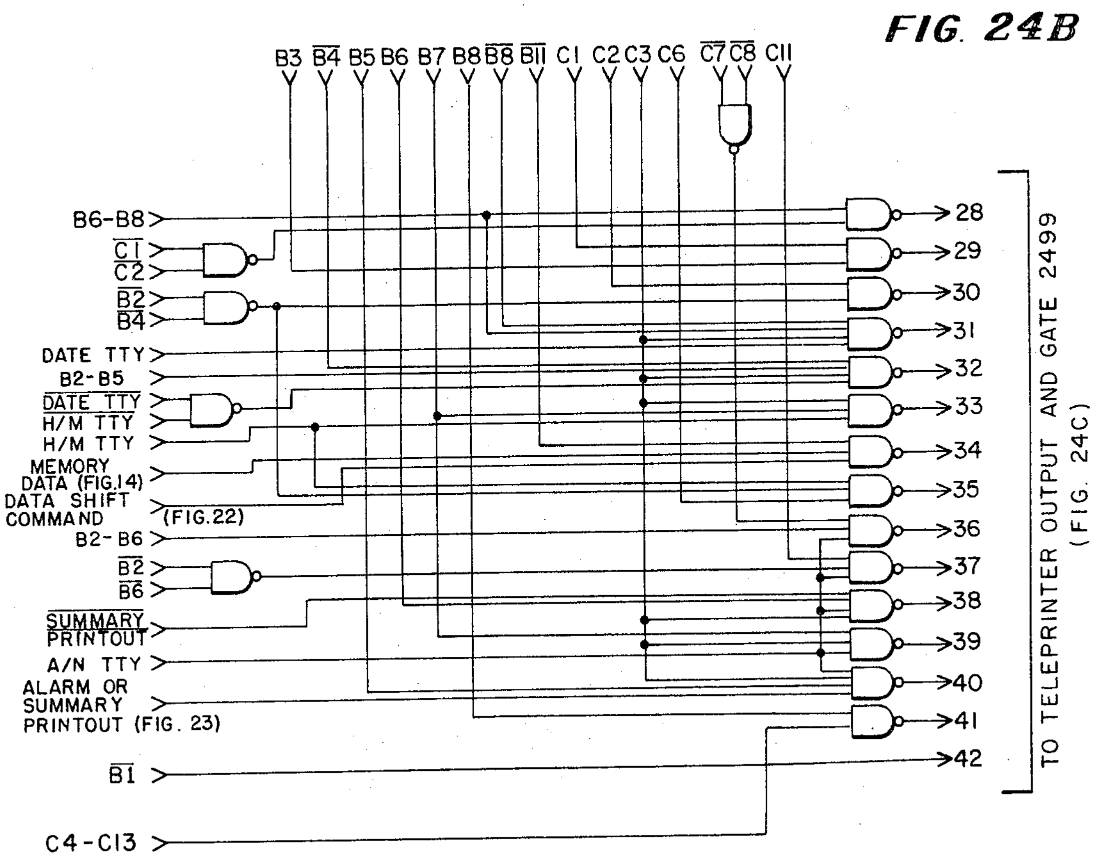
2499 TELEPRINTER OUTPUT AND GATE FIG. 24C
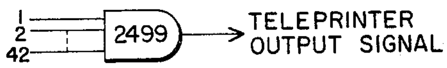
INVENTOR:
KENNETH C. LINDER
By Mason, Kolehmainen, Rathburn, & Wyss
Attys.

2500 MAINTENANCE AND SUMMARY MODE LOGIC

INVENTOR:
KENNETH C. LINDER
By Mason, Kolehmainen Rathburn, + Wyss
Attys.

2600 SUMMARY MODE CONTROL LOGIC

INVENTOR:
KENNETH C. LINDER
By Mason, Kolehmainen, Rathburn & Wyss
Attys.

2700 MAINTENANCE MODE CONTROL LOGIC

2800 MAINTENANCE AND SUMMARY RESET LOGIC

INVENTOR:
KENNETH C. LINDER
By Mason, Kolehmainen,
Rathburn & Wyss
Attys.

Patented July 11, 1972 3,676,878
27 Sheets-Sheet 25
2900 COMPARATOR FIG. 29A
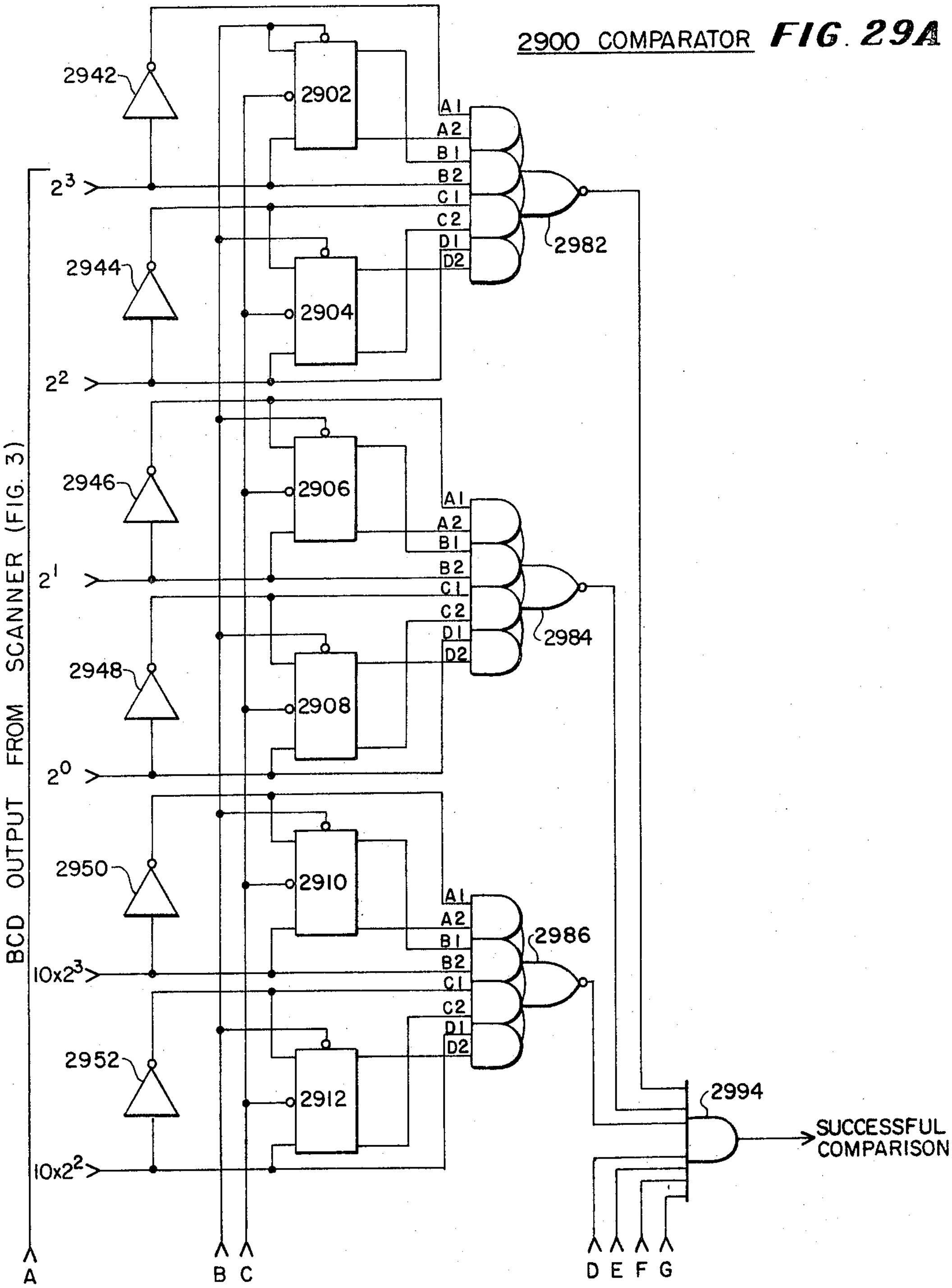
INVENTOR:
KENNETH C. LINDER
By Mason, Kolehmainen Rathburn & Wyss
Attys.

2900 COMPARATOR

INVENTOR:
KENNETH C. LINDER
By Mason, Kolehmainen, Rathburn & Wyss
Attys.

3000 EVENT LIGHT FIG. 30
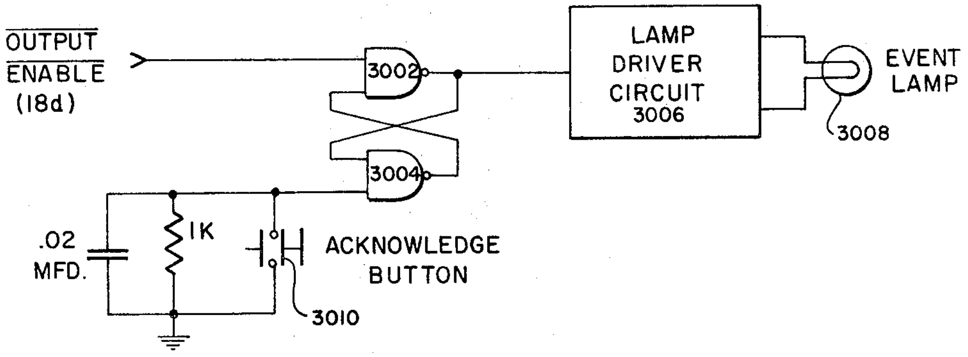
3100 SYNCHRONIZING CIRCUIT FIG. 31
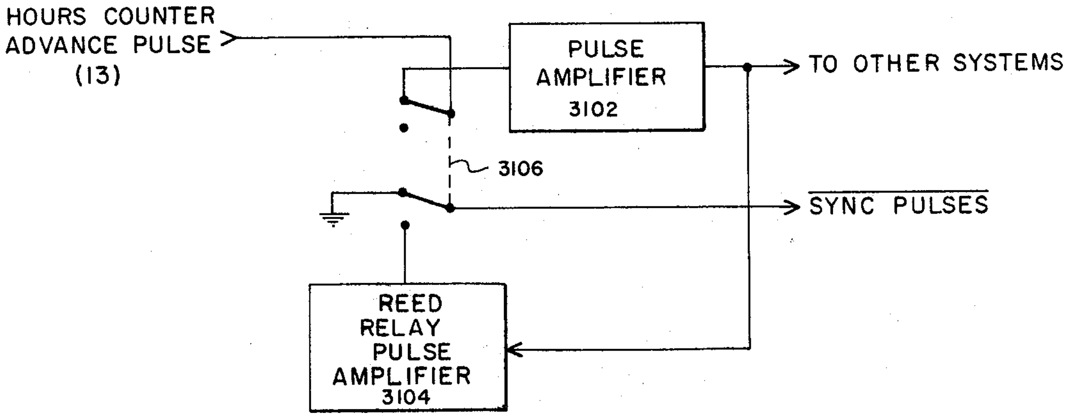
INVENTOR:
KENNETH C. LINDER
By Mason, Kolehmainen,
Rathburn & Wyss
ATTYS.

VARIABLE MONITORING SYSTEM

This invention relates to variable monitoring systems, and more particularly to systems which monitor a number of variables and record the sequence in which the variables go abnormal or return to normal. Some aspects of the invention, however, have much more general application.

The monitored variables (pressure, temperature, voltage, etc.) are arranged to open or close electrical switches (through transducers if necessary) when a preset limit is exceeded. The switches return to their normal conditions when the variables fall back within their normal operating limits. The task of the monitoring system is to provide a warning or an alarm indication whenever one or more variables are abnormal, and also to compile a permanent printed record of the exact sequence in which the variables become abnormal and return to normal.

Variable monitoring systems of the type outlined above have been heretofore developed to a considerable degree of sophistication. See, for example, U.S. Pat. No. 3,278,920. Most of these systems have one or more drawbacks, such as an inability to print out actual time down to small fractions of a second, fixed capacity memory, inability to produce an output signal suitable for a teleprinter, and inability to print out a summary list of all abnormal variables without interfering with the normal monitoring function.

It is a primary object of the present invention to provide a monitoring system that can record the time at which an event occurs in real time units (seconds, minutes, hours) rather than in relative time units based upon elapsed time since a given event. The system disclosed includes a clock that is accurate to one hundredth part of a second, that runs synchronously with the 60 cycle line, and that includes means for synchronization with clocks of other similar systems so that times recorded by different systems can be compared. This clock is also able to keep relatively accurate time during a power failure, when no 60 cycle synchronizing signal is available.

Another object of the present invention is the production of a system having an expandable memory. The memory in the system disclosed can accept high speed event information at a single input while simultaneously feeding event information from a single output to a low speed teleprinter. The memory is easily expandible. A system of the type disclosed can be initially purchased with a small memory and the memory can be expanded at a later time by the insertion of additional memory boards.

It is also an object of the present invention to provide a system having improved annunciator logic circuitry that can operate at very high speeds, that can be scanned by a high speed scanner, and that automatically shifts to an acknowledged state when scanned. The annunciator logic circuitry disclosed is also expandible. A small number of annunciator circuits can be purchased initially, and many more circuits can be added at a later time by the insertion of annunciator point cards.

Briefly, the present invention comprises a monitoring system that is able to produce a printed record of all alarms and of all returns to normal which may arise in a plurality of monitored variables. The printed record includes the date, the time accurate to one hundredth part of a second, the variable number, and the symbol A (alarm) or N (return to normal).

The system includes a scanner, which is a counter, and a series of annunciator circuits each associated with an individual set of alarm or variable monitoring contacts. The count output of the scanner is fed to logic circuitry which controls the transmission of an interrogation pulse to the annunciator circuits. This logic circuitry is designed so that the interrogation pulse interrogates only one annunciator circuit, the particular circuit interrogated being determined by the count output of the scanner.

When an annunciator circuit is interrogated, it generates A and B signals indicating its current state. These signals are fed to an event logic circuit. If a particular annunciator circuit has shifted into the alarm or returned to the normal state since the time it was last interrogated, the event logic circuit generates an event pulse that is stored in an event flip-flop. The output of this event flip-flop is then used to stop the scanner and to start the process of assembling a record of the event for storage in the system memory.

The interrogation pulse not only reads out the state of an annunciator circuit, but also acknowledges the readout of data from the annunciator circuit and thereby prevents a second printout of the same information. In the case of a momentary alarm, this acknowledgement also unlocks the annunciator circuit associated with that alarm and allows it to form a new record indicating the alarm condition has ended. Acknowledgement is accomplished by the trailing edge of the interrogation pulse which toggles an acknowledgement flip-flop within each annunciator circuit.

An event is the opening or closing of a variable monitoring switch in response to a change in the variable. When an event occurs, the number of the variable and a code number representing the type of event are fed in a parallel manner into a series of flip-flops which comprise an event data assembly shift register. The contents of the assembly shift register are then transmitted serially into the system memory for storage until printout. The binary information stored in the seconds portion of a system clock is then shifted in a parallel manner into the assembly shift register, and into the system memory. If the system memory becomes full, a memory full flip-flop is set, and the scanning process is stopped until the memory again is partially empty. The memory full flip-flop remains set and serves as a reminder to the system that events are no longer being printed out in the order in which they occur. The contents of the memory full flip-flop are fed into the assembly shift register and into the system memory along with the contents of the seconds counter.

The system memory comprises a plurality of 32 bit shift registers connected serially to form a single shift register. A control flip-flop is associated with each 32 bit shift register and serves as an indication of whether that shift register is empty or whether it contains data. The control flip-flops are also connected together to form a control shift register. Each 32 bit shift register and each control flip-flop is connected to a source of shift pulses by logic gates. These logic gates are enabled at all times except when the control flip-flops for a 32 bit shift register and for succeeding 32 bit shift registers down the line indicate that all the shift registers are full. When information is first fed into the expandible memory, the first control flip-flop is set. The control flip-flop shift register is then supplied with one shift pulse for every 32 supplied to the 32 bit shift registers, so the information in the control flip-flops advances at the same rate as the data in the main memory shift registers. Data fed into the memory is automatically fed through the memory and stored serially at the output end of the memory. The memory is easily expanded by the addition of additional 32 bit shift registers and control flip-flops to the shift register chains.

The last 32 bit shift register in the memory is provided with a second source of shift pulses coming from a teleprinter output logic. When the teleprinter output logic is ready to print, it shifts data out of the last 32 bit shift register at a slow teleprinter speed. When the output logic has retrieved all of the information that it requires, it clears the control flip-flop associated with the last 32 bit shift register. This causes the remaining information in the system memory to shift forward 32 bit positions towards the memory output.

There is no connection between teleprinter output and the scanning circuits except for the expandable memory. Thus the alarm scanning part of the system operates entirely independently from the output printing part of the system.

The clock comprises a plurality of serially connected BCD counters driven by a 120 pulse per second signal. The first BCD counter maintains a record of 100ths of a second. It disregards two pulses out of every 12 supplied by the 120 pulse per second signal so that for every 12 pulses which enter the counter, the counter only counts 10 pulses and only advances through one decade. In this way the counter is able to convert the 120 pulse per second signal into a 100 pulse per second signal suitable for maintaining a record of 100ths of a second. Additional counters are serially connected to the first and are used to maintain a record of 10ths of a second, seconds, and 10 second intervals.

Every minute, the above-mentioned counters are reset and a minute pulse is generated. This minute pulse is usually fed to a second series of minute, hours, and days counters.

Before printing out information from the expandable memory, the teleprinter output logic prints out the date, and the time and minutes and hours. The time in seconds and fractions of a second comes out of the system memory along with information as to the location and nature of the event or occurrance. If a minute pulse is generated after some event data has been fed to the expandable memory, this minute pulse is not applied to the minutes counter, but is stored temporarily as a marker bit within a marker bit flip-flop. If another event occurs before the printout stops, the marker bit is transferred into the assembly shift register and fed into the expandable memory along with the other data pertaining to the new event. When the marker bit appears at the teleprinter output logic, the logic generates a minutes counter advance pulse and also initiates a new printout of the time in minutes and hours. Thus, real time in seconds, minutes, and hours is printed out by the system, but only the time in seconds and fractions of seconds is stored in the system memory. There is no need ever to store information as to the time in minutes and hours. If at the termination of a printout the marker bit flip-flop still contains a marker bit, the marker bit is shifted directly to the minutes counter.

The teleprinter output logic generates signals that are fed to a conventional teleprinter. It draws upon data stored within the minutes, hours, and days counters, and also upon the data supplied by the expandable memory, and generates appropriate coding signals which cause the printout to be properly formated. Having the data stored serially within the system expandable memory greatly facilitates this process.

The present system also includes an improved summary printout procedure that can print out a complete listing of all variables which are in an alarm state without significantly interfering with the normal operation of the monitoring system. When a summary printout is requested, the scanner scans the annunciator circuits to find an annunciator circuit in the acknowledged alarm state. When such a circuit is found, the location number of the variable is fed into the assembly shift register and into the system memory in the usual manner. Simultaneously, the location number of the variable is stored within a comparator. The monitoring system now returns to its normal mode of operation. The teleprinter output logic prints out the location number of the off-normal circuit in the same manner that it prints out data relating to an event, and meanwhile the monitoring system continues to scan for events in the usual manner. The system is thus free, and can respond to any alarm or any return to normal event which might arise. The memory never contains information for more than one summary point so the memory always has room for storing event data. After the completion of the printout, the teleprinter output logic generates a find next summary signal that returns the monitoring system to the summary mode of operation. When the number in the scanner is next equal to the number stored in the comparator, the search for acknowledged alarms commences once again. The search continues until the entire set of annunciator circuits has been scanned. Any occurrane of an alarm or return to normal event automatically terminates the summary scan and returns the system to its normal mode of operation.

The present invention also includes a maintenance mode of operation which is useful in finding defective annunciator circuits. The maintenance routine starts by placing all annunciator circuits into the unacknowledged alarm state, and thereafter triggering each annunciator circuit through its various states. A scan check is then made to find any annunciator circuits that remain in an unacknowledged state, and a conventional summary check is performed for comparison with earlier summary checks.

Other features of the present invention are its expandability, and its ability to function in spite of some annunciator circuit malfunctioning. Both the array of annunciator circuits and the shift register memory are expandable, and can be operated with as few or as many units as may be required in a particular application. The system can be ordered with a small number of annunciator circuits and with a small memory, and then later it can be easily expanded merely by the insertion of additional memory boards and annunciator point cards. Any breakdown of one annunciator circuit will not usually cause other annunciator circuits to malfunction, since the scanning hits each annunciator circuit individually and does not flow through all of the annunciator circuits serially as in earlier systems. The independence of the teleprinter output logic from the scanning logic is another feature of the present invention that eliminates the need for coordination between the scanning circuits and the printing circuits. The teleprinter print out provides an economical way of transmitting data out of the monitoring system. Teleprinters are far more economical than the parallel digit printers which have been used in the past. Teleprinter printout also greatly increases the number of characters which may be printed out.

Further objects, features, and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which.

Figure 2:
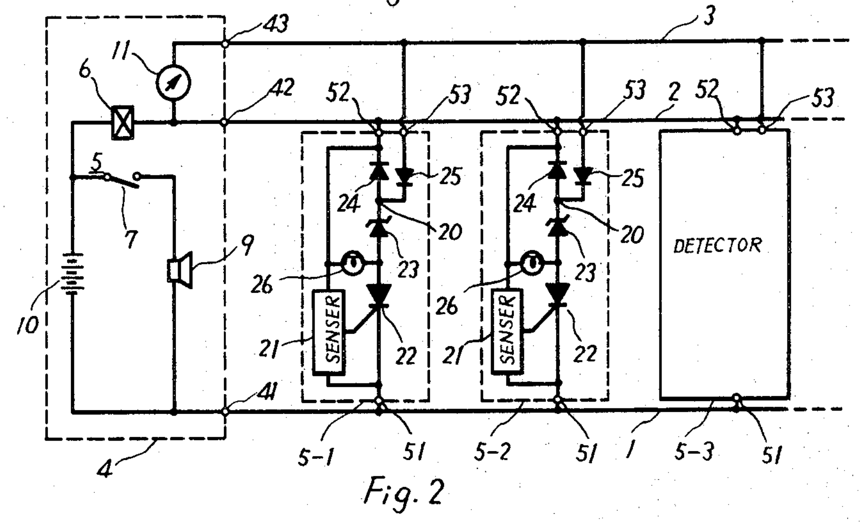
FIGS. 2A–2F are logic diagrams of the high frequency clock 200 —
Figure 3:
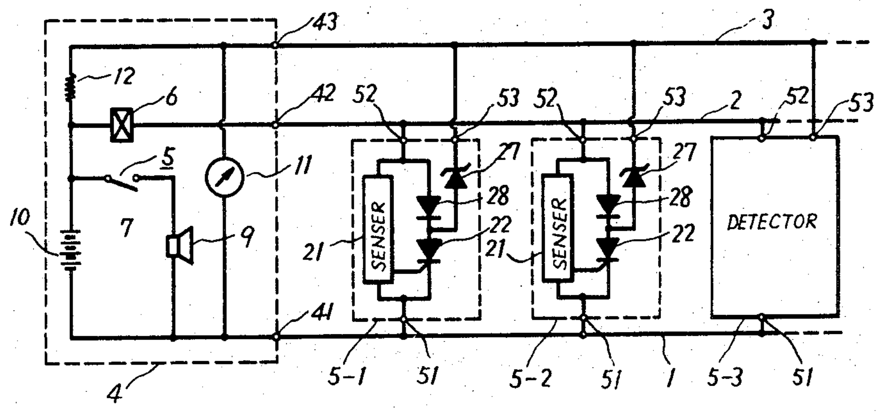
Figure 1:
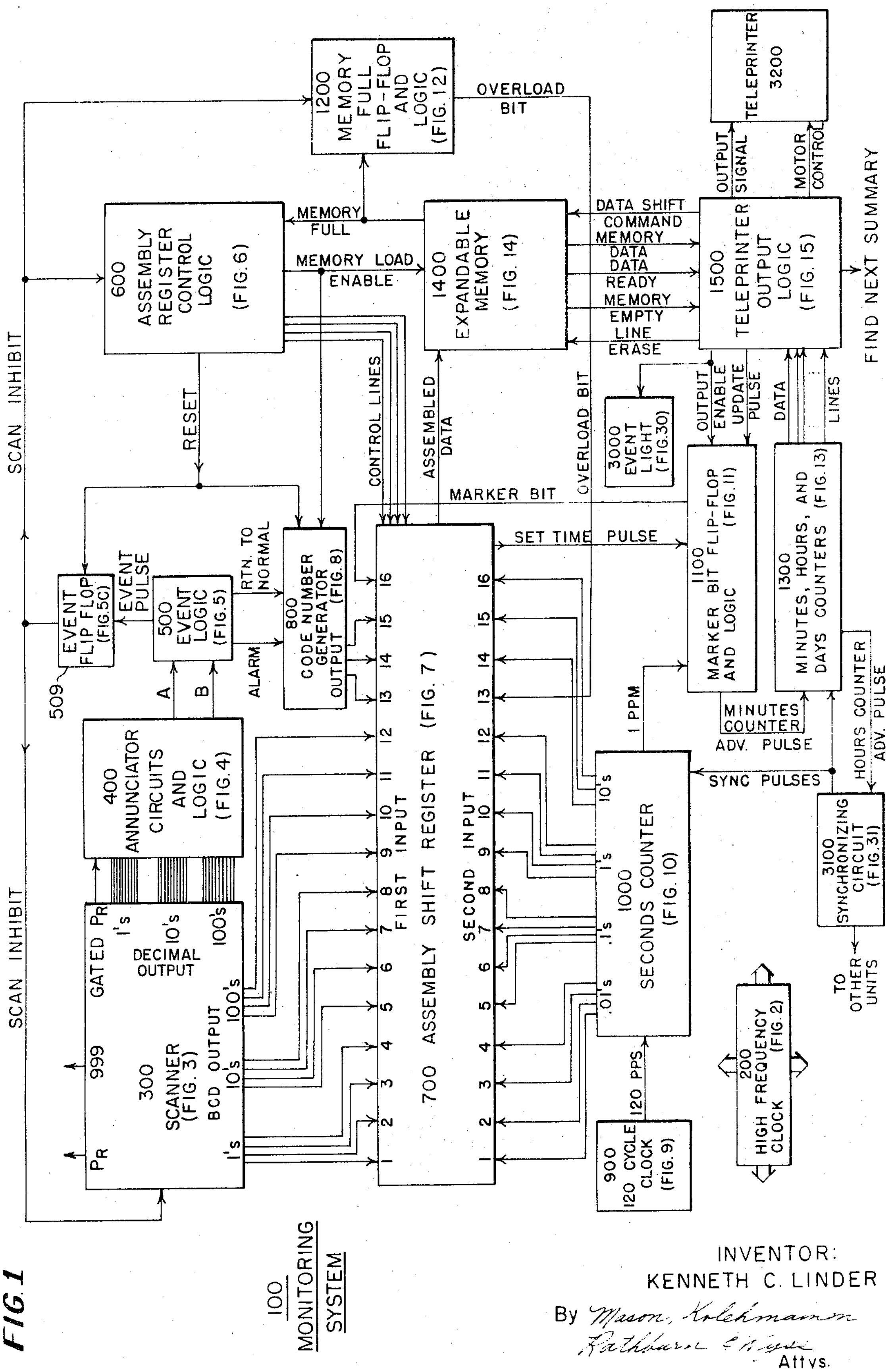
Figures 2A, 2B, 2C, 2D, 2E, 2F:
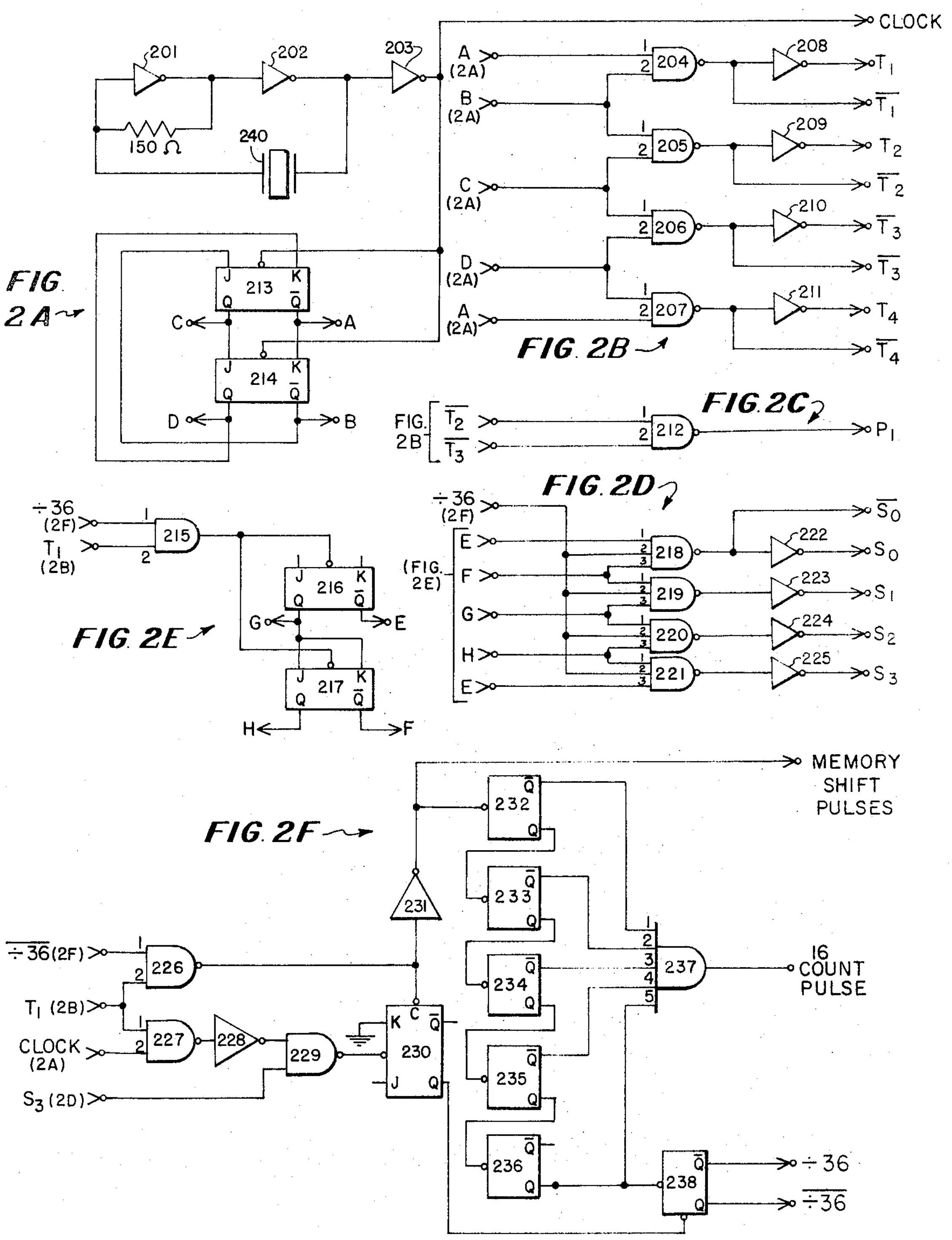
Figure 3:
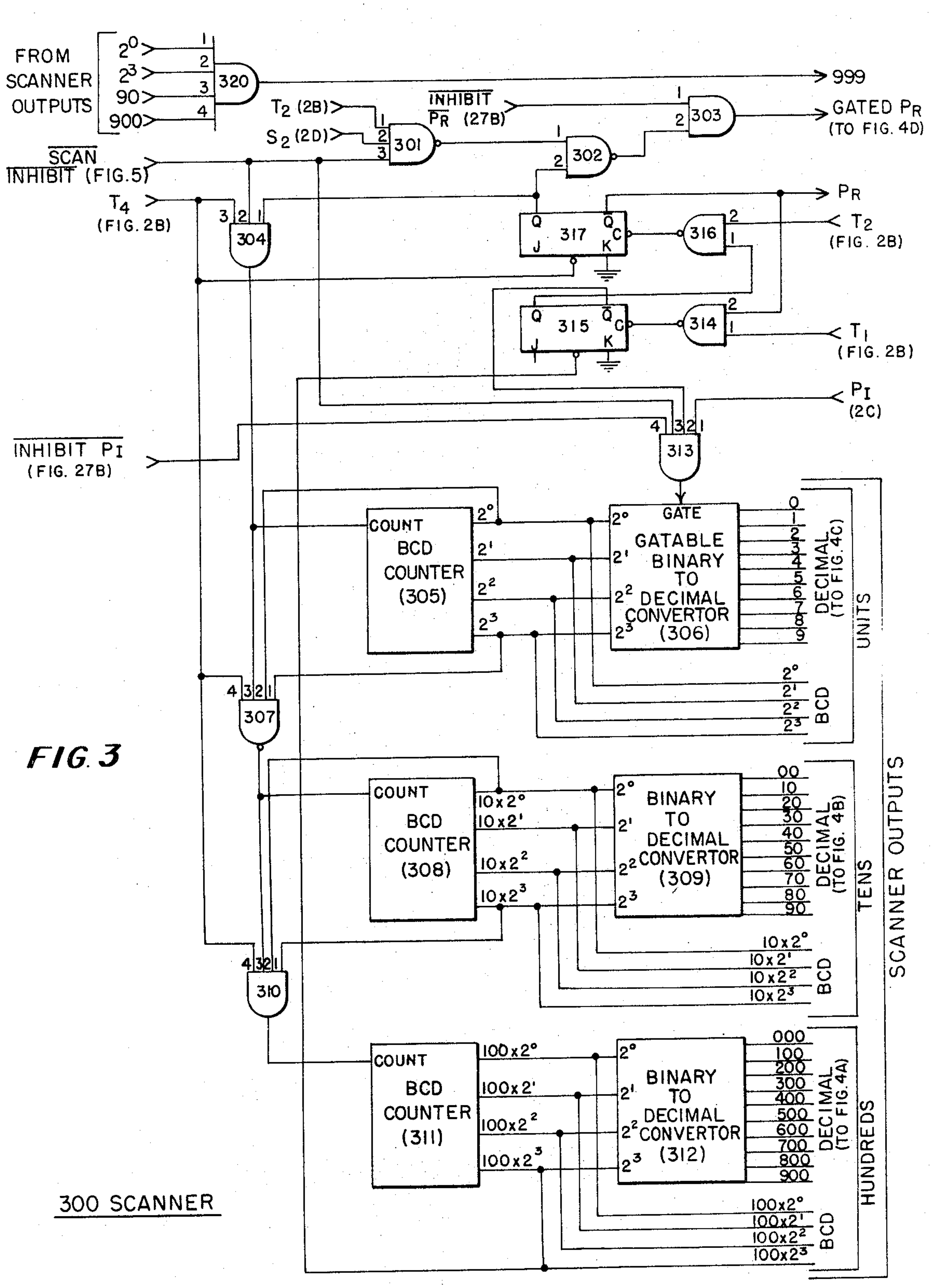
Figure 4A:
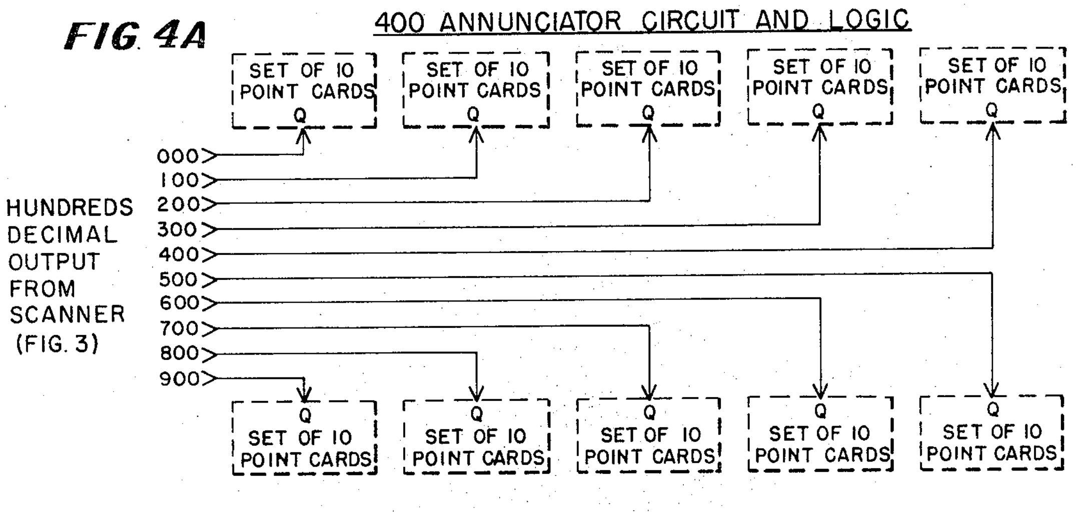
Figure 4B:
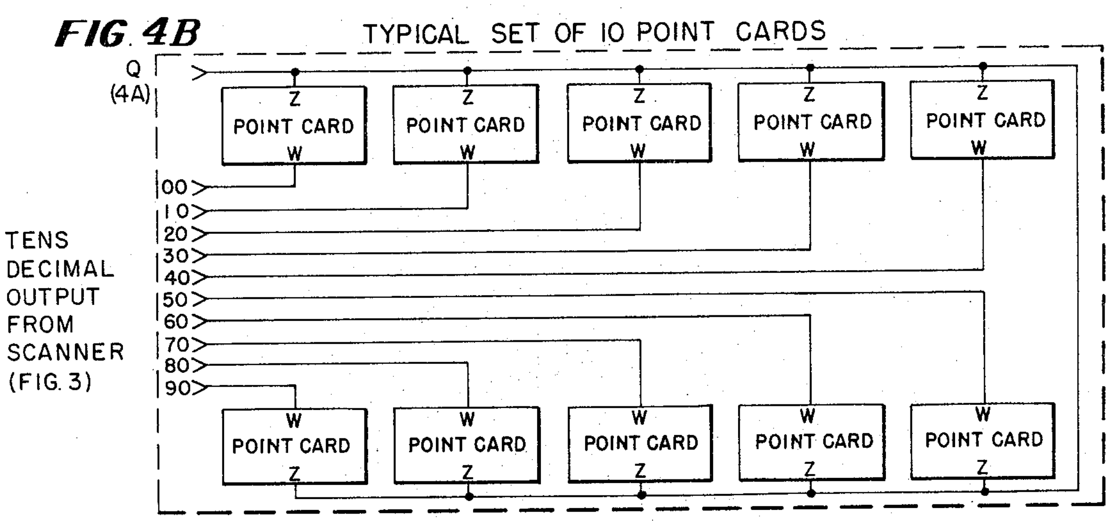
Figure 4C:
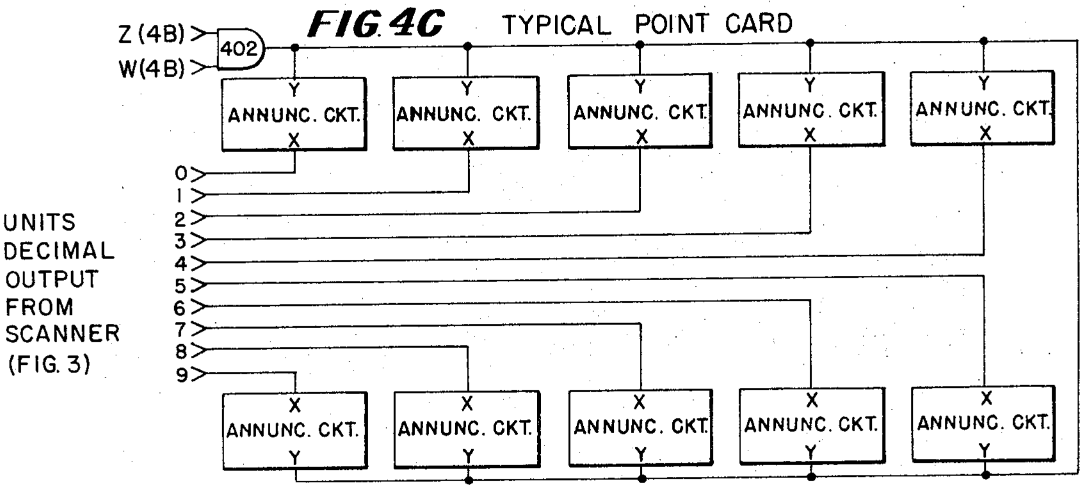
Figure 5A:
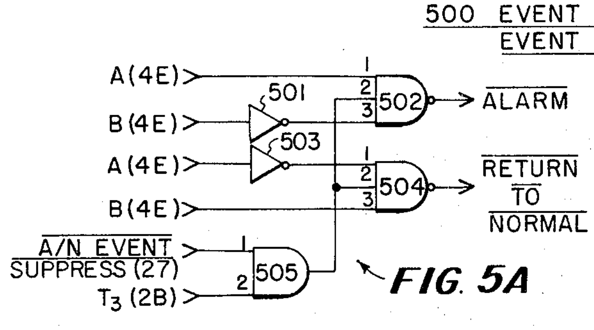
Figure 5B:
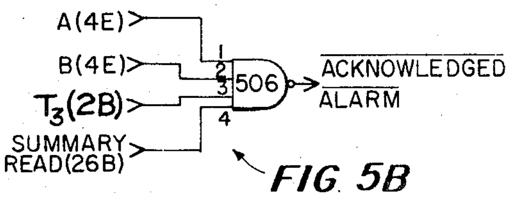
Figure 5C:
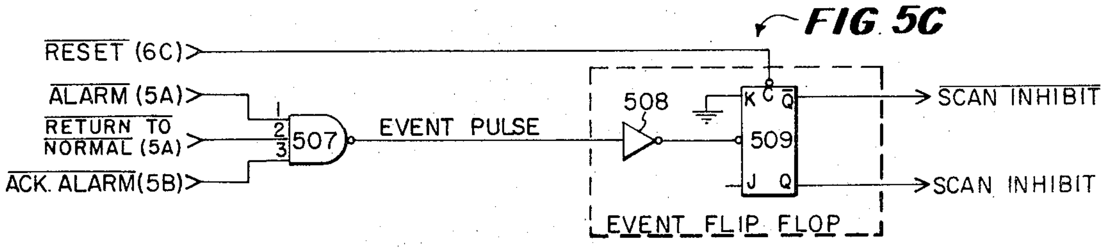

FIG. 2A is a logic diagram of the crystal controlled clock oscillator and of the first clock frequency divider circuit, FIG. 2B is a logic diagram of a circuit for generating the high frequency clock T pulses, FIG. 2C is a logic diagram illustrating how the interrogation pulse $P_I$ is derived from the high frequency clock T pulses, FIG. 2D is a logic diagram of the second clock divider circuit, FIG. 2E is a logic diagram of the circuit for generating the medium frequency clock S pulses, and FIG. 2F is a logic diagram of the circuitry for generating the MEMORY SHIFT pulses;

FIG. 2G is a timing diagram illustrating the time sequential arrangement of the various pulses generated by the high frequency clock circuit 200;

FIG. 3 is a logic diagram of the scanner 300;

FIGS. 4A–4E are logic diagrams of the annunciator circuits and logic 400,

FIG. 4A is a logic diagram showing the connections between the scanner 300 and the 10 sets of 10 point cards, FIG. 4B is a logic diagram showing the connections between a typical set of 10 point cards and the scanner 300, and also showing the interconnections between the point cards within a typical set, FIG. 4C is a logic diagram of a typical point card, FIG. 4D is a logic and circuit diagram of a typical annunciator circuit, and FIG. 4E is a logic diagram of the connections between the annunciator circuits and the event logic 500;

FIGS. 5A–5C are logic diagrams of the event logic 500 and of the event flip-flop 509 —

Figure 6A:
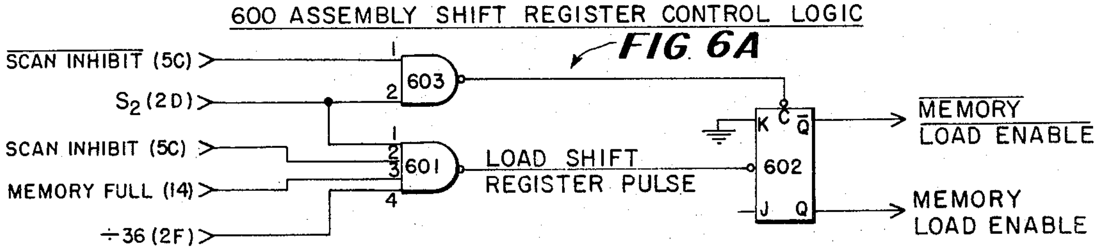
Figure 6B:
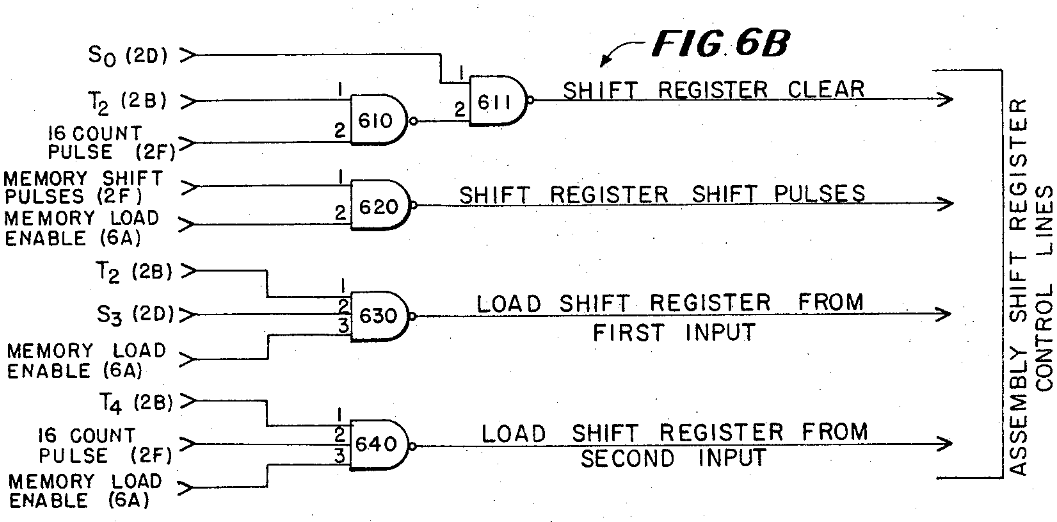
Figure 6C:
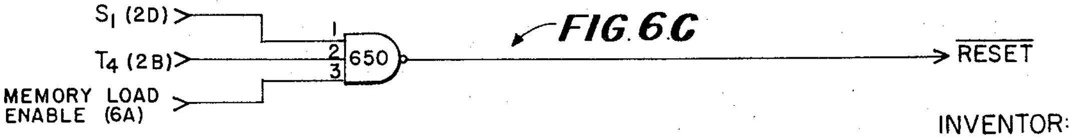

FIG. 5A is a logic diagram of circuitry used to generate the inverted ALARM and RETURN TO NORMAL signals, FIG. 5B is a logic diagram of circuitry used to generate the inverted ACKNOWLEDGED ALARM signal, and FIG. 5C is a logic diagram of the event flip-flop 509 and associated logic;

FIGS. 6A–6C are logic diagrams of the assembly shift register control logic 600 —

Figure 7:
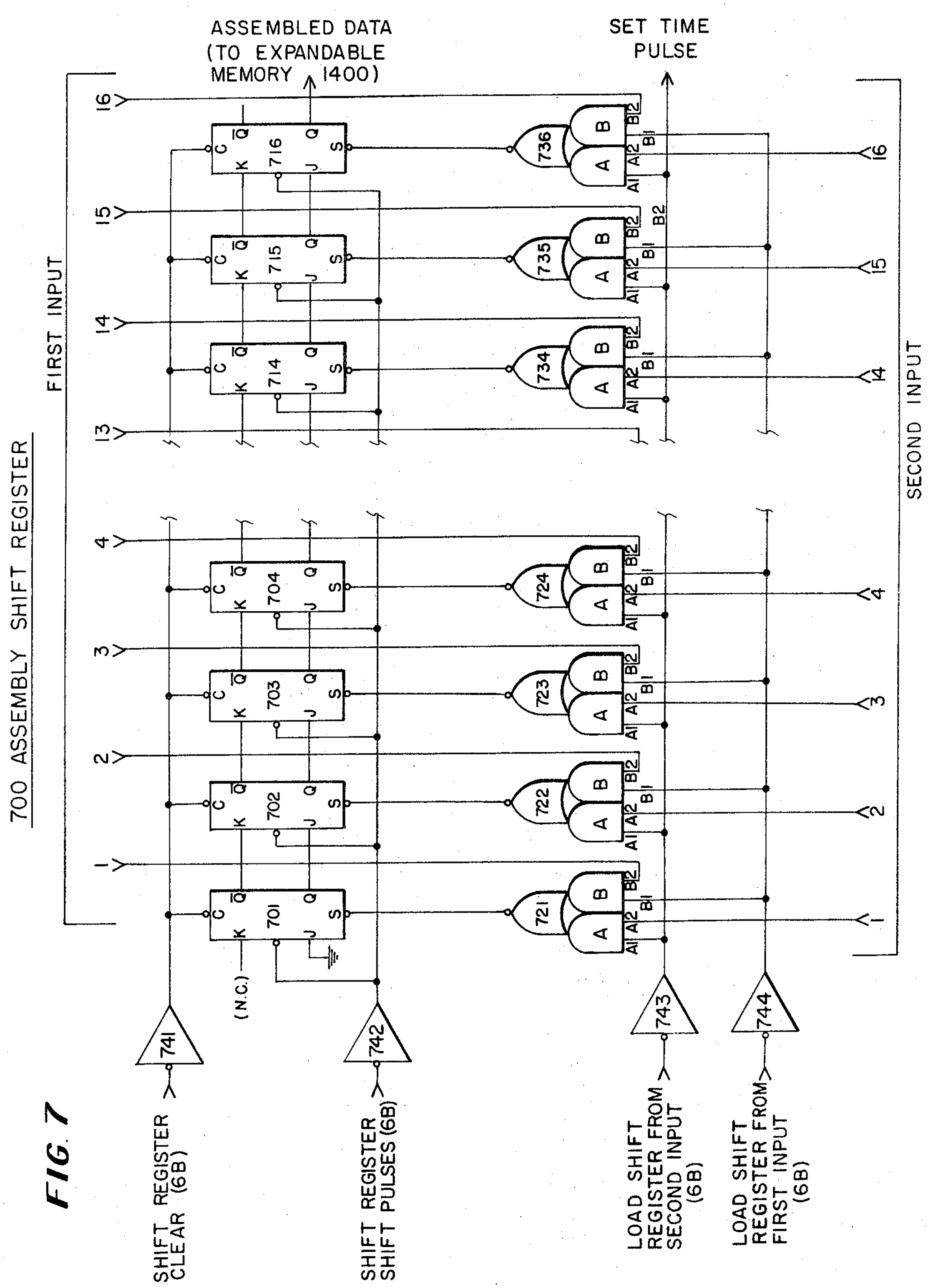
Figure 8:
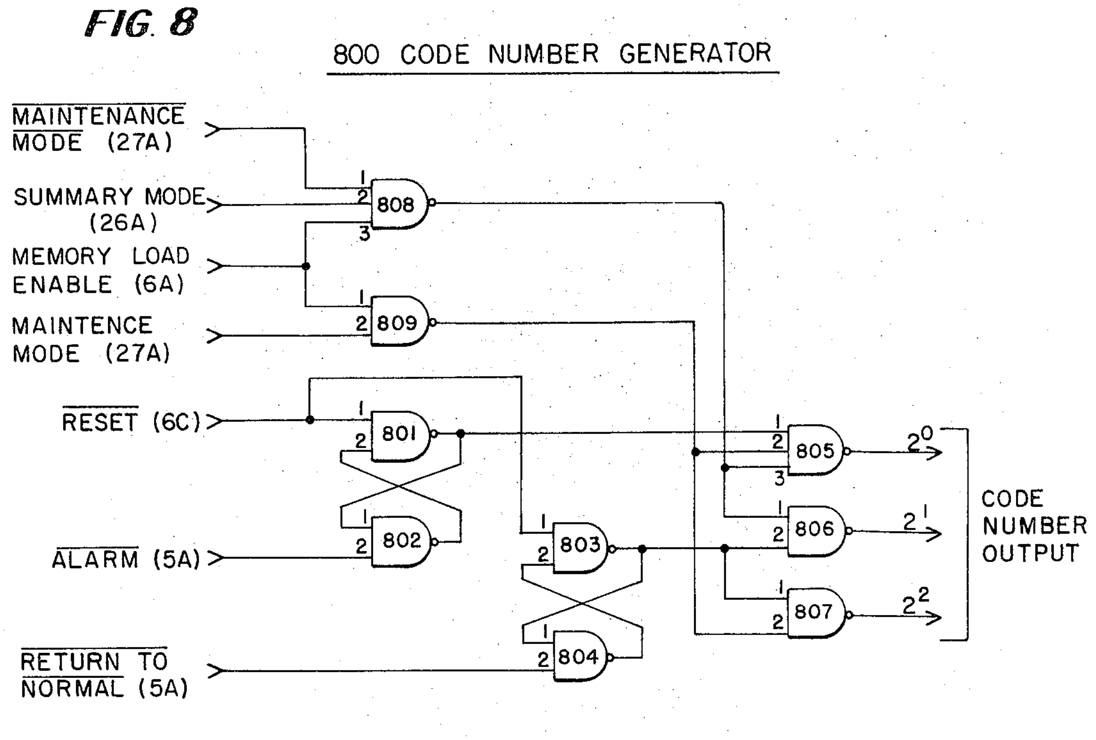
Figure 9:
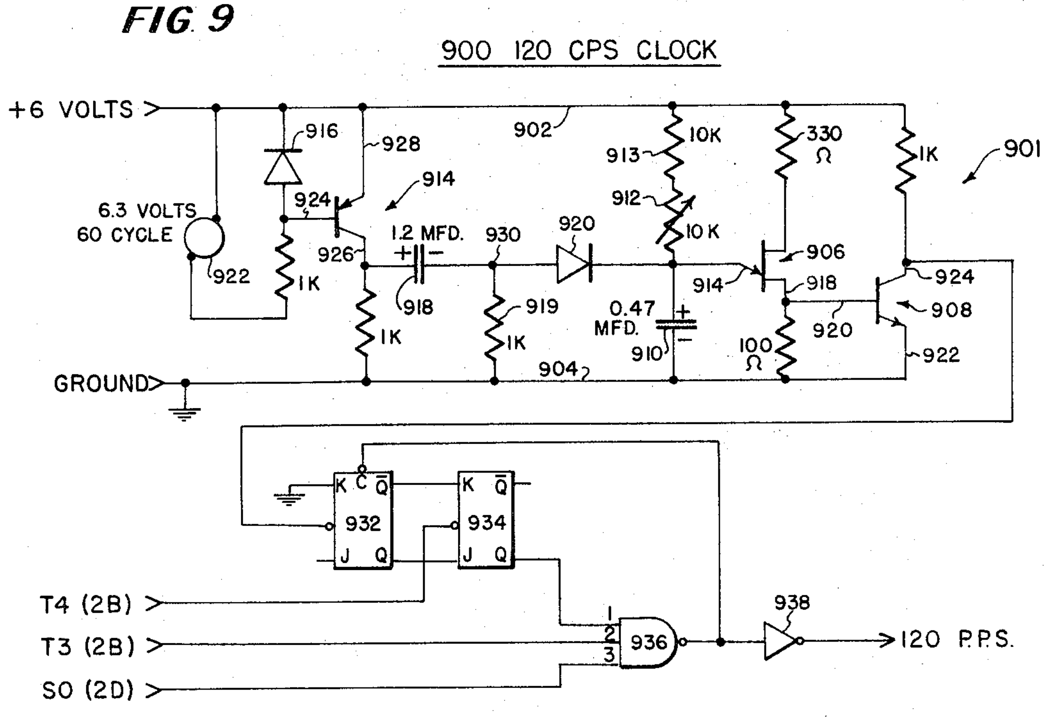
Figure 10:
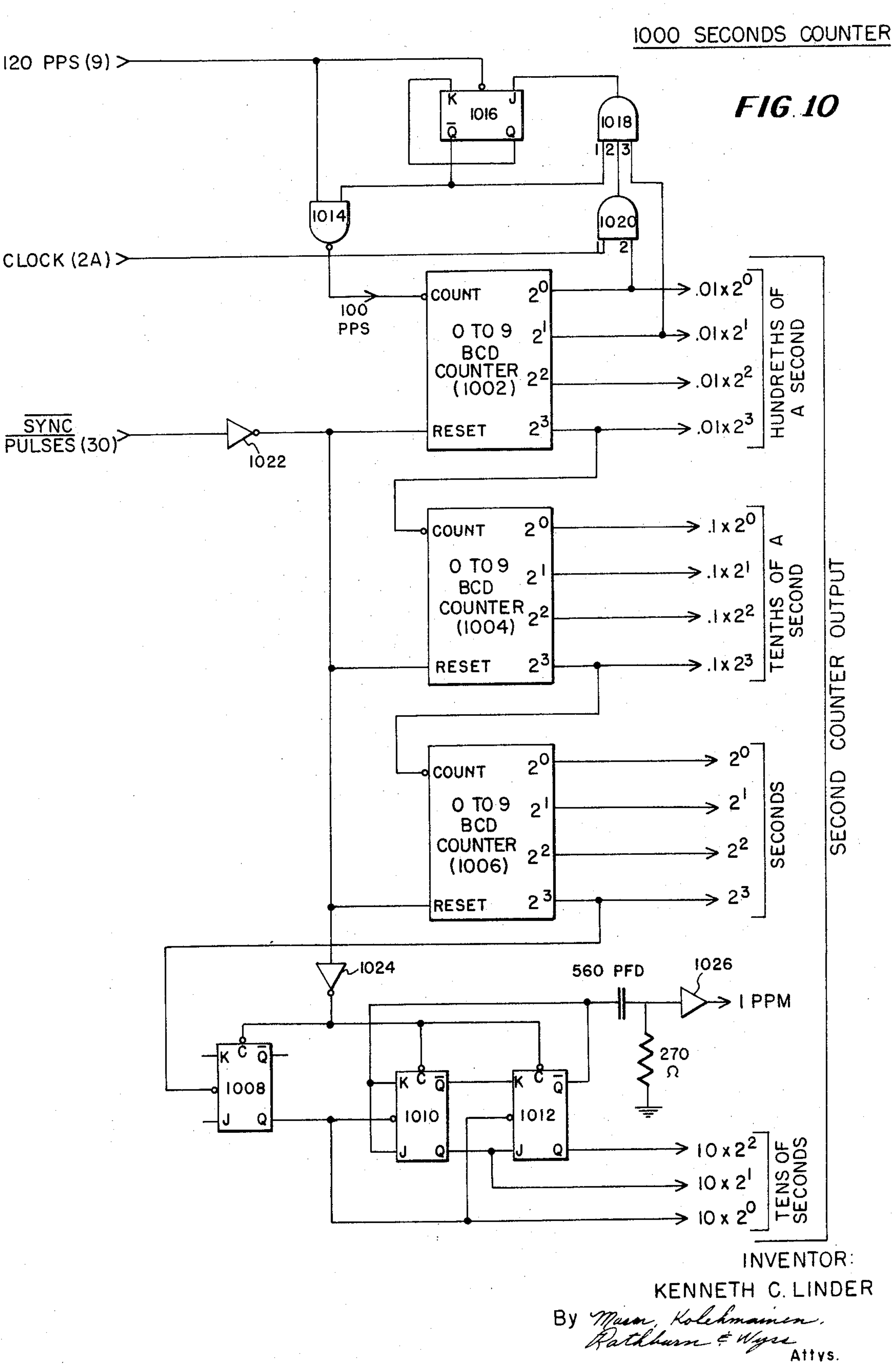
Figure 11:
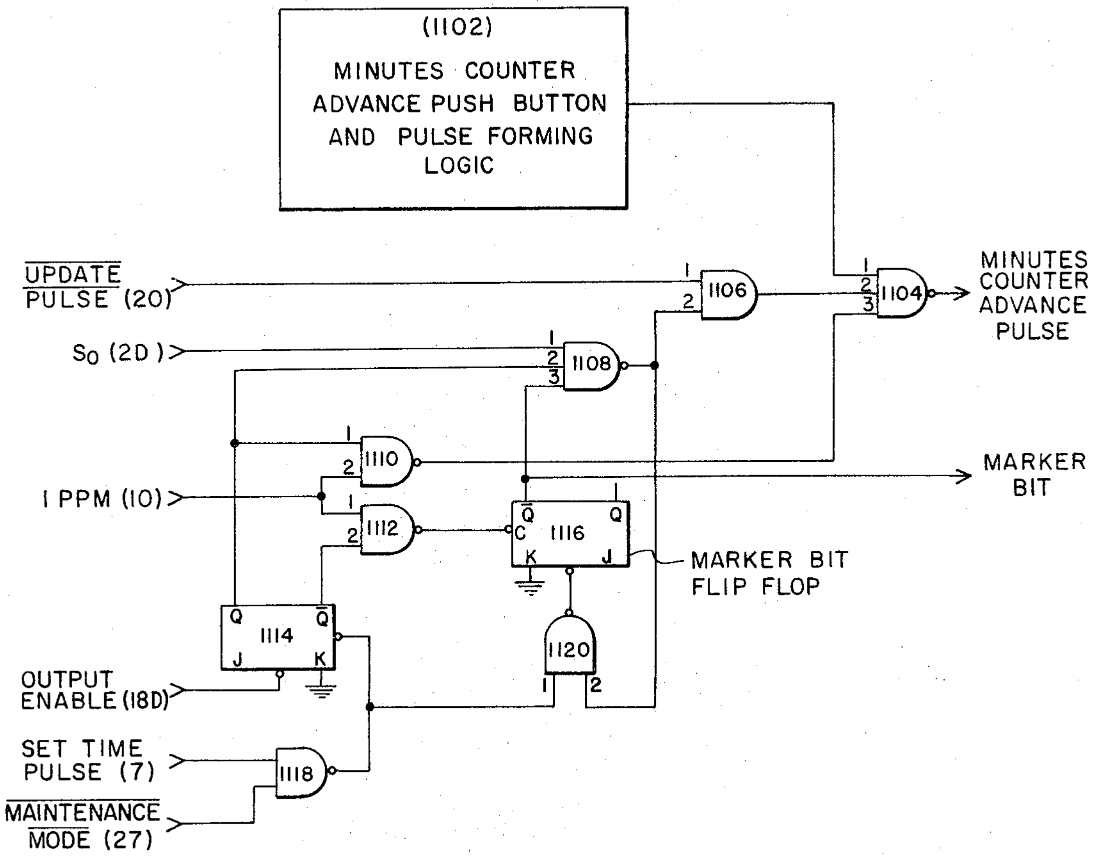
Figure 12:
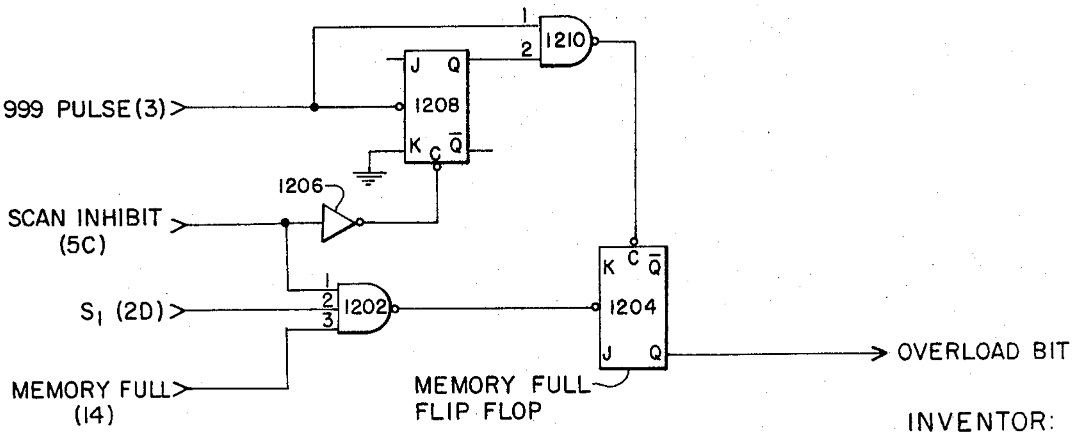
Figure 13:
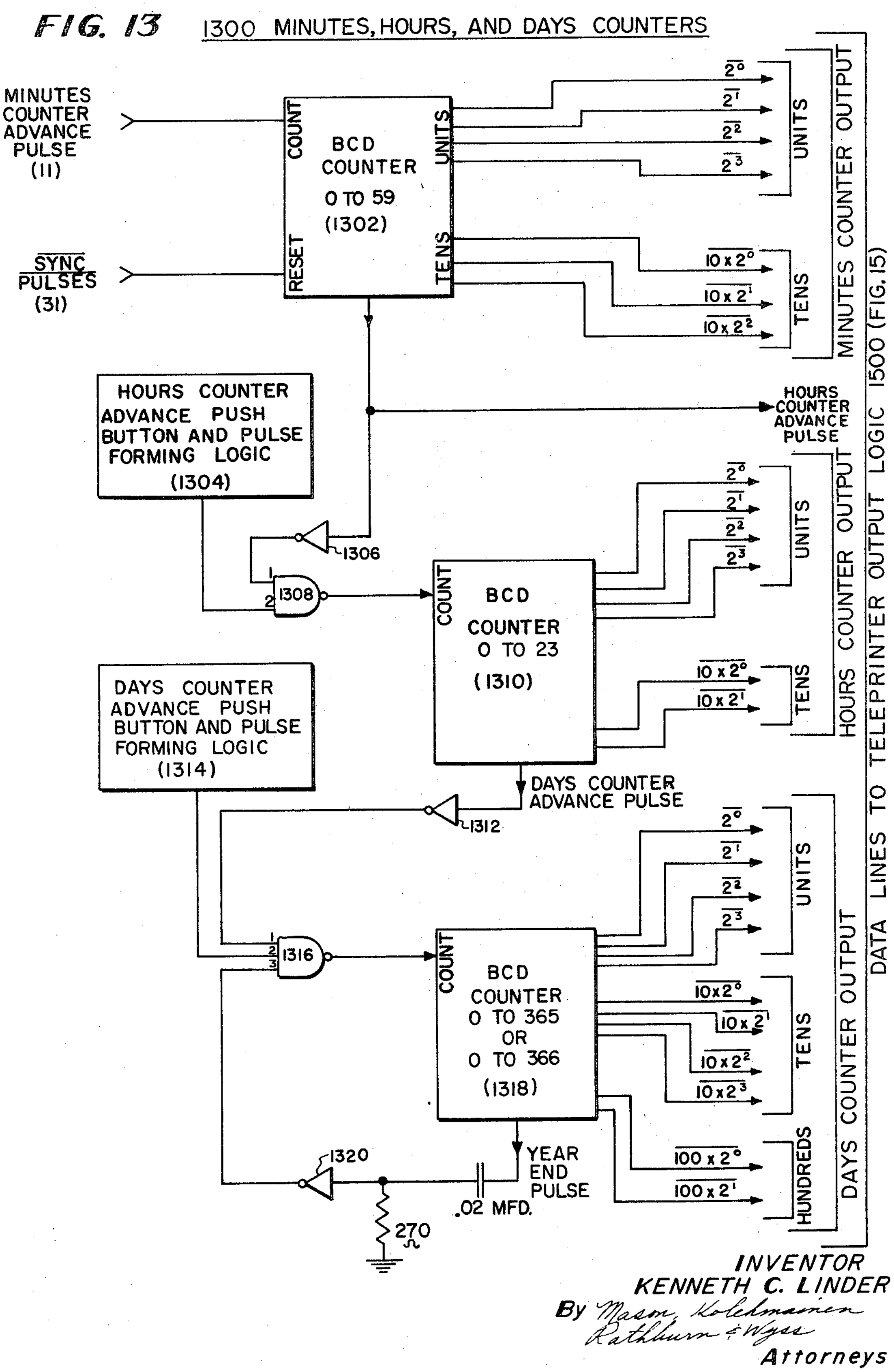
Figure 14:
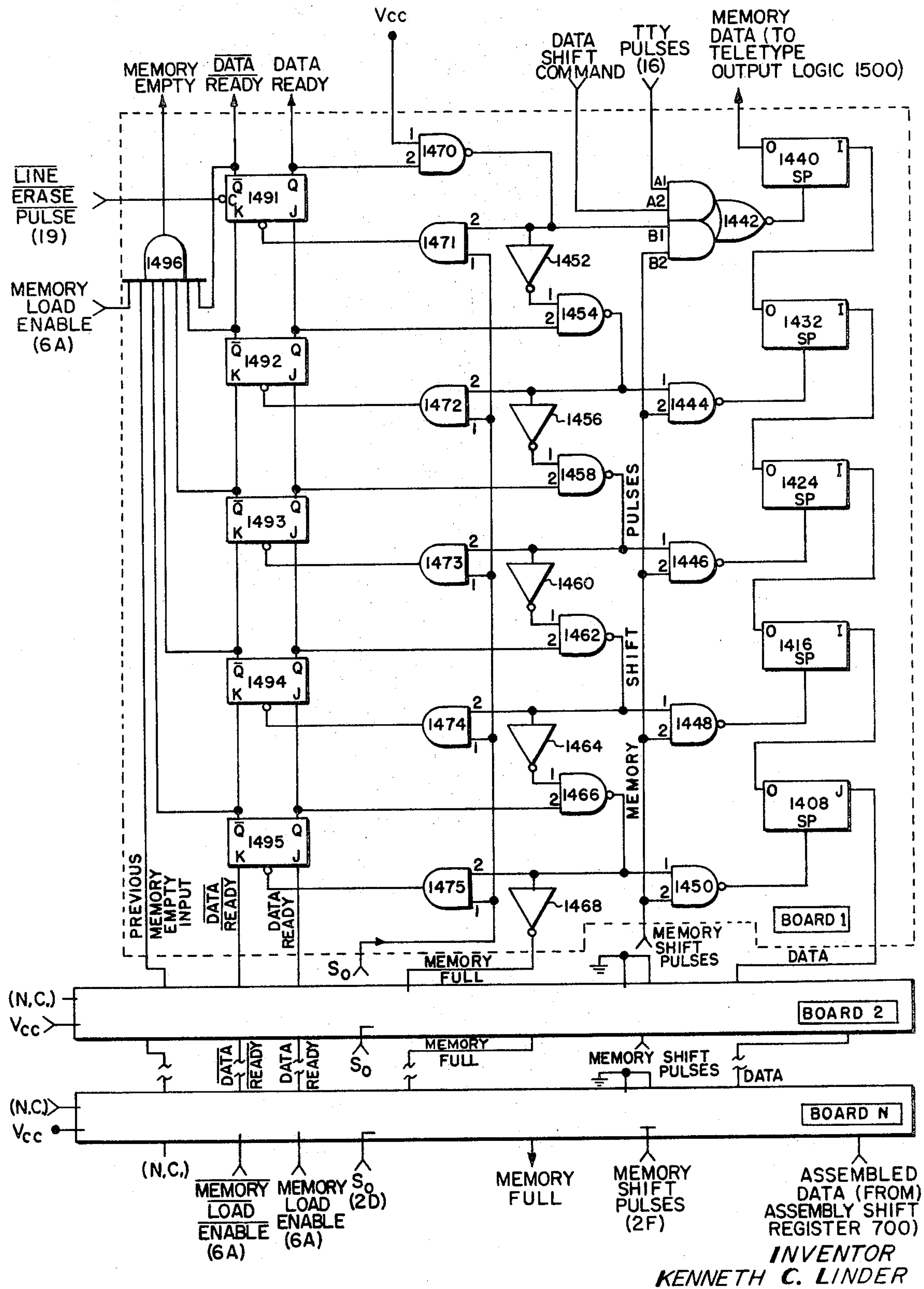
Figure 15:
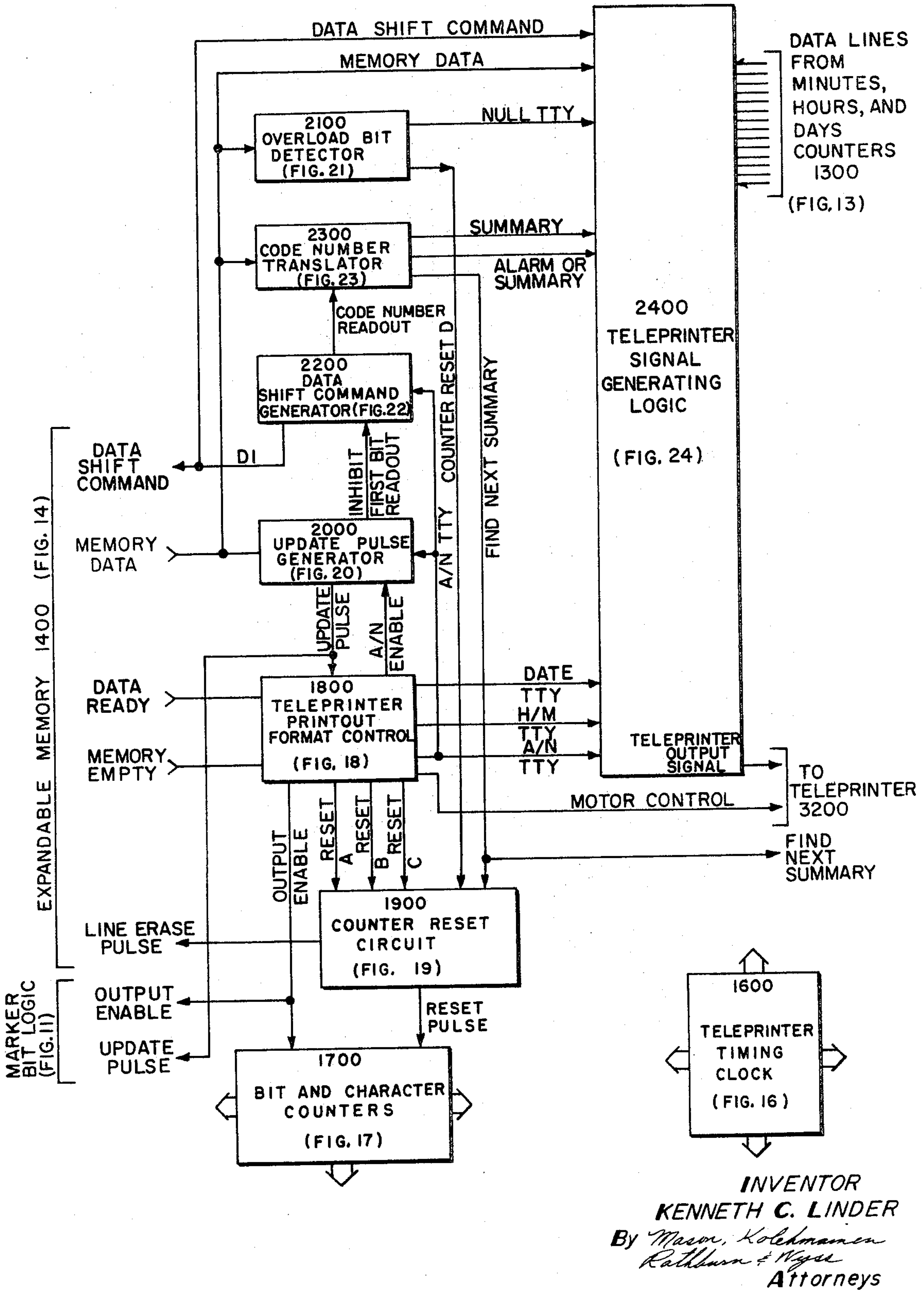
Figure 16:
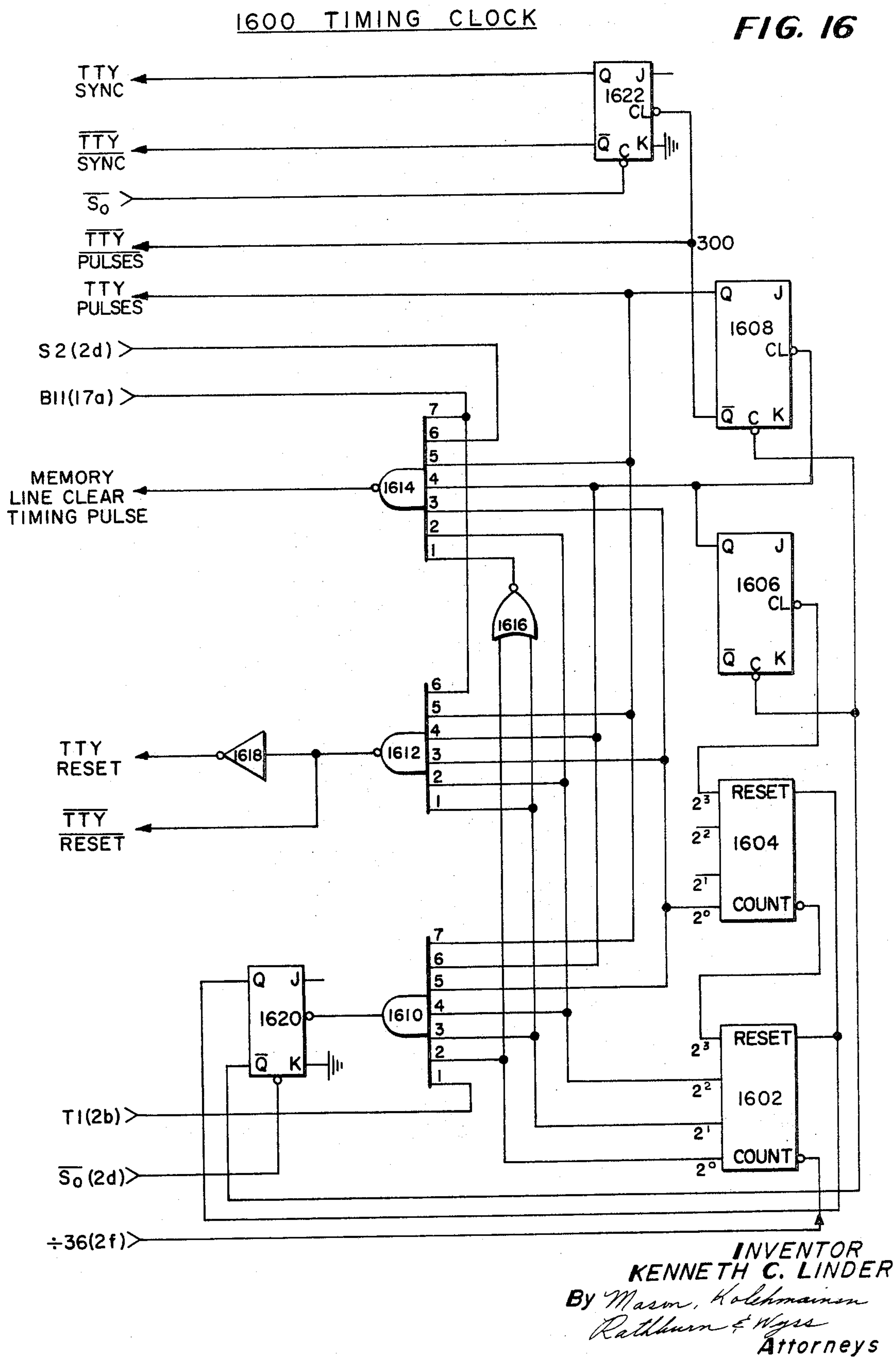
Figure 17A:
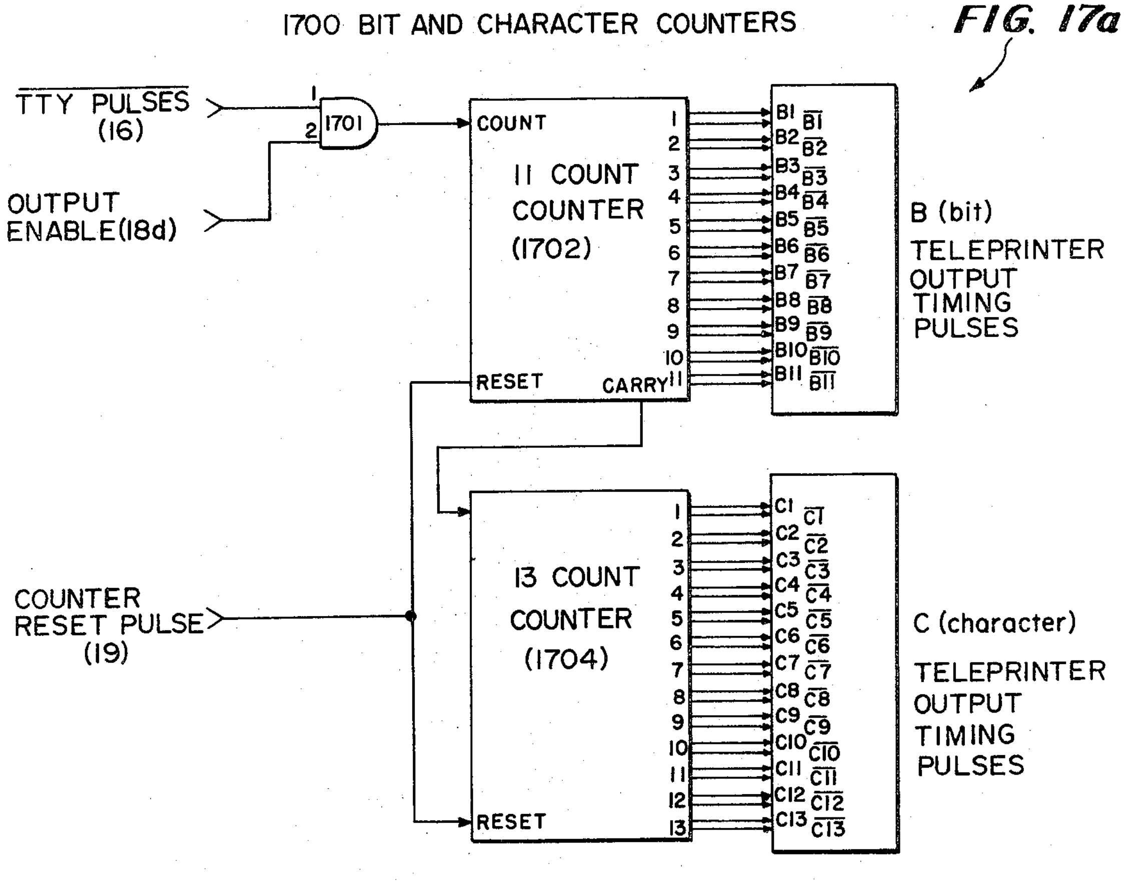
Figure 17B:
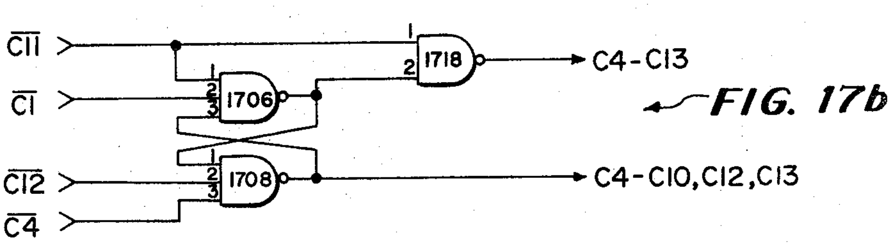
Figure 17C:
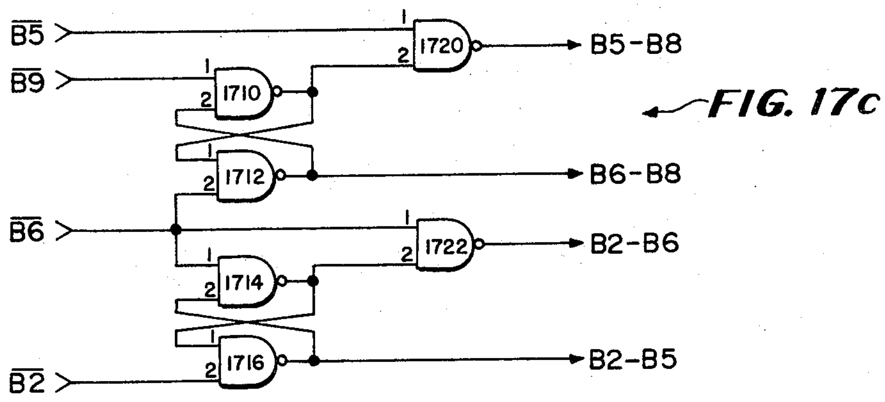

FIG. 6A is a logic diagram of circuitry used to generate the MEMORY LOAD ENABLE signals, FIG. 6B is a logic diagram of circuitry used to control the assembly shift register, and FIG. 6C is a logic diagram of circuitry used to reset the event flip-flop 509 (FIG. 5C) and the code number generator flip-flops (FIG. 8);

FIG. 7 is a logic diagram of the assembly shift register 700;

FIG. 8 is a logic diagram of the code number generator 800;

FIG. 9 is a logic and circuit diagram of the 120 cycle per second clock 900;

FIG. 10 is a logic diagram of the seconds counter 1000;

FIG. 11 is a logic diagram of the marker bit flip-flop and logic 1100;

FIG. 12 is a logic diagram of the memory full flip-flop and logic 1200;

FIG. 13 is a logic diagram of the minutes, hours, and days counters 1300;

FIG. 14 is a logic diagram of the expandable shift register memory 1400;

FIG. 15 is a block diagram of the teleprinter output logic 1500;

FIG. 16 is a logic diagram of the teleprinter timing clock 1600;

FIGS. 17A–17C are logic diagrams of the bit and characters counters 1700 —

FIG. 17A a logic diagram of the teleprinter B (bit) and C (character) timing pulse generator;

FIG. 17B is a logic diagram of a compound C (character) timing pulse generator, and FIG. 17C is a logic diagram of a compound (B) bit timing pulse generator;

FIGS. 18A–18D are logic diagrams of the teleprinter printout format control 1800 —

Figures 18, 18A, 18B, 18C, 18D:
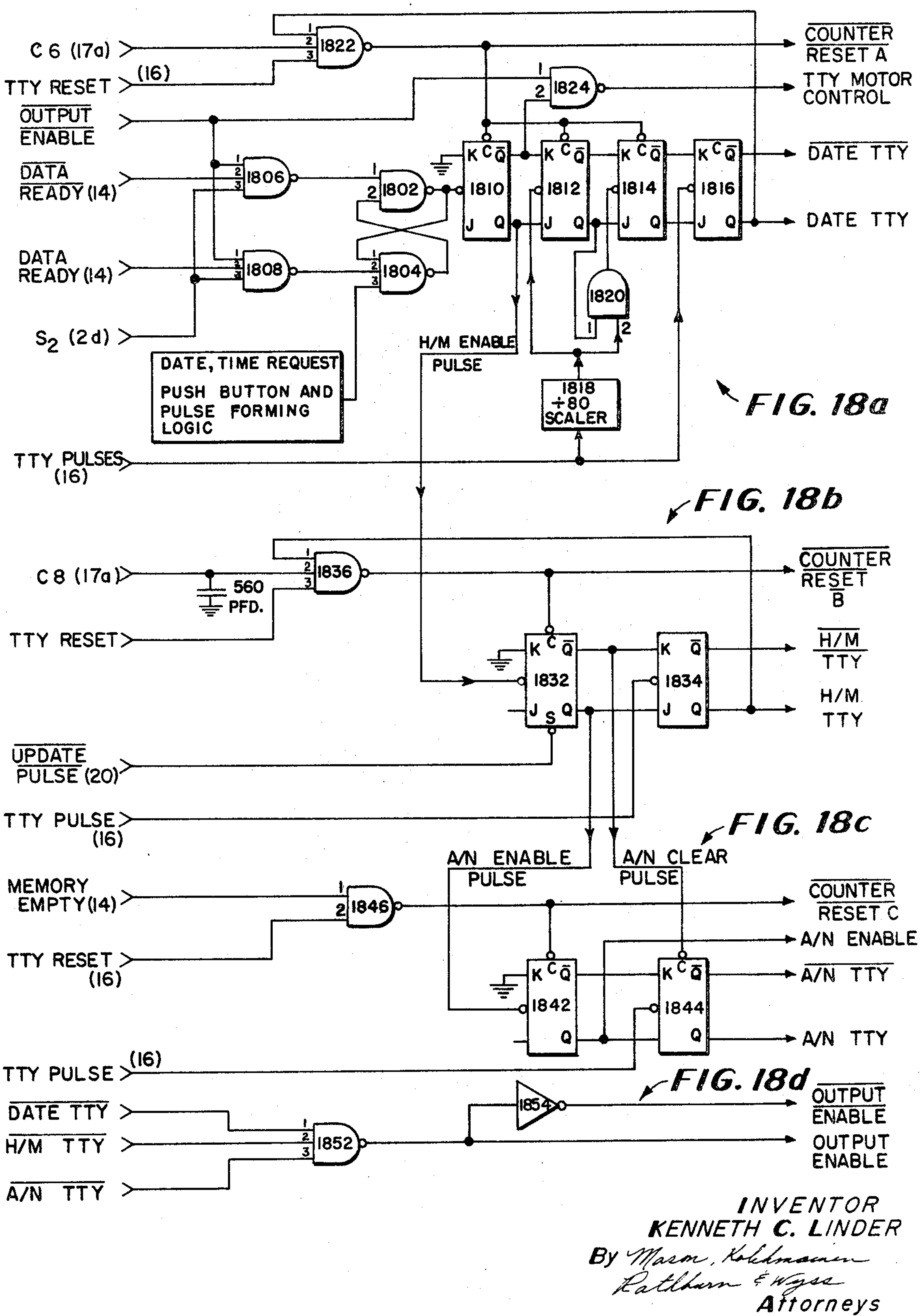
Figure 19:
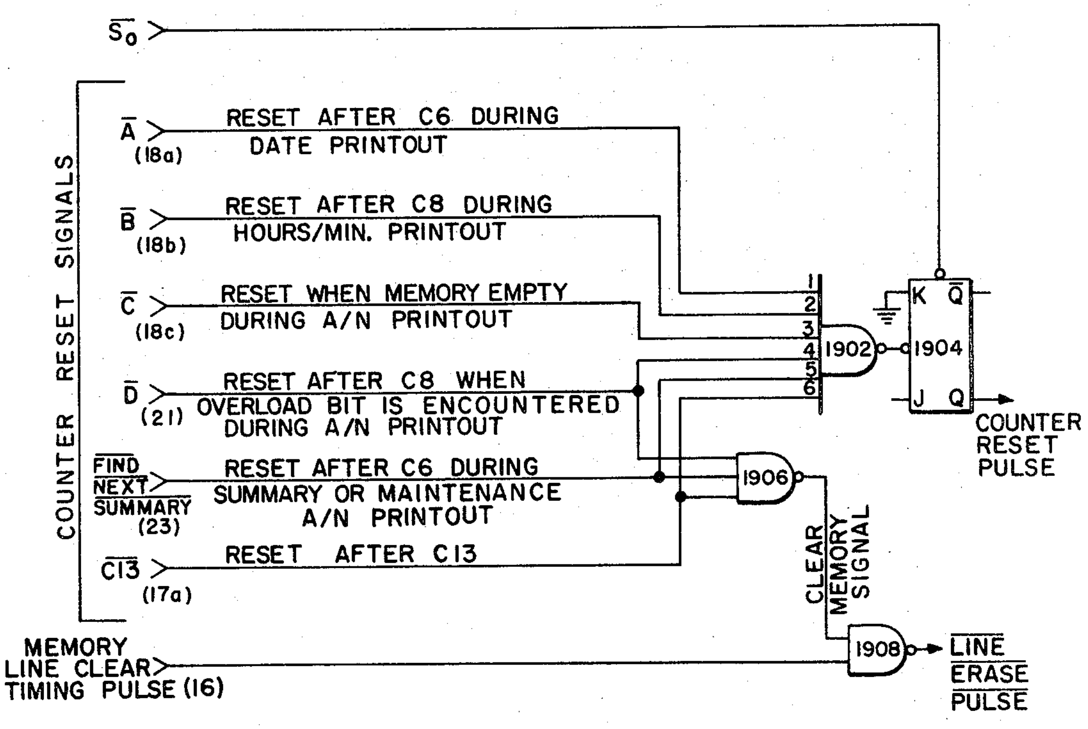
Figure 20:
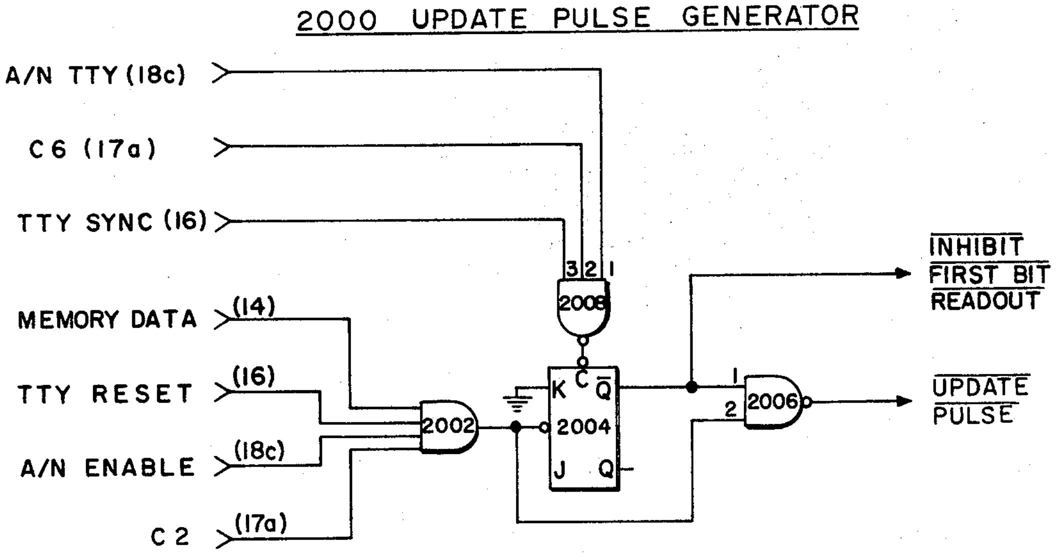
Figure 21:
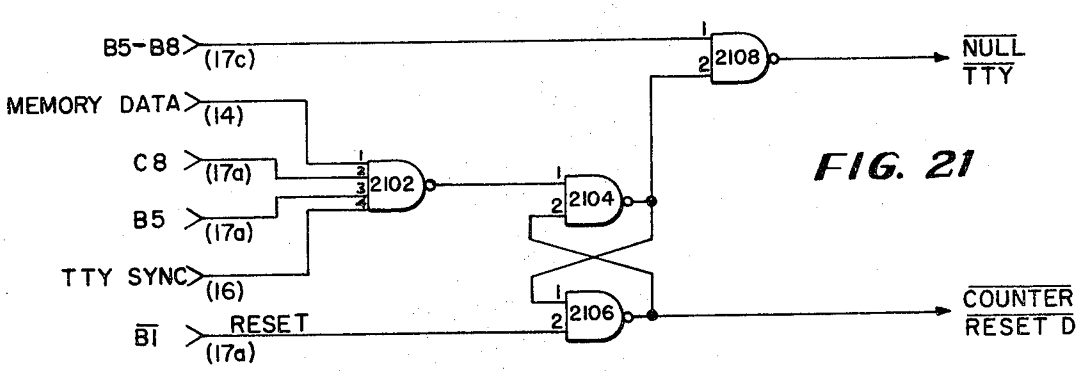
Figure 22:
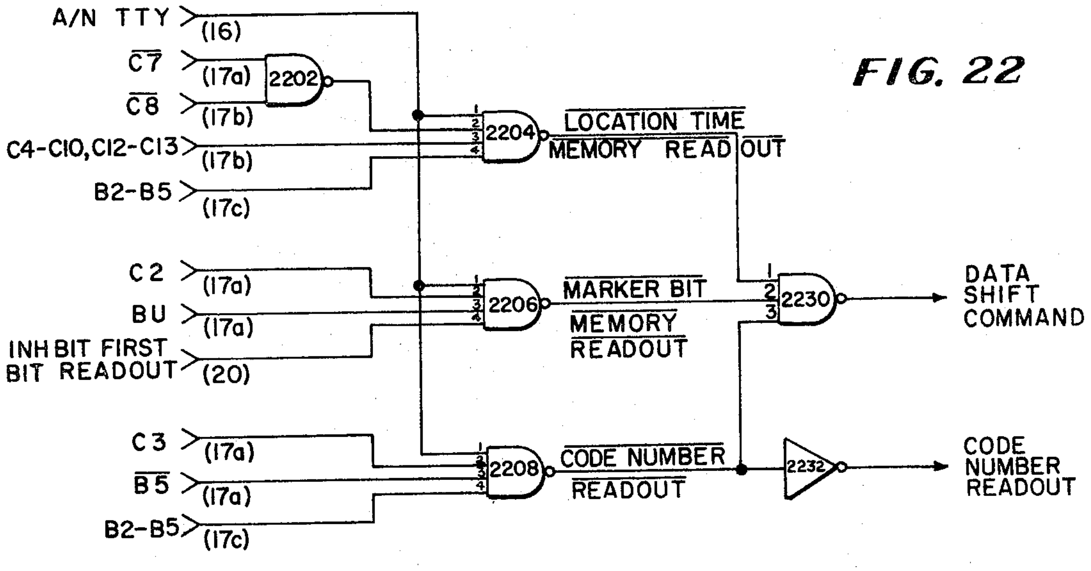
Figure 23:
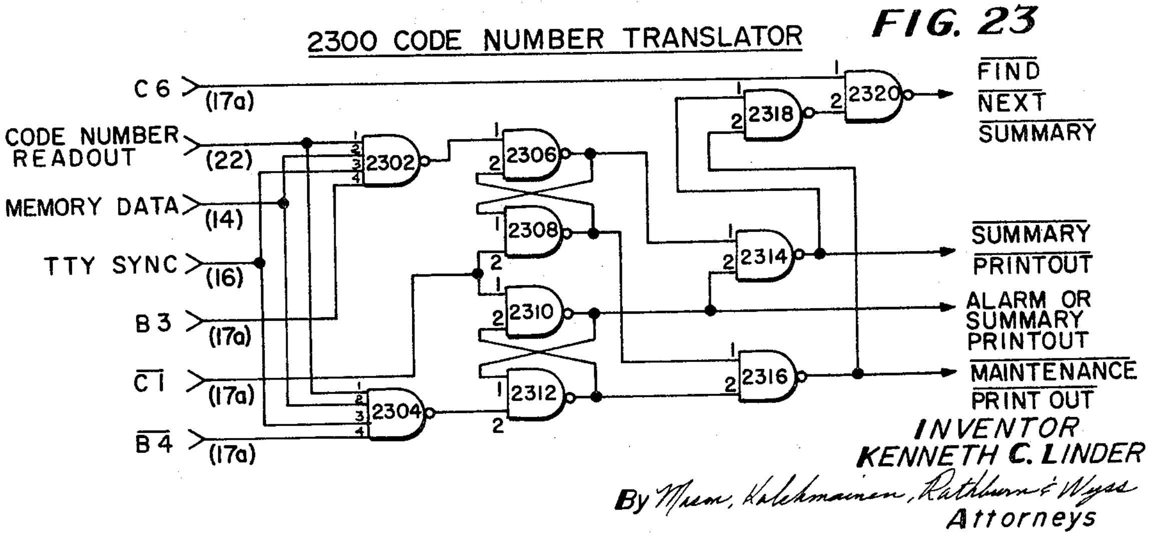

FIG. 18A is a logic diagram of the DATE TTY (date printout) format control;

FIG. 18B is a logic diagram of the H/M TTY (hours and minutes time printout) format control;

FIG. 18C is logic diagram of the A/N TTY (event location and time in seconds printout) format control, and FIG. 18D is a logic diagram of the circuitry that generates the OUTPUT ENABLE signals;

FIG. 19 is a logic diagram of the counter reset circuit 1900;

FIG. 20 is a logic diagram of the update pulse generator 2000;

FIG. 21 is a logic diagram of the overload bit detector 2100;

FIG. 22 is a logic diagram of the data shift command generator 2200;

FIG. 23 is a logic diagram of the code number translator 2300;

FIGS. 24A–24C are logic diagrams of the teleprinter signal generating logic 2400 —

Figure 25:
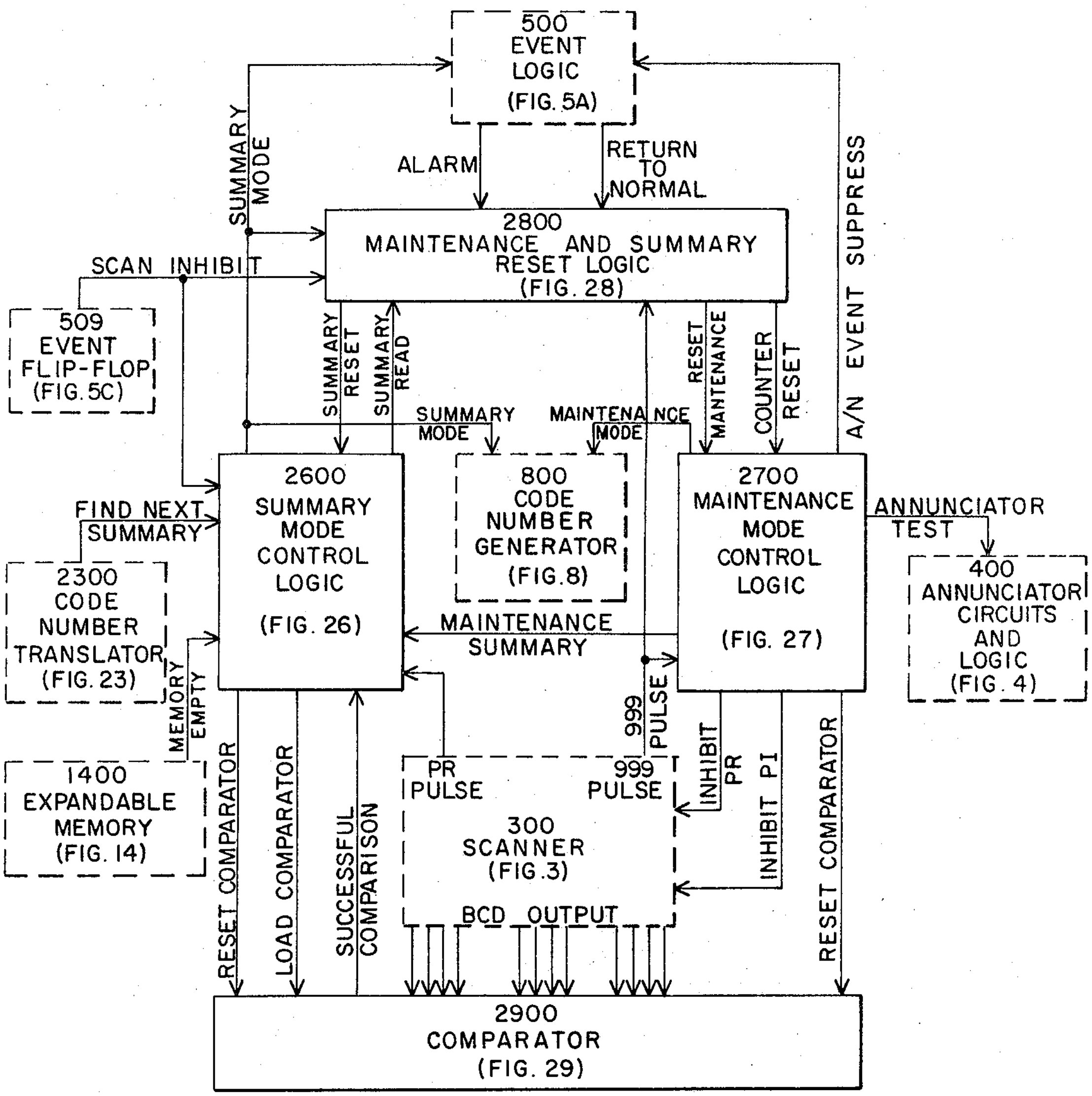

FIG. 24A is a logic diagram of the circuitry interfacing the minutes, hours, and days counters with the teleprinter, FIG. 24B is a logic diagram of the circuitry for generating all other teleprinter characters, and FIG. 24C is the teleprinter AND gate that combines the signals generated in FIGS. 24A and 24B, and forms the TELEPRINTER OUTPUT signal;

FIG. 25 is a block diagram of the maintenance and summary mode logic, showing the maintenance and summary mode logic elements as blocks enclosed by solid lines, and showing other elements of the system 100 as blocks enclosed by broken lines;

FIGS. 26A–26D are logic diagrams of the summary mode control logic 2600 —

Figure 26A:
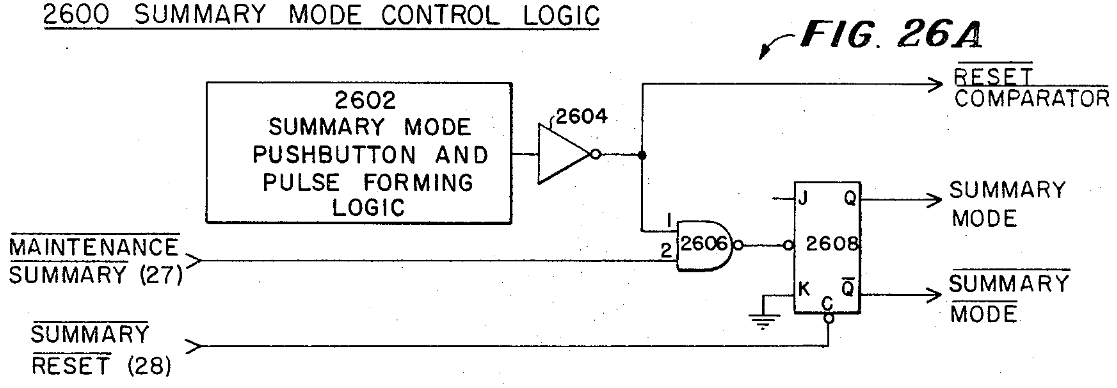
Figure 26B:
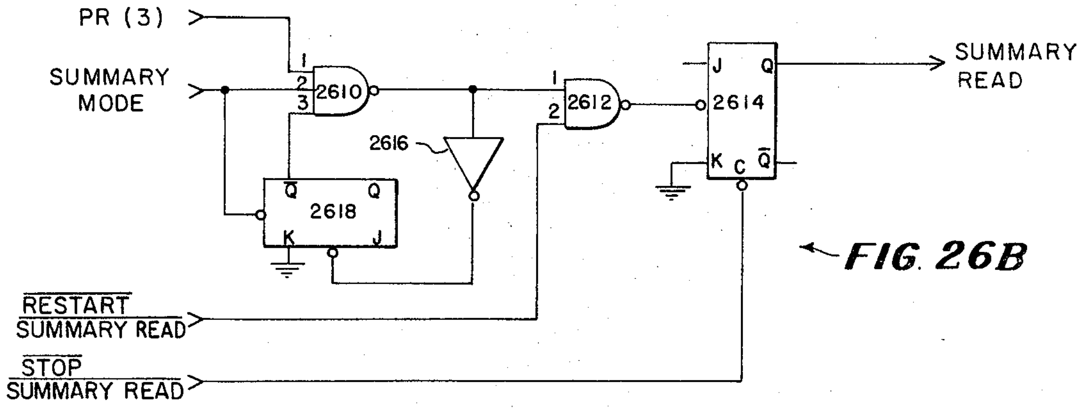
Figure 26C:
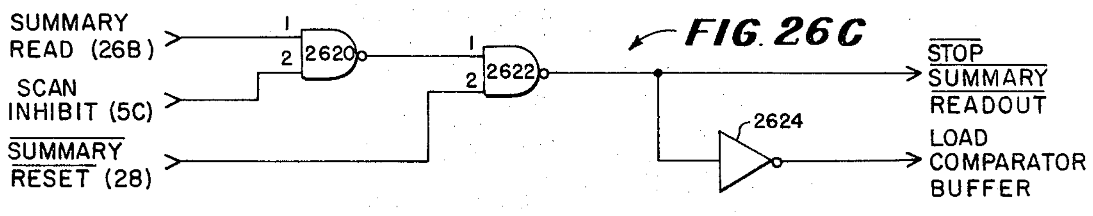
Figure 26D:
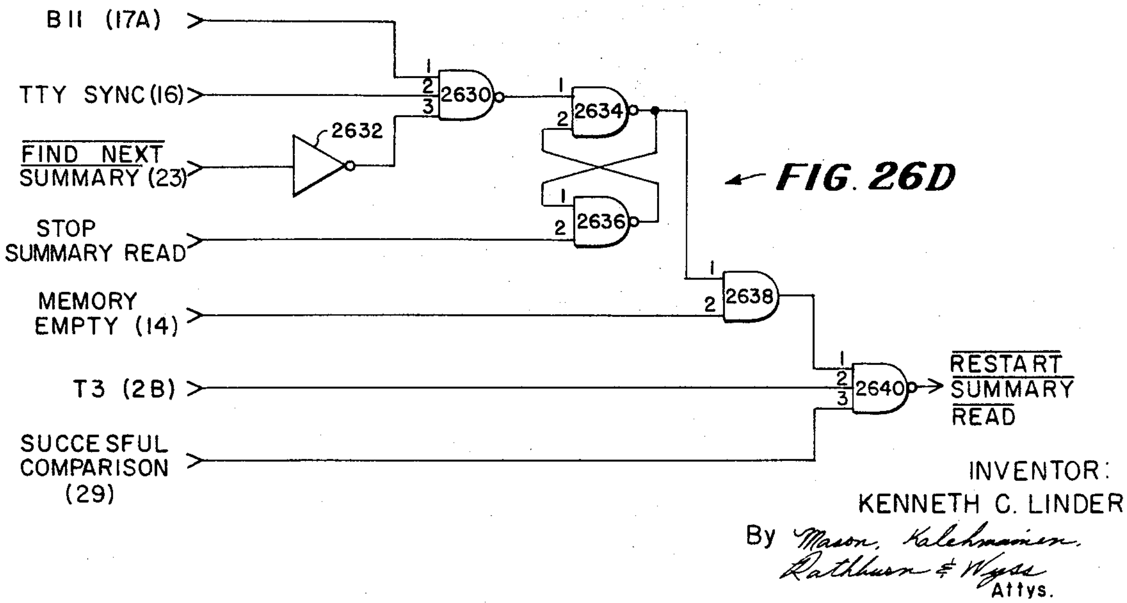
Figures 27A, 27B:
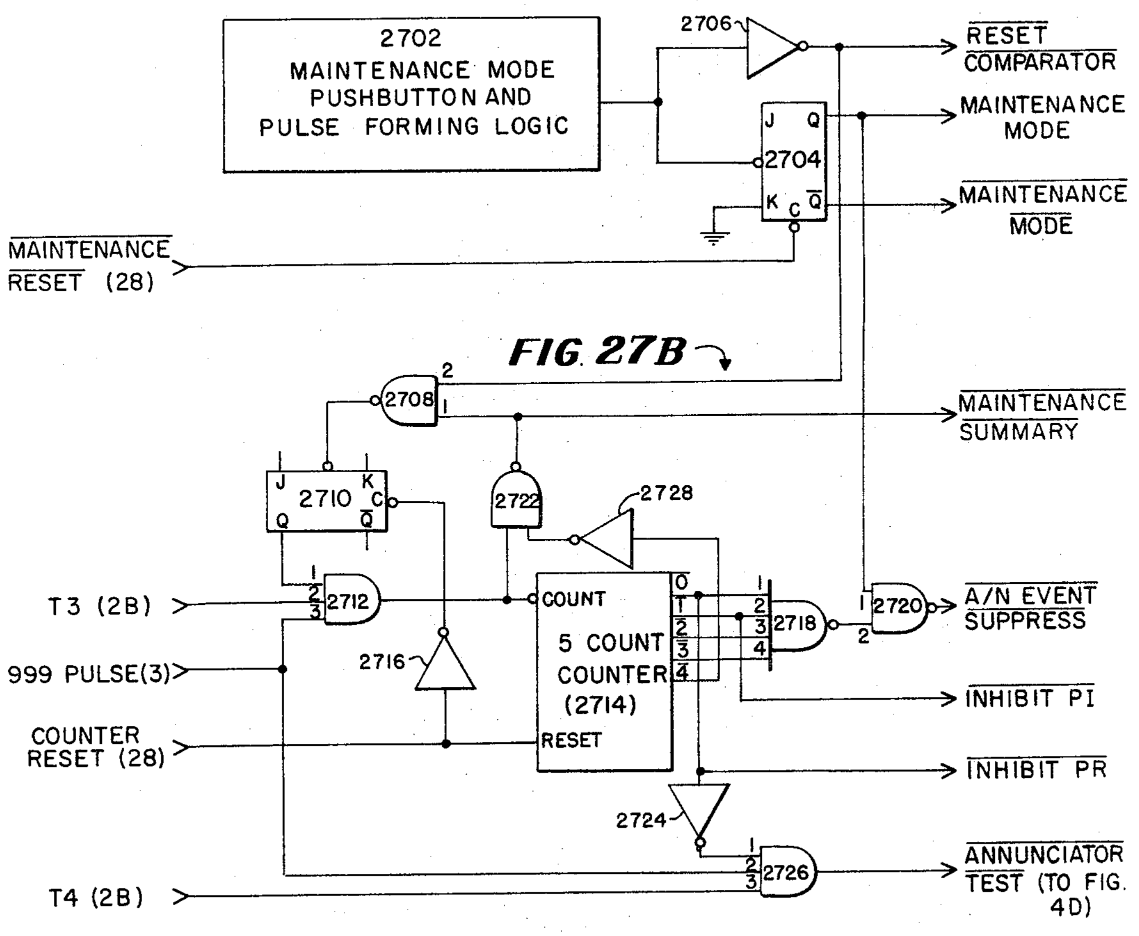

FIG. 26A is a logic diagram of the summary mode control flip-flop 2608 and associated logic, FIG. 26B is a logic diagram of the summary read flip-flop 2614 and associated logic, FIG. 26C is a logic diagram of the circuitry used to generate the inverted RESTART SUMMARY READ signal, and FIG. 26D is a logic diagram of the circuitry used to generate the inverted RESTART SUMMARY READ pulse;

FIGS. 27A–27B are logic diagrams of the maintenance mode control logic 2700 —

Figure 28:
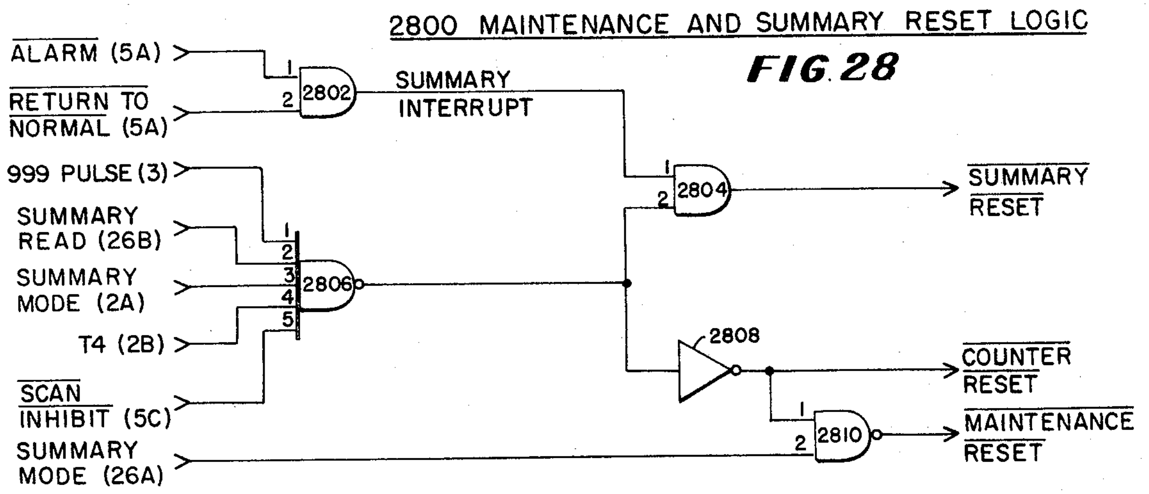
Figure 29B:
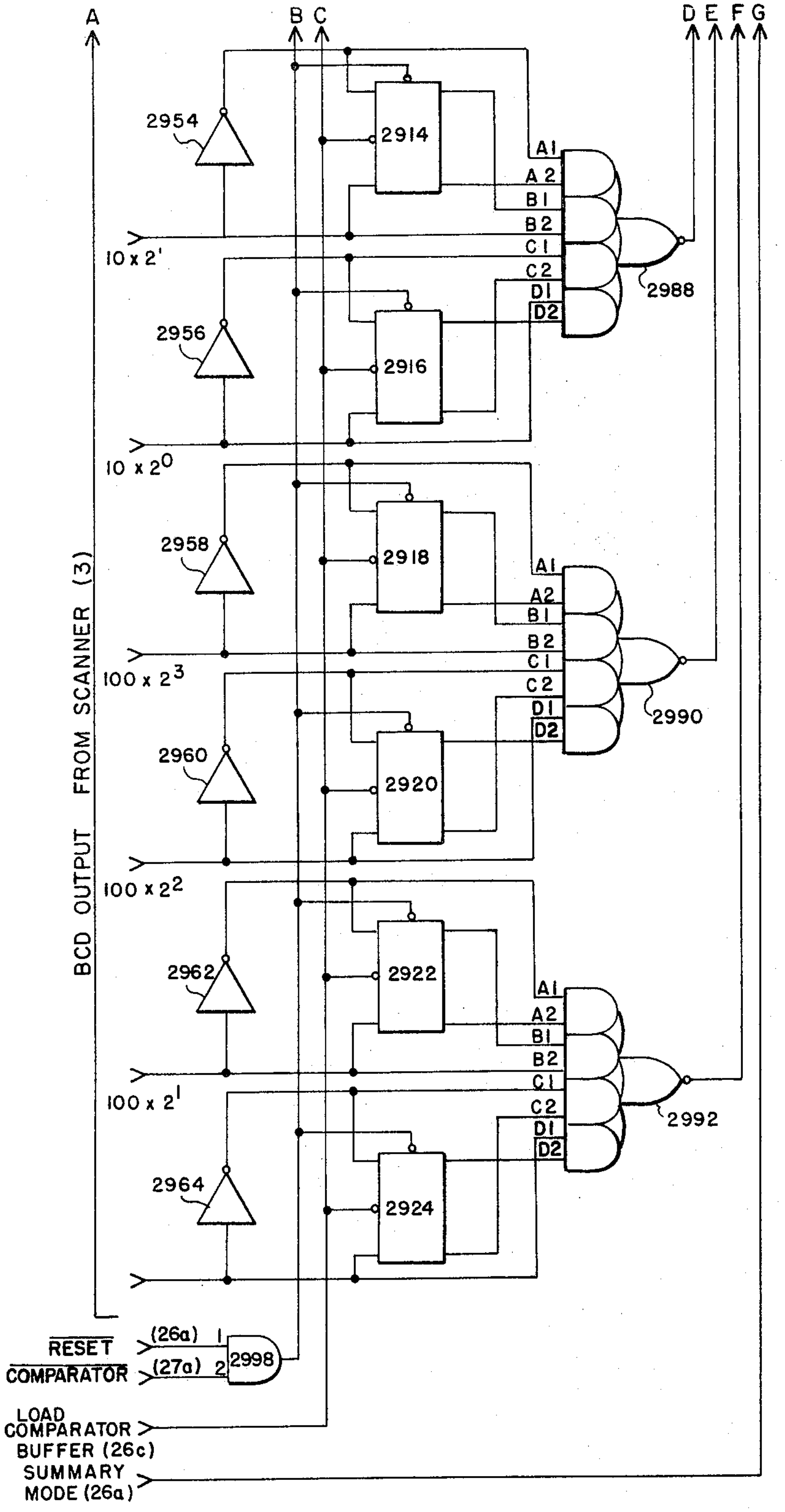

FIG. 27A is a logic diagram of the maintenance mode control flip-flop 2704 and associated logic, and FIG. 27B is a logic diagram of the maintenance mode scan counter 2714 and associated logic;

FIG. 28 is a logic diagram of the maintenance and summary reset logic 2800;

FIGS. 29A and 29B, when placed side by side, form a logic diagram of the comparator 2900;

FIG. 30 is a logic diagram of the event light 3000; and

FIG. 31 is a logic diagram of the synchronizing circuit 3100.

GENERAL DESCRIPTION

Figure 1:
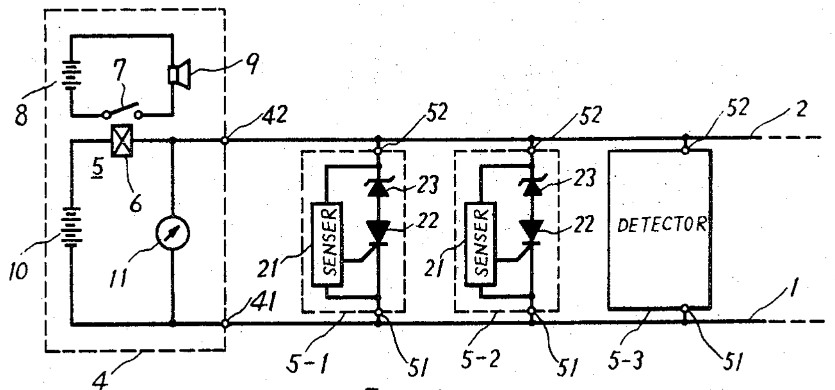
FIG. 1 is a block diagram of a monitoring system designed in accordance with the present invention.

FIG. 1 is a block diagram of a monitoring system 100 designed in accordance with the principles of the present invention. Each block in the system 100 has been assigned a reference number. The number assigned to a given block is the number of the figure where the details of that block can be found multiplied by 100. For example, details of the scanner 300 can be found in FIG. 3, details of the code number generator 800 can be found in FIG. 8, and details of the teleprinter output logic 1500 can be found in FIG. 15. All signal carrying lines interconnecting the various elements of the system 100 are shown in FIG. 1 except the lines coming from the high-frequency clock 200, and the lines shown in FIG. 25. Where two lines carrying inverted forms of the same signal exist, they are shown as a single line in FIG. 1, and the inversion is not indicated. The above notation is also followed in the block diagrams of FIGS. 15 and 25.

The system 100 can simultaneously monitor up to 1,000 different variables. Each variable is assumed to have only two states, a normal state and an alarm or abnormal state. A transition of a variable from one state to another is an event. A transition from the normal state to the abnormal state is an alarm (A) event, and a transition from the abnormal state to the normal state is a return to normal (N) event. The primary task of the system 100 is to generate a complete printed record of all events, their locations, and the times at which they occurred.

Each variable to be monitored is assigned a number and is associated with a variable monitoring switch or set of field contacts, and an annunciator circuit. The monitoring switch or field contacts are arranged to reflect the state of the associated variables — to be open when the variables are in the normal state and to be closed when the variables are in the abnormal state, or vice versa. The annunciator circuits then monitor the states of the monitoring switches and preserve a record of all alarms including momentary alarms that otherwise might be missed by the system 100. In FIG. 1, the monitoring switches and annunciator circuits are included within a block 400 that is labelled annunciator circuits and logic 400.

As each event occurs, the system 100 compiles data including the exact time of the event, the type of event, and the number of the variable that gave rise to the event. This data is compiled within an assembly shift register 700 and is fed into an expandable memory 1400. The memory 1400 then stores the data until it can be printed out upon a teleprinter 3200. If the expandable memory 1400 becomes full, as can easily happen when a large number of events occur almost simultaneously, then the individual annunciator circuits function as a secondary memory, maintaining a complete record of all the variables that entered an alarm state for even a short time.

The status of each variable is checked every 800 microseconds or so by a scanner 300 and by an event logic 500. The scanner 300 is basically a counter that counts continuously from zero to 1,000. The number contained within the scanner 300 at any given time is the number of the variable that is being checked at that time. The numerical output of the scanner 300, in decimal form, is fed to the annunciator cir-

BEST AVAILABLE COPY cuits and logic 400. The input logic of the annunciator circuits and logic 1400 is so arranged that this numerical output reaches only the annunciator circuit associated with the variable that is being checked. This one annunciator circuit is induced to transmit information to the event logic 500 over the two information lines labelled A and B. As the scanner 300 continues to count, each annunciator circuit in turn is induced to transmit information to the event logic 500. In this manner, all the variables are checked for events at least once every millisecond.

The event logic 500 determines by examining the A and B signals whether an event has occurred. The A signal indicates the status of the monitored variable, and is positive only when the variable is abnormal. The B signal is an acknowledgement signal that matches the A signal only after an event has already been scanned or acknowledged by the scanner 300. If A and B signals are not the same, this indicates that the A signal has shifted since the last scan, and therefore that an event has occurred since the last scan.

When a new event is detected in this manner, the event logic 500 determines from the A signal whether the event is an alarm (A) or a return to normal (N) event and transmits this information to a code number generator 800. The code number generator 800 generates and stores a three bit binary code number which eventually is transmitted to the teleprinter 300 and serves as an indication of the type of event which has occurred.

The event logic 500 also generates an EVENT pulse whenever a new event is detected. This pulse is stored in an event flip-flop 509. The event flip-flop 509, in response to receiving an EVENT pulse, begins generating a SCAN INHIBIT signal that is transmitted back to the scanner 300 to stop the scan. Thus, whenever a new event is found, the scanner 300 is locked at the current count. Since the current count within the scanner is the number of the variable most recently checked, and since it was this variable which gave rise to the event, the scanner now contains the number of the variable which gave rise to the event. This number is also eventually transmitted to the teleprinter 3200 and serves as an indication of which variable gave rise to the event.

Event data is collected by an assembly shift register 700. The assembly shift register 700 is a 16 bit shift register constructed from 16 flip-flops. The register 700 includes logic circuitry that allows 16 bits of data to be loaded into the sixteen flip-flops simultaneously from either of two inputs. Data pertaining to an alarm is thus loaded into the register in parallel form 16 bits at a time, and is shifted out of the register in serial form one bit at a time. Data flows out of the assembly shift register 700 over an ASSEMBLED DATA line to an expandable memory 1400.

The three bit binary code number generated by the code number generator 800 is fed to terminals 13 through 15 of the first input to the assembly shift register 700. The number locked within the scanner 300 is fed in binary coded decimal (BCD) form to terminals 1 through 12 of the first input to the assembly shift register 700. A binary coded decimal (BCD) number representing the time in seconds and in hundredths of a second is fed to terminals 1 through 12 and 14 through 16 of the second input to the assembly shift register 700. This number is generated by a seconds counter 1000 which counts pulses received from a 120 cycle clock 900. As will be explained more fully below, the counter 1000 is able to extract 100 pulses per second from the 120 pulses generated each second by the clock 900, and the counter 1000 is therefore able to break each second into 100 approximately equal parts.

Terminal 16 of the first input and terminal 13 of the second input to the assembly shift register 700 receive single bit binary data from two flip-flops, as will be explained more fully below.

The SCAN INHIBIT signal generated by the event flip-flop 509 in response to a new event is fed to an assembly shift register control logic 600. In response to the SCAN INHIBIT signal, the control logic 600 generates a series of signals which cause data to be assembled within the assembly shift register 700 and fed into the expandable memory 1400. The control logic 600 first causes the data present at the first input to the assembly shift register to be loaded into the 16 flip-flops, and shifts this data into the expandable memory 1400. Included in this first batch of data is the code number indicating the type of event, the number of the variable that gave rise to the event, and a MARKER BIT which will be discussed below. The control logic 600 then causes the data present at the second input to the assembly shift register 700 to be loaded into the 16 flip-flops and shifted into the expandable memory 1400. This second batch of data includes the time in seconds and in fractions of a second, and an OVERLOAD BIT which will be discusses below. Finally, the assembly shift register control logic 600 generates a RESET signal that resets the event flip-flop 509 and flip-flops within the code number generator 800. When the event flip-flop 509 resets, the SCAN INHIBIT signal terminates and the system 100 once again begins to scan for events. The entire process described above usually can be carried out in less than 50 microseconds, so the process of scanning for events is only interrupted for a very brief interval by the event data assembly process.

The expandable memory 1400 comprises a plurality of 32 bit shift registers connected serially to form a single shift register memory. A control flip-flop and logic circuitry associated with each 32 bit shift register provide automatic control of data flow through the memory, allowing 32 bit batches of data to flow into the memory freely, but not allowing separate batches of data within the memory to overrun each other. This special control circuitry makes it possible to expand the memory by simply inserting additional 32 bit sections of shift register and additional control flip-flops into the memory. An untrained technician can expand the memory 1400 by merely plugging additional memory boards into the system 100. Typically, the system 100 comes equipped with a single memory card containing five 32 bit shift registers, enough to store data pertaining to five events. Space is then provided within the system 100 for the insertion of up to five additional cards, giving enough memory to store data pertaining to 30 events.

When data is to be fed into the expandable memory 1400, the memory is enabled by a MEMORY LOAD ENABLE signal generated within the assembly shift register control logic 600. Data flows into and through the expandable memory 1400 at a high speed, but does not leave the memory 1400 until the memory receives a DATA SHIFT COMMAND. 32 bit groups of data pertaining to events are stored serially within the memory 1400, at the bottom or output end of the memory. Data is read out of the memory 1400 at a slow, teleprinter rate under the control of the DATA SHIFT COMMAND signal.

When data reaches the end of the expandable memory 1400, a DATA READY signal is generated by the expandable memory 1400 and sent to the teleprinter output logic circuit 1500. The teletype output logic circuit 1500 immediately generates a MOTOR CONTROL SIGNAL and sends it to the teleprinter 3200 to energize the teleprinter motor. After a suitable time during which the teleprinter motor accelerates to full speed, the teleprinter output logic circuit 1500 begins to generate a data signal for the teleprinter. First the letter D (for DATE) is generated and followed by a number retrieved from a counter 1300 and representing the number of days that have elapsed since the current year began. Next the letter T (for TIME) is generated and followed by a number retrieved from the counter 1300 and representing the time in hours and minutes. The teleprinter output logic then begins to call for MEMORY DATA from the expandable memory 1400. This is done by sending a DATA SHIFT COMMAND signal to the expandable memory 1400. The MEMORY DATA appears on a MEMORY DATA line which also connects the memory 1400 to the logic circuit 1500.

The first bit of data to come out is the MARKER BIT. The purpose of the MARKER BIT will be discussed in more detail below. For now it may be assumed that this bit is "0", and is disregarded. The next three bits to come from the expandable memory 1400 are the code number generated by the code number generator 800. These three bits represent the second through fourth bits in the teleprinter letter code for the particular type of event that occurred, e.g., the code letter A for an alarm event or the letter N for a return to normal event. These three bits are fed directly to the teleprinter 3200, and the teleprinter output logic 1500 generates the remaining bits needed to fill out the letter codes.

The next information to come from the expandable memory 1400 is the number of the variable which generated the event. This number is in binary coded decimal form. The first four bits represent the 100's digit, the second four bits represent the 10's digit, and the last four bits represent the 1's digit. Again, the teleprinter output logic 1500 feeds these signals directly to the teleprinter 3200 over the OUTPUT DATA line, and also adds the bits necessary to complete the teleprinter code for a number.

The next three bits to come from the expandable memory 1400 represent the 10's digit of the time in seconds. The teleprinter output logic 1500 generates a zero bit to fill in the fourth bit position and complete the four bit BCD number. The OVERLOAD BIT appears next, and is stored in a special flip-flop within the teleprinter output logic 1500. This bit is a "1" if and only if the expandable memory 1400 was full when this event occurred, thereby making it impossible to know exactly when the event occurred. When an OVERLOAD BIT is encountered, the teleprinter output logic immediately supresses the printout of the time in seconds, since the time in seconds contained in the memory is not the time when the event occurred, and could be misleading to a supervisory employee.

The expandable memory 1400 next feeds out three binary coded decimal numbers representing respectively the 1's digit the 0.1's digit, and the 0.01's digit of the time in seconds. These numbers and the number representing the 10's digit of the time in seconds, are fed directly to the teleprinter 3200, and again the teleprinter output logic 1500 generates the necessary bits to fill out the teleprinter code for a number. This completes the printout for a typical event.

A marker bit flip-flop and logic circuit 1100 is interposed between the seconds counter 1000 and the minutes, hours, and days counters 1300. Normally one pulse per minute (1ppm) passes from the seconds counter 1000, through the marker bit flip-flop and logic 1100, and on to the minutes, hours, and days counter 1300. When this pulse leaves the marker bit flip-flop and logic 1100, it is called the MINUTES COUNTER ADVANCE pulse. This pulse advances the minutes counter every time the seconds counter advances from 59.99 seconds to 00.00 seconds.

Since only the time in seconds is recorded for each event, it is necessary to prevent the minutes, hours, and days counter from advancing while event data is within the expandable memory 1400. If the minutes counter were permitted to advance after an event has occurred and prior to the printout for that event, there would be a 1 minute error in the time as printed out. To prevent this from happening, the marker bit flip-flop and logic circuit 1100 diverts and 1 PPM pulses which occur during the time an event is within the expandable memory 1400, and stores the pulses in a marker bit flip-flop until the event printout is completed. When the printout is completed, as indicated by an OUTPUT ENABLE signal generated by the teleprinter output logic 1500, the pulse is transmitted from the marker bit flip-flop to the minutes counter over the MINUTES COUNTER ADVANCE pulse line. This diversion of 1 PPM pulses begins when the marker bit flip-flop and logic receives a SET TIME pulse from the assembly shift register 700. The SET TIME pulse is generated when the time in seconds and fractions of a second is loaded into the second input of the assembly shift register 700.

If a first event is followed by a 1 PPM pulse from the seconds counter 1000 and then by a second event, some means must be provided for indicating that the minutes counter must be advanced before the record of the second event is printed out, so that a supervisory employee will know that the second event took place during a different minute. The MARKER BIT performs this task. The MARKER BIT is a diverted 1 PPM pulse that has been stored in the marker bit flip-flop. When data pertaining to the second event is read into the assembly shift register, the MARKER BIT is applied to input 16 of the first input to the assembly shift register 700. After the MARKER BIT has been read into the register 700, the SET TIME pulse clears the marker bit flip-flop and prepares it to receive another 1 PPM pulse.

The MARKER BIT flows through the expandable memory 1400 along with other data pertaining to the second alarm, and is the first bit of information to reach the teleprinter output logic 1500. In response to a MARKER BIT that is a "1", the teleprinter output logic 1500 generates an UPDATE pulse that passes through the marker bit flip-flop and logic 1100 and on to the minutes counter over the MINUTES COUNTER ADVANCE pulse line. The teleprinter output logic 1500 then reprints the time in hours and minutes before printing out a record of the second event.

The great advantage of using a MARKER BIT is that is is then unnecessary to store the time in days, hours, and minutes within the expandable memory 1400 for each event. It is only necessary to store the time in seconds and in fractions of a second, and also the MARKER BIT. Only 16 bits of storage space are required to store the marker bit and the time in seconds. If a complete record of the time and date were stored, 37 bits of storage space would be required. This would mean that the memory 1400 would have to be more than twice its present size to hold a complete record of the same number of events. By reducing the size of the memory required, the MARKER BIT procedure significantly lowers the cost of the system 100.

When the teleprinter output logic 1500 initiates a printout, it illuminates an event light 3000. The event light 3000 stays illuminated until a supervisory employee presses an acknowledgement button. The event logic 3000 functions as an alarm that signals the occurance of an event. If desired, the event light 3000 can be used to initiate an audible horn signal or some other suitable warning device.

If several systems such as the system 100 are used together, they all may be synchronized in time by a means or a synchronizing circuit 3100. One system is selected as a master, and the others are made slaves. Whenever the hours counter advances in the master system, the HOURS COUNTER ADVANCE pulse from that system resets the seconds and minutes counters in the slave systems, and locks the slaves into synchronization with the master.

EXPLANATION OF LOGIC DIAGRAMS

In accordance with the preferred practice of electronic circuit designers, the details of the system 100 are represented by logic diagrams rather than by circuit diagrams. In constructing the system 100, each logic element shown is replaced by an equivalent electrical circuit that can perform the logical task defined by the logic element. The use of logic elements emphasizes that any of the many differing electrical circuits capable of performing a logical task may be used in constructing the present invention.

Inputs to logic diagrams and circuit diagrams throughout this disclosure are labelled with the names of the signals, and also with the number of the figure where that signal is generated. If the SCAN INHIBIT signal is used in a particular diagram, an input lead will be labelled SCAN INHIBIT (5C). This indicates that the source of the SCAN INHIBIT signal can be found in FIG. 5C. Outputs from logic diagrams are labelled with the names of signals, but no indication is made of where the signals go. Outputs can usually be traced by referring to one of the block diagrams (FIGS. 1, 15, or 25).

In the system 100, a positive potential normally represents a "1", "TRUE", or "PRESENT" signal, and a ground potential normally represents a "0", "FALSE", or "ABSENT" signal. Throughout this specification, the proper names of signals are written entirely in capitals, for example: "SCAN INHIBIT signal".

Signals are often encountered in an inverted form. This is indicated in the drawings by an overline or bar drawn over the signal name, for example: "$\overline{\text{SCAN INHIBIT}}$" (FIG. 5C). In this specification, inversion is indicated by placing the word "inverted" before the proper name of the signal. In this case of an inverted signal, a ground potential represents a "1", "-TRUE" or "PRESENT" signal, and a positive potential represents a "0", "FALSE", or "ABSENT" signal.

The preferred embodiment of the system 100 is constructed almost entirely from transistor-transistor integrated circuit logic elements purchased from Texas Instruments Inc., of Houston, Tex. The fundamental element in the transistor-transistor logic system is the NAND gate, for example the typical NAND gate 212 shown in FIG. 2C. The NAND gate 212 has two inputs labelled input 1 and input 2, and a single output which is not labelled. The D-shaped figure enclosing the number 212 is the standard logic symbol for an AND gate. The circle separating this D-shaped figure from the output lead signifies an inversion of the output signal, and therefore designates this unit a NEGATIVE AND or NAND gate. The output lead from this unit is positive at all times except when the inputs are both positive, in which case the output is at ground potential.

A typical AND gate 215 is shown in FIG. 2E. Note that there is no circle separating the output lead of the AND gate 215 from the letter D. AND gates are conveniently formed by connecting a NAND gate in series with an inverting or NOT gate.

An AND OR NAND gate is "enabled" when all of its inputs save one or two are positive, thereby making the gate output signal entirely dependant upon the one or two remaining input leads. A single ground level input to an AND or NAND gate is said to "disable" the gate by preventing the state of the other input leads from affecting the output signal. When a gate is enabled, it passes signals and pulses. When a gate is disabled, it blocks signals and pulses.

Inverting or NOT gates such as the NOT gates 201, 202, and 203 shown in FIG. 2A, are represented by the conventional triangular amplifier symbol with a circle separating the output lead from the triangle to indicate inversion. These are conveniently formed from NAND gates having their inputs wired together in parallel.

A typical AND-NOR device 2982 is shown in FIG. 29A. This device includes a series of input AND gates, the outputs of which are fed into a NOR gate. The output of this device is normally positive. It goes negative whenever both inputs to any one AND gate are both positive.

One NOR gate is included in this disclosure, the NOR GATE 1616 shown in FIG. 16. The output of the NOR gate 1616 is positive if and only if both of the input leads are at ground potential. If either input leads is positive, then the output is at ground potential.

Two types of flip-flops are used in the system 100. The first type is constructed by connecting two NAND gates together with the output of one connected to the input of the other and vice-versa. A typical example is the flip-flop 801-802 in FIG. 8, constructed from the two NAND gates 801 and 802. The second type of flip-flop is the standard JK flip-flop, such as the flip-flop 230 shown in FIG. 2F. These flip-flops can have up to seven leads. The two output leads are labelled Q and $\overline{Q}$, and represent the flip-flop output signal and the inverted flip-flop output signal respectively. Set and clear leads are labelled S and C respectively when they are present. It will be noted that the set and clear leads are separated from the flip-flops by circles. These circles indicate that the flip-flop is set or cleared by a ground level signal, rather than by a positive signal. J and K inputs are usually drawn opposite the Q and $\overline{Q}$ inputs, and will be explained below. The clock, count, or toggle input lead is not indicated by a letter, but always appears in the middle of one side of the flip-flop. This lead is also separated from the body of the flip-flop by a circle, indicating inversion.

When the clock input of a JK flip-flop goes positive, data is read into the J and K terminals and stored. When the clock lead goes negative, this data is transferred to the Q and $\overline{Q}$ outputs and becomes the flip-flop output. When both the J and K terminals are either open circuited or connected to a positive potential source, the flip-flop toggles whenever the clock lead goes from positive to negative. If both the J and K terminals are connected to a ground potential, the flip-flop remains in the same state and does not toggle. When a set or clear terminal is included in a flip-flop, the flip-flop may be set and clared directly. A flip-flop is cleared by applying a ground level signal to the clar or C terminal. This causes a positive potential to appear at the $\overline{Q}$ output and a ground level signal to appear at the Q output. A flip-flop is set by grounding the S terminal. This causes a positive signal to appear at the Q terminal and a ground level signal to appear at the $\overline{Q}$ terminal.

While Texas Instruments' transistor-transistor logic is used in the preferred embodiment of the system 100, it is to be understood that this choice of logic circuitry is arbitrary and that any other line of high speed integrated circuit logic could have been used as well in the construction of this device. For example, all of the NAND gates used could be replaced by NOR gates or other equivalent logic circuits, and all of the flip-flops can be replaced by equivalent flip-flops having somewhat different input and output arrangements. If desired, the logical elements of the system 100 can be built up from descrete transistors, resistors, and capacitors in accordance with the practice that was customary prior to the availability of integrated circuits.

The internal circuitry of the individual logical elements are not relevant to the present invention and are therefore not disclosed in the present application. Chapter 11 of the book *Integrated Circuit Engineering-Basic Technology*, fourth edition, by the staff of Integrated Circuit Engineering Corporation, Glen R. Mudland et al., Published in 1966 by Boston Technical Publisher Inc., Cambridge, Mass., gives a rather complete explanation of digital integrated circuits suitable for use in the system 100. An explanation of transistor-transistor-logic beings on page 206, and several typical transistor-transistor-logic NAND gate circuits are shown in page 209. An explanation of JK flip-flops is given on page 214, although the flip-flop shown would require minor modification before it could be used in the preferred embodiments of the system 100. Additional background on the use of logic diagrams and integrated circuits can be found on pages 149 through 162 of *ELECTRONICS*, Vol. 40, No. 5, Mar. 6, 1967. Transistor-transistor-logic NAND circuits are shown in page 155, and a discussion of flip-flops beings on page 159. A short discussion of AND-NOR logic elements and their use also appears on page 159.

HIGH-FREQUENCY CLOCK

FIGS. 2A through 2G illustrate the details of a high frequency clock 200 suitable for use in the present invention. FIG. 2G is a timing diagram illustrating the relative timing of the various timing pulses generated by the high frequency clock 200. The details of the clock logic are not important; it is only important that the clock output timing pulses are in accord with FIG. 2G.

Referring to FIG. 2G, it can be seen that the clock generates a large number of timing pulses. The basic clock timing pulses appear at the top of the diagram. Next come the T series of timing pulses. A T1 timing pulse appears and is followed by T2 timing pulse, which in turn is followed by a T3 timing pulse and a T4 timing pulse. The T4 timing pulse is followed once again by a T1 timing pulse. The $P_t$ timing pulses are formed by combining adjacent T2 and T3 timing pulses into a single pulse, as can be seen. The series of S timing pulses are shown next. Each S timing pulse encompasses a complete set of T timing pulses. The four S timing pulses are followed by a series of 32 MEMORY SHIFT pulses, and these in turn are followed by four more S timing pulses. Each $S_0$ timing pulse starts with the termination of a T1 timing pulse, and encompasses the T2, T3, T4 and T1 timing pulses which follow. The S1 timing pulses are similar to the $S_0$ timing pulses and commence upon the termination of the $S_0$ timing pulse. Similarly, the S2 timing pulses follow the S1 timing pulses, and the S3 timing pulses follow the S2 timing pulses. After each S3 timing pulse, the first of the 32 MEMORY SHIFT pulses occur. The MEMORY SHIFT pulses usually occur simultaneously with the T1 timing pulses. After the 16th MEMORY SHIFT pulse, a 16 COUNT timing pulse appears. This pulse is similar to an S timing pulse and lasts for the same length of time. A DIVIDE BY 36 signal goes positive with the trailing edge of each 32d MEMORY SHIFT pulse, and remains positive until the trailing edge of the following S3 pulse. This signal is called the DIVIDE BY 36 signal because it reoccurs once for every 36 T1 timing pulses. Note that the DIVIDE BY 36 signal is positive only during the time intervals when the MEMORY SHIFT pulses are not generated.

The above series of clock timing pulses are needed to control the scanning process, and to control the transfer of data within the system 100. The T timing pulses are used primarily in the scanning process. The T4 timing pulses advance the scanner counter to a new number, and the $P_I$ timing pulse reads data out of the scanned annunciator circuit and transfers it to the event logic circuit 500.

When an event is encountered, the scanner 300 locks, and the assembly shift register 700 is enabled by a SCAN INHIBIT signal, as explained above. The next S2 timing pulse initiates the process of loading data into the assembly shift register 700. During the S2 timing pulse a MEMORY LOAD ENABLE signal is generated by the assembly shift register control logic 600. This signal initiates the process of loading the assembly shift register 700. During the immediately following S3 timing pulse data is loaded into the assembly shift register 700 from the first input, as shown in FIG. 1. A chain of 16 MEMORY SHIFT pulses then transfers the 16 bits of data from the assembly 700 into the expandable memory 1400. The 16 COUNT timing pulse then loads data into the assembly shift register 700 from the second input, and the next 16 MEMORY SHIFT pulses transfer the second 16 bits of data into the expandable memory 1400. An S1 timing pulse is then used to reset the data receiving circuitry and to reinitiate the scanning process.

Referring now to FIGS. 2A through 2F, a suitable logic circuit for generating the signals shown in FIG. 2G is shown. FIG. 2A illustrates a crystal oscillator circuit which drives a divide by four flip-flop counting circuit having four output leads labelled A, B, C, and D. An output signal from the crystal oscillator itself is called the CLOCK timing signal, and is occassionally used in other parts of the system 100 to trigger flip-flops and for other such tasks. The crystal oscillator comprises a series flip circuit containing two inverting amplifiers 201 and 202 and the crystal 240. The first inverting amplifier 201 is bypassed by a 150 ohm resistor. The output of the inverting amplifier 202 connects to a NOT gate 203. The output of the gate 203 is the CLOCK timing signal. This signal is fed to the clock terminals of two flip-flops 213 and 214.

The two flip-flops 213 and 214 are connected together to form a closed loop shift register or ring counter by interconnecting the Q and $\overline{Q}$ terminals with the J and K terminals as shown. Note that the Q terminal of the flip-flop 213 connects to the J terminal of the flip-flop 214, but that the Q terminal of the flip-flop 214 connects to the K terminal of the flip-flop 213. This causes data to be inverted when it passes from the flip-flop 214 to the flip-flop 213. The circuit is thus a switch tail ring counter circuit. Assuming that both flip-flops are initially in the $\overline{Q}$ state, and that the crystal oscillator is functioning: first the flip-flop 213 shifts into the Q state; then the flip-flop 214 shifts into the Q state; the flip-flop 213 then shifts back into the $\overline{Q}$ state; and finally the flip-flop 214 also shifts back into the $\overline{Q}$ state. By connecting NAND gates to differing pairs of the four flip-flop output terminals, it is possible to derive the four different T timing signals from this counter circuit.

As shown in FIG. 2B, the T1 timing pulses are derived by connecting a NAND gate 204 and a NOT gate 208 to the A and B outputs of the circuit shown in FIG. 2A. Similarly, the T2, T3, and T4 timing pulses are also derived by connecting NAND gates 205–207 and NOT gates 209–211 to appropriate outputs of the counter circuit shown in FIG. 2A.

The $P_I$ pulse is derived by feeding the inverted forms of the T2 and the T3 timing pulses into a NAND gate 212, as shown in FIG. 2C.

FIG. 2E shows a second counting circuit comprising two flip-flops 216 and 217 and an AND gate 215. The T1 timing pulses and the DIVIDE BY 36 signal are fed into the AND gate 215. When the DIVIDE BY 36 signal is positive, the AND gate 215 is enabled and allows T1 timing pulses to reach the clock terminals of the two flip-flops 216 and 217. These two flip-flops function as a conventional binary counter. The flip-flop 216 toggles with each clock pulse. The J and K terminals of the second flip-flop 217 are connected to the Q output of the first flip-flop 216, so the flip-flop 217 toggles once for every two toggles of the flip-flop 216.

FIG. 2D shows a series of NAND gates 218–221 and NOT gates 222–225 which generates the S timing pulses. These NAND gates are connected to the counter circuit of FIG. 2E in a manner similar to the way in which the NAND gates used to generate the T1 timing pulses are connected to the counter circuit shown in FIG. 2A. The DIVIDE BY 36 signal is also fed into the four NAND gates 218–221 to suppress any output when the DIVIDE BY 36 signal is negative.

FIG. 2F shows the circuitry used to generate the MEMORY SHIFT pulses and the 16 COUNT timing pulses. The MEMORY SHIFT pulses are T1 pulses which pass through a NAND gate 226 and a NOT gate 231. The MEMORY SHIFT pulses are counted by a 32 COUNT counting circuit comprising the flip-flops 232–236. An AND GATE 237 is connected to the outputs of the flip-flops 232–236 in such a way that it generates the 16 COUNT pulse after the 16th MEMORY SHIFT pulse is generated.

The DIVIDE BY 36 signal is generated by the flip-flop 238 shown in FIG. 2F. When the DIVIDE BY 36 signal is positive it enables the NAND gate 215 (FIG. 2D), and the S timing pulses are generated. When the DIVIDE BY 36 signal is negative, an inverted DIVIDE BY 36 signal enables the NAND gate 226 (FIG. 2F), and the MEMORY SHIFT pulses are generated. The DIVIDE BY 36 signal goes positive when the trailing edge of the 32d MEMORY SHIFT pulse toggles the flip-flops 232–236 back into the $\overline{Q}$ state. The Q output of the flip-flop 236 applies a negative level change to the CLOCK input of the flip-flop 238. This negative level change toggles the flip-flop 238 into the Q state, and causes the DIVIDE BY 36 signal to go positive. Thus, a new series of S timing pulses is generated after each set of 32 MEMORY SHIFT pulses. The DIVIDE BY 36 signal goes to ground towards the end of each S3 timing pulse. The S3 timing pulse enables a NAND gate 229 to pass a composite signal, formed by combining the CLOCK timing signal with the T1 timing signal, to the CLOCK input of a flip-flop 230. This composite signal toggles the flip-flop 230 into the $\overline{Q}$ state. The Q output of the flip-flop 230 is fed to the CLEAR (C) terminal of the flip-flop 238. The flip-flop 238 is left in the $\overline{Q}$ state after it is cleared, and the DIVIDE BY 36 signal is left at ground level. The inverted DIVIDE BY 36 signal enables the NAND gate 226, and the generation of MEMORY SHIFT pulses commences once again. The first MEMORY SHIFT pulse to be generated is applied in inverted form to the CLEAR input of the flip-flop 230 to return this flip-flop to its rest state.

The above-mentioned composite T1 and CLOCK timing signal is formed by the NAND gate 227 and the NOT gate 228, as is shown in FIG. 2F.

SCANNER

Referring now to FIG. 3, there is shown a logic diagram of the scanner 300. The scanner is basically a conventional counting circuit that counts from 0 up to 1,000. Three binary coded decimal (BCD) counters 305, 308, and 311 are used to count from 0 to 999, and a flip-flop 315 is used to store the count 1,000. When the flip-flop 315 is enabled by the counter 311 resetting, it allows a T2 pulse to pass through a NAND gate 316 and clear a flip-flop 317, which generates a $P_R$ pulse. The $P_R$ pulse continues until the next T4 pulse resets the flip-flop 317 by toggling it back into the Q state. During the time while the $P_R$ pulse signal is positive, the NAND gate 314 is enabled, and a T1 pulse is allowed to clear the flip-flop 315. The scanner thus counts from 0 to 1,000, and then generates a $P_R$ pulse that lasts for the duration of a T2 and a T3 pulse. The Q output of the flip-flop 317 inhibits the AND gate 304 during the $P_R$ pulse, and thus prevents the scanner from counting during the $P_R$ pulse.

The scanner 300 advances one count with each T4 pulse. T4 pulses are fed into the AND gates 304, 307, and 310 which respectively feed the three BCD counters 305, 308, and 311. The first and second inputs of the gate 304 are normally positive, so this gate normally will pass the T4 pulses to the counter 305. An inverted SCAN INHIBIT signal is applied to the second input of the gate 304. This input goes to ground during a SCAN INHIBIT, disabling the gate 304 and preventing the T4 pulses from reaching counter 305. The gate 307 is similarly disabled during a SCAN INHIBIT signal, because the output of the gate 304 is connected to the third input of the gate 307. Similarly, the output of the gate 307 is connected to the third input to the gate 310, and disables the gate 310. Thus, all three of the gates 304, 307, and 310 are disabled and the scanner is prevented from counting during a SCAN INHIBIT.

The counter 305 counts from 0 up to 9 and then resets back to 0. When the count reaches 9, the $2^0$ and the $2^3$ outputs of this counter are both positive. These two outputs are fed into the AND gate 307, enabling the AND gate 307. The next T4 pulse advances the counter 305 to zero count, and also passes through the AND gate 307 and advances the counter 308. In this manner, the counter 308 advances one count every time the counter 305 resets to zero. The AND gate 310 interconnects the counters 308 and 311 in the same manner as the AND gate 307 interconnects the counters 305 and 308, so the counter 311 advances one count every time the counter 308 resets to zero. The three counters are thus able to count from 0 to 999.

The four output leads from each counter are the binary coded decimal representation of the number contained in the counter. These leads connect to the first input of the assembly shift register 700, as shown in FIG. 1. They also connect to three binary-to-decimal converters 306, 309 and 312 shown in FIG. 3. The three converters each have 10 output leads which are enabled sequentially in response to the advancing binary coded decimal count received from the counters. The converters use conventional binary coded decimal to decimal conversion circuits. The first converter 306 includes output gating circuitry such that no output can appear until the gate terminal goes positive. Normally the $P_I$ pulse generated within the clock is applied to this gate terminal through an AND gate 313, so that one of the leads at the output of the converter 306 is energized during each successive pair of T2 and T3 pulses. The $P_I$ pulse is thus the interrogation pulse which interrogates the individual annunciator circuits. The gate 313, however, includes three other leads which all must be positive if the $P_I$ pulse is to enable the converter 306. Normally these three leads are positive. The second lead goes negative when the flip-flop 315 is in the $\overline{Q}$ state. This happens during the generation of the $P_R$ pulse. This prevents a $P_I$ pulse from interrogating an annunciator circuit during the $P_R$ pulse. A third input to the AND gate 313 is connected to the inverted SCAN INHIBIT signal. This prevents $P_I$ pulses from interrogating the annunciator circuits during a SCAN INHIBIT. A fourth input to the AND gate 313 is supplied with an inverted INHIBIT $P_I$ signal that is generated only during the maintenance mode of operation. Maintenance mode will be explained in detail below.

An inverted $P_R$ pulse appears at the Q output of the flip-flop 317, and is applied to the second input of a NAND gate 302. Normally both of the inputs of the NAND gate 302 are positive, and $P_R$ pulses appear at the output of the gate 302. During a scan inhibit, however, no $P_R$ pulses are generated, since the scan count never reaches 1000. As will be explained below, it is necessary to generate substitute $P_R$ pulses to insure that a record of all alarms is maintained within the individual annunciator circuits. Substitute $P_R$ pulses must therefore be generated during a scan inhibit. An inverted SCAN INHIBIT signal enables a NAND gate 301 and allows the NAND gate 301 to generate an output pulse during the T2 part of an S2 pulse. Each reoccurrance of the S2 pulse then generates a substitute inverted $P_R$ pulse which is applied to the first input to the NAND gate 302, and which appears at the output of the gate 302.

The output of the NAND gate 302, including both regular and substitute $P_R$ pulses, is fed into the second input of an AND gate 303. The first input to the AND gate 303 is connected to an inverted INHIBIT $P_R$ signal, which is generated only during certain portions of the maintenance mode of operation. This inverted INHIBIT $P_R$ pulse prevents $P_R$ pulses from passing through the AND gate 303 at certain times. The output of the gate 303 is called the GATED $P_R$ signal. This signal is fed to all the individual annunciator circuits.

The scanner 300 also includes an AND gate 320 that is used to generate a 999 pulse when the scanner reaches a count of 999. This AND gate is connected to the outputs of the various counters, as shown in FIG. 3. When a count of 999 is reached, all four of the input leads to this AND gate are positive, and the output goes positive. This 999 pulse is used in the summary and maintenance modes of operation, and is also used to reset the memory full flip-flop 1204 in FIG. 12, as will be explained.

ANNUNCIATOR CIRCUITS AND LOGIC

FIGS. 4A through 4E illustrate how individual annunciator circuits are connected into the system 100. Since it is impracticable to disclose all of the 1,000 annunciator circuits which can be included in the system 100, FIG. 4 shows how a typical annunciator circuit and typical groupings of annunciator circuits are connected.

A typical annunciator circuit is shown in FIG. 4D. One such annunciator circuit is required for each variable which is to be monitored. Any number of annunciator circuits up to 1,000 can be incorporated into the system 100. It is understood, of course, that more than 1,000 annunciator circuits could be incorporated into the system if other parts of the system were suitably modified to handle a larger number.

In the system 100, sets of 10 annunciator circuits are mounted upon a single circuit card. These cards are called point cards. A typical point card is illustrated in FIG. 4C. Each of the 10 annunciator circuits included in the typical point card has two inputs labelled respectively X and Y. The X input of each annunciator circuit connects to one of the units decimal output leads coming from the scanner 300 (FIG. 3). Note that each lead coming from the units decimal output of the scanner connects to a different annunciator circuit on each point card, so that when one of the units decimal output leads is energized, it energizes only one annunciator circuit on each point card. The Y inputs of the annunciator circuits on each card are connected in parallel, and are fed by the output signal from an AND gate 402. The AND gate 402 has two inputs which are respectively labelled Z and W. Both of these inputs must be energized if the Y inputs to the annunciator circuits on a point card are to be energized.

The point cards are arranged in groups of 10 within the system 100. A typical set of 10 point cards is shown in FIG. 4B. The W input to each point card within a typical set connects to one of the 10 decimal output leads coming from the scanner 300 (FIG. 3). Note that each lead from the 10 decimal output connects to a different point card within the typical set, so that when one of the 10 decimal output leads is energized, it energizes the W input to only one point card within each set of 10 point cards. The Z inputs to the point cards within a typical set of 10 are connected in parallel, and are connected to a Q input terminal. Each set of point cards has its own Q input terminal.

FIG. 4A illustrates how the 10 different sets of ten point cards are connected into the system 100. The Q input to each set of 10 point cards connects to one of the hundreds of decimal output leads coming from the scanner 300 (FIG. 3). Each lead from the hundreds decimal output connects to a different set of 10 point cards. When one of the hundreds decimal output leads is energized, it energizes the Q input to only one set of 10 point cards.

Each annunciator circuit generates an $\overline{A}$ and a $\overline{B}$ signal. As shown in FIG. 4E, the A signals from all annunciator circuits are fed into a NAND gate 490 to generate an A signal, and the $\overline{B}$ signals from all of the annunciator circuits are fed into a NAND gate 492 to generate a B signal. At any given moment, all of the $\overline{A}$ and $\overline{B}$ signals are positive with the exception of the signals generated by a particular annunciator circuit selected by the scanner 300. The $\overline{A}$ and $\overline{B}$ output signals from the selected annunciator circuit will carry the A and B data from that annunciator circuit through the two gates 490 and 492 and on to the event logic 500.

An example will explain how this works. Assume that the scanner 300 is at a count of 392. Referring to FIG. 4A, decimal output line 300 from the scanner is energized and applies a positive potential to the Q input of the fourth set of 10 point cards. The Q inputs to all other sets of 10 point cards will be at ground potential. Referring now to FIG. 4B, the 90 decimal output line from the scanner is energized and applies a positive potential to the W terminal of the sixth point card within each typical set of 10 point cards. All of the other W inputs to point cards will be at ground potential. Referring now to FIG. 4C, the decimal output lead 2 from the scanner is energized (only during the $P_I$ interrogation pulse, as noted above) and applies a positive potential to the X terminal of the third annunciator circuit upon each point card. All of the X terminals to the other annunciator circuits are at ground potential. To energize an annunciator circuit it is necessary to energize both the X and the Y inputs to the annunciator circuit simultaneously. Only the third annunciator circuit on each card has a positive potential fed into its X input, so only these annunciator circuits need be considered. It is necessary to determine which point card also has a positive potential Y signal. For a positive potential Y signal to exist, both the Z and the W inputs to the point card must both be positive. Since the Z input to each point card connects to the Q input of that set of 10, only the cards within the fourth group of 10 shown in FIG. 4A will have a positive potential applied to their Z inputs. Within that group, only the sixth card has a positive potential applied to its W terminal. Therefore, the only annunciator circuit energized when the scanner is at a count of 392 in the third annunciator circuit on the sixth point card within the fourth group of 10 point cards. By definition, this is the 392d annunciator circuit, and it monitors the 392d variable.

Since both the X and Y inputs to the selected annunciator circuits are energized, that circuit transmits its A and B signal in inverted form to the NAND gates 490 and 492 shown in FIG. 4E. Since the $\overline{A}$ and $\overline{B}$ output signals from all other annunciator circuits within the system 100 are positive, the outputs of the NAND gates 490 and 492 reflect only the status of 392d annunciator circuit. Thus, the A and the B data signals are transmitted from the 392d annunciator circuit to the event logic 500 (FIGS. 5A and 5B).

A typical annunciator circuit is shown in FIG. 4D. Basically, each annunciator circuit comprises two flip-flops 412 and 414 for respectively storing the A and the B signals, scanning gating logic including the three gates 410, 416, and 418, and interface circuitry 421 interconnecting the A signal flip-flop 412 with a variable monitoring switch 450.

The status of the variable monitoring switch 450 is converted by the interface circuitry 421 into inversely related signals which are applied to the J and K inputs of the flip-flop 412. The flip-flop 412 is toggled between scanning cycles by the GATED $P_R$ pulse generated by the scanner 300. The output of the flip-flop 412 is an indication of whether the variable monitoring switch 450 was open or closed when the last GATED $P_R$ pulse was generated. The $\overline{Q}$ output of the flip-flop 412 is the A signal. This signal is positive when a variable monitoring switch 450 indicates an alarm condition, and at ground when the variable monitoring switch 450 indicates a normal condition. Depending upon the position of a switch 426, either an opening or a closing of the switch 450 can be considered an alarm event.

The flip-flop 414 is connected to the output of the flip-flop 412 in shift register fashion. The Q output of the flip-flop 412 connects to the K input of the flip-flop 414, and the $\overline{Q}$ output of the flip-flop 412 connects to the J input of the flip-flop 414. The Q output of the flip-flop 414 is the B, or acknowledgement, signal. When the B signal matches the A signal, this indicates that the present status of the variable monitoring switch 450 has been noted or acknowledged by the system 100. When the B signal is not the same as the A signal, this indicates that the present status of the variable monitoring switch 450 has changed since the last time this particular annunciator circuit was scanned, and therefore that an event has occurred.

When a particular annunciator circuit is scanned, the the A and B data is read out by a $P_I$ interrogation pulse which gates the units decimal output from the scanner 300 (FIG. 3). The trailing edge of this $P_I$ pulse toggles the flip-flop 414 and thereby matches the B signal to the A signal, as will be explained below. Thus, acknowledgement of an event is automatically carried out by the scanning process.

The $\overline{Q}$ output of the flip-flop 412 is fed into a NAND gate 416, and the Q output of the flip-flop 414 is fed into a NAND gate 418. The remaining inputs to the gates 416 and 418 are connected to the output of an AND gate 410. The inputs to the AND gate 410 are the X and Y input signals to the annunciator circuit.

When both the X and Y inputs to the annunciator circuit are positive, the AND gate 410 supplies a positive potential that enables the NAND gates 416 and 418 to pass the A and B signals from the two flip-flops 412 and 414 to the event logic 500. The NAND gate 416 passes the A signal from the flip-flop 412, and the NAND gate 418 passes the B signal from the flip-flop 414. These signals are passed to and through the NAND gates 40 and 492 shown in FIG. 4E, and on to the event logic 500.

Assume that an alarm event occurs. The variable monitoring switch 450 changes its state and causes the K input to the flip-flop 412 to go positive and the J input to the flip-flop 412 to go to ground. At the end of the current scanning cycle the GATED $P_R$ pulse toggles the flip-flop 412 from its usual Q state into the $\overline{Q}$ state. The flip-flop 414 remains in the $\overline{Q}$ state, which is its reset state. The A signal is now positive, and the B signal is now at ground, indicating an unacknowledged alarm event. When the scanner counter advances to the number of the variable being monitored, the X and Y inputs to the AND gate 410 both go positive during the $P_I$ interrogation pulse and enable the NAND gates 416 and 418 to transmit the A and B data through the gates 490 and 492 (FIG. 4E) to the event logic 500. The output of the AND gate 410 connects to the clock input of the flip-flop 414, so the clock input also goes positive. At the termination of the $P_I$ pulse, the X input to the AND gate 410 again goes to ground, and the output of the AND gate 410 goes to ground. This disables the NAND gates 416 and 418, and also toggles the flip-flop 414 into the Q state. Now both the A and the B signals are positive, indicating an alarm condition which has been acknowledged and recognized by the system 100. A similar procedure is followed after a return to normal event causes the J input to the flip-flop 412 to go high, and causes the K input to the flip-flop 412 to go low.

Occasionally the expandable memory 400 becomes full of data, and it is necessary to stop the scanning process until more room for the storage of event logic data becomes available. During such periods, artificial $P_R$ pulses are generated and are passed to the clock inputs of all of the annunciator flip-flops 412 (FIG. 4D) so that alarms of short duration will still toggle the flip-flops 412 in the system 100 annunciator circuits. To prevent the record of such momentary alarms from being erased from the flip-flops 412 before the scanning procedure recommences, an AND gate 420 separates the J terminal of each flip-flop 412 from the interface circuitry 421 and prevents the flip-flops 412 from returning to the Q state before an alarm condition is acknowledged by scanning. The AND gates 420 are enabled by the Q output signal from the flip-flops 414. Before an alarm is acknowledged, by scanning, the Q outputs of the flip-flops 414 remain at ground and disable the AND gates 420, thereby preventing the flip-flops 412 from toggling back into the Q state in response to the variables returning to their normal states. After acknowledgement, the flip-flops 414 toggle into the Q state and enable the AND gates 420. The flip-flops 412 can then respond to variables returning to normal in the normal manner. In this way, a record of all of the alarms, no matter how brief, is maintained within each individual annunciator circuit during periods when the expandable memory 1400 is full and the when scanning is temporarily disbanded. Thus, it is impossible for the system 100 to fail to make a printed record of any alarm which might arise, no matter how brief a time interval the alarm might persist.

The interconnecting network between the variable monitoring switch 450 and the normally closed or normally open selection switch 426 comprises a resistor-capacitor contact bounce suppression and time constant equalizing circuit, an input transistor 426, and two NOT gates 422 and 424.

One side of the variable monitoring switch 450 is connected to a minus 12 volt potential source. The other side is connected to a plus 5.1 volt potential source by a series circuit which includes a diode 427, having its cathode pointing towards the monitoring switch, and three identical 4,750 ohm precision resistors 428, 429 and 430. The junction point between the resistors 428 and 429 is connected to the plus 5.1 volt source by a 2.2 microfarad, 5 percent electrolytic capacitor 431. The junction point between the resistors 429 and 430 is connected to the base 432 of the transistor 426. The emitter 433 of the transistor 426 is connected to ground. The collector 434 of the transistor 426 is connected to the input of the NOT gate 424. The output of the NOT gate 424 connects to the input of the NOT gate 422, and also to the outermost contacts of the switch 426 as shown. The output of the NOT gate 422 connects to the centermost contacts of the switch 426.

Assume that the variable monitoring switch 450 is open, and that the switch 426 is in the normally open position as shown in FIG. 14. Current flows from the 5.1 volt source through the resistor 430 and into the base lead 432 of the transistor 426, causing the transistor 426 to conduct. The transistor 426 applies a ground level signal to the input of the NOT gate 424 and causes the output of the NOT gate 424 to go positive. The gate 422 inverts the positive signal and generates a ground level signal. In this manner, a positive potential is applied to the J terminal of the flip-flop 412, and a ground potential signal is applied to the K terminal of the flip-flop 412. The flip-flop 412 is assumed to be in the Q, or no alarm state, and the flip-flop 414 is assumed to be in the $\overline{Q}$, or acknowledged state.

Assume that the variable being monitored exceeds the predetermined alarm limit so that the switch 450 closes. Immediately the capacitor 431 begins to charge negatively through the resistor 428. As the negative lead of the capacitor 431 goes more negative, current is diverted from the base lead 432 of the transistor 426 and flows through the resistor 429 and into the negative lead of the capacitor 431. Eventually enough current is diverted from the base lead 432 so that the collector lead 434 goes positive and causes the output of the gate 424 to go to ground and the output of the NOT gate 432 to go positive. Now a positive potential is applied to the K terminal of the flip-flop 412, and a negative potential is applied to the J terminal. The next GATED $P_R$ pulse causes the flip-flop 412 to toggle into the $\overline{Q}$ or alarm state. During the next scanning cycle, a record of this alarm event is compiled by the system 100, and the flip-flop 414 is toggled into the Q state to acknowledge the alarm.

Assume now that the variable being monitored returns to within the present variable limits and that the switch 450 once again opens. Current no longer flows through the resistor 428, so the capacitor 431 now begins to discharge through the two resistors 429 and 430. Initially the junction point between the resistors 429 and 430 will be below ground potential, so no current will flow through the base lead 432. When the negative lead of the capacitor 431 reaches a voltage of approximately −5 volts, the junction point between the resistors 429 and 430 is positive enough to allow a small amount of current to flow through the base lead 432. This current causes the transistor 426 to conduct, and causes the collector of the transistor 426 to return to ground. A positive potential signal appears at the output of the NOT gage 424, and a ground level signal appears at the output of the NOT gate 424, and a ground level signal appears at the output of the NOT gate 422. The positive signal is applied to the J terminal of the flip-flop 412 through the enabled AND gate 420, and the ground level signal is applied to the K terminal of the flip-flop. The next gated $P_R$ pulse toggles the flip-flop 412 back into the Q state, and a return to normal (N) event printout is initiated.

A series circuit comprising a 0.01 microfarad capacitor and a 5,600 ohm resistor is connected from the output of the NOT gate 424 back to the emitter 432 of the transistor 426. This series circuit supplies positive feedback from the output of the gate 424 to the input of the transistor 426 and causes the transistor 426 and the gate 424 to function in the manner of a Schmidt trigger. With this circuit in place, the output signal from the gate 424 becomes a clean square wave. Amplifier noise is suppressed, and no sneak pulses are allowed to reach the flip-flop 412.

The interface circuitry 421 is designed so that the delay time between an opening or closing of the variable monitoring switch 450 and a change in level at the output of the NOT gate 424 is almost exactly the same in every annunciator circuit within the system 100. This is very important. If different delay times were found in different annunciator circuits, it would be possible for the printed record generated by the system 100 to reverse the order in which events closely spaced in time occurred. The circuitry between the switch 450 and the transistor 426 is essentially a two section resistor capacitor low pass filter. The first section comprises the resistor 428 and the capacitor 431, and the second section comprises the resistor 429 and the emitter-to-base capacity of the transistor 426. To the second section can also be added the resistor 430, which is effectively in parallel with the emitter-to-base capacity of the transistor 426. To insure uniformity in the various annunciator circuit time delays, the resistors 428, 429, and 430 are precision ¼ percent tolerance resistors, and the capacitor 421 has a tolerance of 5 percent. The transistor 426 is also chosen to have a fairly uniform emitter-to-base capacity from one unit to the next. In the system 100, Fairchild SE-4002 transistors are used. Experiments showed that integrated circuit logic gates, such as the gate 424, had widely varying input capacities and could not be used in place of the transistor 426. The plus 5.1 volt source of voltages is also maintained within 5 percent. In the system 100, each individual point card is equipped with its own Zener diode regulated 5.1 volt power supply. Thus, the supply in one point card can break down without disabling the annunciators on other point cards. In this same connection, it is important that the −12 volt potential supply to which the switches 450 are connected be maintained fairly constant throughout the system 100.

If a different voltage is used as a return for the variable monitoring switch, say 120 volts instead of 12 volts, the resistors 428, 429, and 430 must be adjusted accordingly. In applications where some annunciators are to be operated with the switch 426 in normally opened position and some annunciators are to be operated with the switch 426 in a normally closed position, it is desirable to equalize the time delay for system response to a closure of a variable monitoring switch 450 and the time delay for system response to an opening of a variable monitoring switch 450. This, again, can be done by adjusting the values of the resistors 428, 429, and 430, the capac'tc. 431, and the power supplies.

EVENT LOGIC AND EVENT FLIP-FLOP

FIGS. 5A–5C illustrate the logic used to detect the occurrence of an event, to determine what kind of event has occurred, and to toggle the event flip-flop 509 whenever an event does occur.

FIG. 5A shows the circuitry for determining the presence of a new or unacknowledged alarm (A) or return to normal (N) event. A new or unacknowledged alarm (A) event is indicated by the generation of a positive potential A signal accompanied by a ground potential B signal. To detect an unacknowledged alarm (A) event, the B signal is first inverted by a NOT gate 501. The inverted B signal and the A signal are then applied to the first and third inputs of a NAND gate 502. The second input to the NAND gate 502 normally goes positive when a T-3 timing pulse is generated. (The gate 505 can be disabled by an inverted A/N EVENT SUPPRESS signal during parts of the maintenance mode of operation, as will be explained below.) A ground potential pulse at the output of the NAND gate 502 indicates an unacknowledged alarm event. The output of the gate 502 is called the inverted ALARM pulse.

A new or unacknowledged return to normal (N) event is indicated by the presence of a positive potential B signal accompanied by a ground potential A signal. To detect an unacknowledged return to normal (N) event, the A signal is inverted by a NOT gate 503. The inverted A signal and the B signal are then applied to the first and third inputs of a NAND gate 504. The second input to the NAND gate 504 is connected in the same manner as is the second input to the NAND gate 502, and normally receives T-3 timing pulses. A ground potential pulse at the output of the NAND gate 504 then indicates an unacknowledged return to normal (N) event has occured. The output of the gate 504 is called the inverted RETURN TO NORMAL pulse.

FIG. 5B shows circuitry used to generate a pulse indicating a variable is in the acknowledged alarm state. This circuitry is only used during a summary printout of all variables in the acknowledged alarm state, as will be explained below. Both the A and B signals are fed into a NAND gate 506, along with a T3 timing signal and the SUMMARY READ signal. When the system 100 is forming a summary printout, an inverted ACKNOWLEDGED ALARM pulse appears at the output of the gate 506 whenever both the A and B signals are found to be positive.

The pulse outputs of the three NAND gates 502, 504, and 506 are all fed into the NAND gate 507 shown in FIG. 5c, and combined to form an EVENT pulse. This EVENT pulse is inverted by an inverting amplifier 508 and is applied to the clock terminal of an event flip-flop is grounded and the J terminal is floating (positive), the EVENT pulse toggles the flip-flop 509 into the Q state, thereby generating a positive SCAN INHIBIT signal. The SCAN INHIBIT signal stops the sacanner 300 and performs several other tasks which will be discussed below.

ASSEMBLY SHIFT REGISTER CONTROL LOGIC

The SCAN INHIBIT signal generated by the event flip-flop 509 is fed into the assembly shift register control logic 600 and enables the assembly shift register control logic 600 to generate a series of control signals which feed data into the assembly shift register 700 and into the expandable memory 1400.

FIGS. 6A–6C show the assembly shift register control logic 700. Referring to FIG. 6A, the circuitry for generating a MEMORY LOAD ENABLE signal is shown. S2 timing pulses are applied to the second input of a NAND gate 603. The output from the NAND gate 603 connects to clear terminal of a flip-flop 602. An inverted SCAN INHIBIT signal is connected to the first input of the NAND gate 603. When no SCAN INHIBIT signal is present, this first input is positive, and each S2 pulse produces a ground level output from the NAND gate 602 and maintains the flip-flop 602 in the clear or $\overline{Q}$ state. When a SCAN INHIBIT signal is present, the first input to the NAND gate 603 goes to ground, and S2 pulses no longer clear the flip-flop 602.

Clock pulses for the flip-flop 602 are generated by combining an S2 pulse with a SCAN INHIBIT signal, an inverted MEMORY FULL signal, and a DIVIDE BY 36 signal. The S2 pulse and the DIVIDE BY 36 signal come from the clock 300 and are positive whenever an S2 pulse occurs. The SCAN INHIBIT SIGNAL goes positive whenever an event is encountered, as explained above. The MEMORY FULL signal is normally positive but goes negative whenever the expandable memory 1400 becomes completely full. This MEMORY FULL signal prevents the flip-flop 602 from shifting into the Q state and attempting to load more data into the memory 1400 when the memory 1400 is already full of data. Assuming no MEMORY FULL signal is present, the flip-flop 602 shifts to the Q state at the onset of the first S2 timing pulse which follows the onset of a scan inhibit. When the S2 timing pulse goes positive, the output of the NAND gate 601 goes negative and toggles the flip-flop 602 into the Q state. This generates the MEMORY LOAD ENABLE signal that initiates the loading of data into the assembly shift register 700.

FIG. 6B shows a logic circuitry used to generate the four signals that control the operation of assembly shift register 700. The MEMORY LOAD ENABLE signal begins during an S2 timing pulse. During the T2 part of the following S3 timing pulse, a LOAD SHIFT REGISTER FROM FIRST INPUT signal is generated by a NAND gate 630. The inputs to the NAND gate 630 are an S3 timing pulse, a T2 timing pulse, and the MEMORY LOAD ENABLE signal. During the T4 part of the 16 COUNT timing pulse, a LOAD SHIFT REGISTER FROM SECOND INPUT signal is generated by a NAND gate 640. The inputs to the NAND gate 640 are the 16 COUNT timing pulse, a T4 timing pulse, and the MEMORY LOAD ENABLE signal. Shift pulses for shifting data from the assembly shift register 700 into the expandable memory 1400 are passed through a NAND gate 620. MEMORY SHIFT pulses are applied to the first input of the NAND gate 620, and the MEMORY LOAD ENABLE signal is applied to the second input. Whenever the MEMORY LOAD ENABLE signal is present, the NAND gate 620 is enabled and SHIFT REGISTER SHIFT pulses are sent to the assembly shift register 700. After data has been read out of the assembly shift register 700, it is desirable to clear the register 700 to make sure that no spurious signals remain. This is done by the NAND gate 611. The register is cleared after the 16th memory shift pulse, and also after the 32nd memory shift pulse. An inverted $S_0$ pulse is fed into the first input of the NAND gate 611. The 16 count pulse, combined with a T2 pulse by a NAND gate 610, is fed into the second input of the NAND gate 611. NAND gate 611 combines these signals and generates a SHIFT REGISTER CLEAR signal.

FIG. 6C shows the logic circuitry that generates an inverted RESET pulse after data has been loaded into the expandable memory 1400. This RESET pulse occurs during the T4 part of an S1 timing pulse. The RESET pulse is applied to the clear terminal of the event flip-flop 509 (FIG. 5C) to terminate the SCAN INHIBIT signal. The RESET pulse is also used to clear the flip-flops within the code number generator 800.

ASSEMBLY SHIFT REGISTER

The assembly shift register 700 is shown in FIG. 7. It is basically a 16 bit parallel input-serial output shift register. The shift register includes 16 J and K type flip-flops 701-716. The J and K terminals of each flip-flop connect to the Q and $\overline{Q}$ terminals of the preceding flip-flop. The clock terminals of the 16 flip-flops are connected in parallel and are driven simultaneously by a NOT gate 742 to shift data serially through the shift register 700. Data is loaded simultaneously into all of 16 flip-flops through the flip-flop S or set terminals with the aid of sixteen AND-NOR gates 721–736. Each AND-NOR gate comprises a two input NOR gate having a two input AND gate connected to each input of the NOR gate. For convenience, the two AND gates associated with each NOR gate are labelled A and B respectively in FIG. 7.

The first inputs to all of the A AND gates (inputs labelled A1) are connected in parallel to the output of a NOT gate 743. The LOAD SHIFT REGISTER FROM SECOND INPUT signal is applied to the input of the gate 743. The second inputs to all of the A AND gates (input labelled A2) form the second input to the assembly shift register 700. When the LOAD SHIFT REGISTER FROM SECOND INPUT signal is at ground, the A1 inputs are all positive, and data applied to the second input of the assembly shift register 700 appears as ground level signals applied to the set or (S) terminals of the 16 flip-flops 701–716. The LOAD SHIFT REGISTER FROM SECOND INPUT signal thus loads data into the 16 flip-flops from the second input.

The first inputs to all of the B AND gates (inputs labelled B1) are similarly connected in parallel to the LOAD SHIFT REGISTER FROM FIRST INPUT signal by a NOT gate 744. The second inputs to all of the B AND gates (inputs labelled B2) form the first input to the assembly shift register 700. The LOAD SHIFT REGISTER FROM FIRST INPUT signal thus loads data into the sixteen flip-flops from the second input.

The SHIFT REGISTER CLEAR signal is inverted by the NOT gate 741 and simultaneously applied to the clear or C terminals of all the flip-flops 701-716.

Data leaves the assembly shift register 700 from the Q terminal of the flip-flop 716 and flows directly into the expandable memory 1400. With each shift pulse applied to the input of the NOT gate 742, all of the data stored within the flip-flops advances to the next flip-flop. Thus, 16 shift pulses causes the entire contents of the register to appear sequentially at the Q output terminal of the flip-flop 716.

CODE NUMBER GENERATOR

FIG. 8 shows the logic used to generate code numbers. The three NAND gates 805–807 derive signals from the two NAND gate flip-flops 801–802 and 803–804, and also from the two NAND gates 808 and 809, and combine these signals to form a three digit code number. This code number is fed into the assembly shift register 700 along with other data relevant to each event.

Four code numbers are used; The number 001 indicates an alarm (A) event printout; the number 110 indicates a return to normal (N) event printout; the number 011 indicates a summary (S) printout; and the number 101 indicates a maintenance (M) printout.

The least significant digit in each of these code numbers appears redundant, since only a two digit code is required to give four distinct numbers. The reason for using a three digit code is to simplify the task of translating the code numbers into teleprinter code. For example, an A is printed by the teleprinter to indicate an alarm event. The code number 001, which indicates an alarm event, is the first three digits of 00001, which is the five digit central portion of the printer code for the letter A. Hence, the code number 001 can be fed right to the teleprinter 3200, and the teleprinter output logic 1500 need only generate two zeros and an alphabetic suffix to complete the letter code. Similarly, the number 110 is the first part of 01110, the teleprinter code for the letter N; the number 011 is the first part of 10011, the teleprinter code for the letter S; and the number 101 is the first part of 01101, the teleprinter code for the letter M. In every case, the teleprinter output logic 1500 transmits the three code numbers directly from the expandable memory 1400 to the teleprinter 3200, and then generates and transmits two more digits and an alphabetic suffix to complete the cose.

The NAND gate flip-flop 801–802 sets in response to an inverted ALARM pulse, and generates the code number 001. The NAND gate flip-flop 803–804 sets in response to an inverted RETURN TO NORMAL pulse, and generates the code number 110. The NAND gate 808 is enabled by a SUMMARY MODE signal, and generates the code number 011. The NAND gate 809 is enabled by a MAINTENENCE MODE signal, and generates the code number 101. Note that an inverted MAINTENANCE MODE signal disables the NAND gate 808 during the maintenance mode and overrides any SUMMARY MODE signal which may be present.

The connections between the various elements of the code number generator 800 are clearly shown in FIG. 8, and need not be described here in detail.

120 CPS CLOCK

The 120 CPS (cycle per second) clock 900 is shown in FIG. 9. The clock 900 is designed to run synchronously with a 60 cycle power source, but is designed to continue operating on battery power in case of a power failure, maintaining an accuracy of 5 percent or better.

At the heart of the clock 900 is a conventional unijunction transistor 120 pulse per second pulse generator. This pulse generator comprises the right hand half of a circuit 901, and includes a unijunction transistor 906, an output transistor 908, a timing capacitor 910, and timing capacitor charging resistors 912 and 913. The capacitor 910 is charged at a controlled rate by current flowing through the resistors 912 and 913. When the voltage at the emitter 914 of the unijunction transistor 906 rises above the critical threshold voltage of the unijunction transistor 906, the unijunction transistor 906 becomes conductive between the emitter terminal 914 and the base terminal 918. The capacitor 910 discharges through a 100 ohm resistor that connects the base 918 to a ground potential line 904. In the process of this discharge, current flows through the base terminal 920 of the transistor 908 and causes the transistor 908 to become fully conductive. A negative pulse then appears at the collector terminal 924 of the transistor 908. This negative pulse is applied to the clock terminal of a JK flip-flop 932, and toggles the flip-flop 932 into the Q state. The signal thus generated is a 120 pulse per second negative pulse train. The variable resistor 912 is adjusted to set the frequency.

When the flip-flop 932 toggles into the Q state, it applies a positive voltage to the J terminal of a flip-flop 934 and a negative voltage to the K terminal of the flip-flop 934. The next T4 timing pulse applied to the clock terminal of the flip-flop 934 toggles the flip-flop 934 into the Q state. The Q output of the flip-flop 934 then enables a NAND gate 936 and allows the next T3 pulse which occurs during an S0 pulse to pass through the NAND gate 936. The output of the NAND gate 936 goes to ground and clears the flip-flop 932. This same negative going output of the gate 936 is applied to the input of a NOT gate 938, and a positive 120 PPS pulse appears at the output of the gate 938. The next T4 pulse toggles the flip-flop 934 back into the Q state, returning the circuit to its reset state. Thus, one T3 pulse issues from the gate 938 every 120th of a second. This signal is called the 120 PPS (pulse per second) signal, and the pulses that make up this signal are called 120 PPS pulses.

Synchronization of the clock circuit with a 60 cycle reference is achieved by means of the left-hand half of the circuit 901. A 6.3 volt, 60 cycle source of potential 922 is connected between a positive line 902 and the base 924 of a transistor 914 through a 1,000 ohm resistor. A diode 916 prevents the base terminal 924 from going too far positive and breaking down the base-emitter section of the transistor 914. A 60 cycle square wave appears at the collector terminal 926 of the transistor 914. This square wave is converted into a 60 pulse per second pulse train by differentiating capacitor 918 and differentiating resistor 919. This 60 pulse per second pulse train appears at a node 930 and is applied to the timing capacitor 910 by a diode 920. Every 60th of a second, a pulse from this 60 pulse per second train causes the unijunction transistor 906 to trigger early, and thereby synchronizes the 120 pulse per second train which appears at the collector 924 of the transistor 908 with the 60 cycle pulse train which appears at the node 930.

SECONDS COUNTER

The seconds counter 1000 is shown in FIG. 10. Basically, the seconds counter is a conventional counter circuit that counts from 00.00 to 59.99 and that then resets itself to 00.00. The circuit also generates a 1 PPM pulse when it resets. This pulse is used to advance a minutes counter, as will be explained below. The seconds counter shown is able to operate from the 120 PPS (pulse per second) signal, and therefore does not require a 100 pulse per second signal. The counter 1000 ignores two pulses within each series of 12 input pulses, thereby reducing the number of pulses by 1/5 and thereby converting the 120 PPS signal into a 100 pulse per second signal.

The pulse frequency conversion arrangement is shown at the top of FIG. 10. The 120 PPS signal is fed through a NAND gate 1014 to the count terminal of a BCD (binary coded decimal) counter 1002 that counts from 0 to 9 in binary coded decimal form. The 120 PPS signal is also fed to the clock terminal of a flip-flop 1016. The $\overline{Q}$ output of the flip-flop 1016 connects to an input of the NAND gate 1014, and is normally positive. Assuming that the flip-flop 1016 is in the $\overline{Q}$ state and that the counter 1002 is at 0 count, the first 120 PPS pulse to reach the NAND gate 1014 passes through the NAND gate 1014 to the counter 1002. The second and third pulses likewise reach the counter 1002. After three pulses have been counted, the BCD counter 1002 displays output voltages corresponding to the number 3. The BCD representation of the number 3 is 0011, so positive voltages are present at the $2^0$ and the $2^1$ outputs of the counter 1002. The positive voltage from the $2^1$ output is applied to the third input of an AND gate 1018. The positive voltage from the $2^0$ output is combined with the CLOCK timing signal by an AND gate 1020, and the resultant signal is applied to the second input of the AND gate 1018. The flip-flop 1006 is still in the $\overline{Q}$ state, so a positive voltage from the $\overline{Q}$ output of the flip-flop 1006 is applied to the first input of the AND gate 1018, enabling the AND gate 1018. The output of the gate 1018 goes positive and applies a positive voltage to the J terminal of the flip-flop 1016. This enables the flip-flop 1016 to be toggled into the Q state, but does not toggle the flip-flop 1016. The 120 PPM pulse passes through the NAND gate 1014 and advances the counter 1002 to a count of 4. The trailing edge of this 120 PPM pulse toggles the flip-flop 1016 into the Q state, and the $\overline{Q}$ output of the flip-flop 1016 to ground. This ground level signal disables the AND gate 1014 and prevents the next sequential 120 PPS pulse from entering the counter 1002. Thus, the next 120 PPS pulse is not counted; however, the trailing edge of this next pulse toggles the flip-flop 1016 back into the $\overline{Q}$ state, and the flip-flop 1016 once again enables the AND gate 1014. The flip-flop 1016 toggles back into the $\overline{Q}$ state because its K input is connected to its Q output, which was positive just before the flip-flop was toggled. The counter 1002 now is at a count of 4, or 0100, so the third input to the AND gate 1018, and therefore the output of the gate 1018 and the J input to the flip-flop 1016, is at ground. This disables the clock input to the flip-flop 1016 and keeps it in the $\overline{Q}$ state.

The counter 1002 continues to count the next three 120 PPM pulses, and then once again the $2^0$ and $2^1$ counter outputs cause a positive voltage to reach the J terminal of the flip-flop 1016. The above pulse skipping process is then repeated. Thus, the BCD counter 1002 counts only 10 out of 12 input pulses. This input arrangement makes it possible for a decimal seconds clock to be driven by a 120 pulse per second signal, and yet maintain decimal accuracy to 0.001 second. A small amount of jitter is introduced by the omitting of some input pulses, but this jitter never amounts to more than 0.001 second. In the system 100, this jitter can be neglected entirely, since only the relative timing as between two successive events is really important.

The $2^3$ output of the counter 1002 connects to the count terminal of a counter 1004. The counter 1004 is designed to count whenever the input at the count terminal shifts from positive to ground level. Thus, each time the counter 1002 shifts from 9 to 0, the counter 1004 advances. The counter 1002 records 100ths of a second and the counter 1004 records 10ths of a second. The counter 1006 is similarly connected to the counter 1004, and is used to count seconds from 0 to 9.

The 23 output of the counter 1006 is similarly fed to a counting circuit comprising flip-flops 1008, 1010, and 1012. This counting circuit counts from 0 to 5 and then resets to 0 again.

The $2^3$ output of the counter 1006 connects to the clock terminal of the flip-flop 1008. The Q output of the flip-flop 1008 connects the clock terminals of both the flip-flops 1010 and 1012. The flip-flop 1010 connects to the flip-flop 1012 in shift register style, with the Q output of the flip-flop 1010 connected to the J input of the flip-flop 1012, and with the $\overline{Q}$ output of the flip-flop 1010 connected to the K input of the flip-flop 1012. The $\overline{Q}$ output of the flip-flop 1012 connects to both the J and K inputs of the flip-flop 1010.

The 0–5 counter functions in the following manner. Each time the $2^3$ output of the counter 1006 goes negative (this happens when the count within the counter 1006 advances from 9 to 0), it toggles the flip-flop 1008. Each time the flip-flop 1008 toggles into the $\overline{Q}$ state, it applies a negative pulse to the clock terminals of the flip-flops 1010 and 1012. Assuming that both the flip-flops 1010 and 1012 are initially in the $\overline{Q}$ state, the first negative going pulse from the flip-flop 1008 toggles the flip-flop 1010 into the Q state; the second negative going pulse toggles the flip-flop 1010 back into the $\overline{Q}$ state, and toggles the flip-flop 1012 into the Q state; and the third negative going pulse toggles the flip-flop 1012 back into the $\overline{Q}$ state. Thus, the counter circuit functions as a binary counter for five counts, and then resets to zero upon the sixth count.

It is to be understood that any counter circuit capable of counting from 000 to 5999 can replace the counters 1002-1006 and the flip-flops 1008–1012. In the preferred embodiment, the BCD 0 to 9 counters are transistor-transistor integrated circuit decade counters, model number SN 7490, manufactured by Texas Instruments, Inc., Dallas, Tex.

The $\overline{Q}$ output from the flip-flop 1012 is connected to a non-inverting amplifier 1026 by a differentiating circuit comprising a 560 picofarad capacitor and 270 ohm resistor, as shown in FIG. 10. Each time the flip-flop 1012 returns to the $\overline{Q}$ state, a positive pulse appears at the output of the amplifier 1026. This happens at the end of each minute. This output pulse is called the 1 PPM (one pulse per minute) pulse and the resulting pulse train is called the 1 PPM signal.

The NOT gates 1022 and 1024 make it possible for an inverted SYNC pulse to clear the seconds counter. This will be explained more fully below.

MARKER BIT FLIP-FLOP AND LOGIC, AND THE MARKER BIT

As explained above, the 1 PPM signal is not applied directly to the minutes, hours, and days counters 1300, but is passed through a marker bit flip-flop and logic 1100. The marker bit flip-flop and logic 1100 generates a MINUTES COUNTER ADVANCE pulse whenever the minutes, hours, and days counters 1300 are to be advanced.

Normally the 1 PPM pulses pass directly through the marker bit flip-flop and logic 1100 and become the MINUTES COUNTER ADVANCE pulses. Referring to FIG. 11, a flip-flop 1114 is normally in the Q state, and a positive enabling signal is fed from the Q output of this flip-flop to a NAND gate 1110, while a ground level disabling signal is fed from the $\overline{Q}$ output of this same flip-flop to a NAND gate 1112. The 1 PPM signal is applied to both NAND gates 1110 and 1112, but appears in inverted form only at the output of the enabled NAND gate 1110. This inverted 1 PPM signal is fed into the third input of a NAND gate 1104. Since the first and second inputs of the NAND gate 1104 are normally positive, the signal is re-inverted by the gate 1104 and becomes the MINUTES COUNTER ADVANCE signal. This signal appears at the output of the gate 1104.

After an event occurs, at the precise moment when the time in seconds is transferred from the seconds counter 1000 into the assembly shift register 700, the assembly shift register 700 generates a SET TIME pulse. This pulse is applied to the first input of a NAND gate 1118. The second input to this NAND gate is used only during maintenance mode operations, and is therefore normally positive. The SET TIME pulse is therefore inverted by the gate 1118 and is applied to the clear terminal of the flip-flop 1114. This clears the flip-flop 1114 and leaves it in the $\overline{Q}$ state. The flip-flop 1114 now disables the NAND gate 1110 and enables the NAND gate 1112, thus diverting the 1 PPM signal from its usual path and applying this signal in inverted form to the clear terminal of the marker bit flip-flop 1116.

As explained above, the marker bit flip-flop 1116 stores a record of any 1 PPM pulse which occurs after the occurrance of an event but before a record of the event is printed out. The marker bit flip-flop 1116 is normally in the Q state. If a 1 PPM pulse occurs, the pulse clears the flip-flop 1116 and places the flip-flop in the $\overline{Q}$ state. Thus, a record of the fact that a 1 PPM pulse has occurred is stored in the marker bit flip-flop. The bit of information stored in the marker bit flip-flop by the 1 PPM pulse is called a MARKER BIT.

If a second event occurs while the record of a first event is being printed out, and if the marker bit flip-flop contains a MARKER BIT when the second event occurs, the MARKER BIT is fed into the assembly shift register 700 along with the other data pertaining to the second event. The MARKER BIT is fed from the $\overline{Q}$ output of the flip-flop 1116 directly to input 16 of the first input to the assembly shift register 700 (FIG. 7). After the MARKER BIT has been read into the register 700, the SET TIME PULSE returns the marker bit flip-flop to the Q state. This pulse passes through the NAND gates 1118 and 1120 and is applied to the clock input of the marker bit flip-flop 1116. The MARKER BIT then accompanies the data pertaining to the second event through the expandable memory 1400 and into the teleprinter output logic 1500. The MARKER BIT tells the teleprinter output logic 1500 to advance the minutes counter and to re-print the time in hours and minutes before printing a record of the second event. The teleprinter output logic 1500 advances the minutes counter by generating an inverted UPDATE pulse. This inverted UPDATE pulse passes through the gates 1106 and 1104 and becomes a MINUTES COUNTER ADVANCE pulse.

At the termination of a printout, if the marker bit flip-flop still contains a MARKER BIT, the MARKER BIT is transferred from the $\overline{Q}$ output of the marker bit flip-flop 1116, through the gates 1108, 1106, and 1104, to the output of the gate 1104 where it becomes a MINUTES COUNTER ADVANCE PULSE. First, the flip-flop 1114 is reset at the termination of a printout by a negative change in the level of an OUTPUT ENABLE signal which is applied to the clock input of the flip-flop. The flip-flop 1114 disables the NAND gate 1112, and enables the two NAND gates 1110 and 1108. The NAND gate 1110 re-establishes the original 1 PPM signal path to the minutes counter, and the NAND gate 1108 provides a path over which a MARKER BIT can flow to the minutes counter. If a MARKER BIT is present, the $\overline{Q}$ output of the flip-flop 1116 is positive, enabling the NAND gate 1108. The next S0 timing pulse passes through the gates 1108, 1106, and 1104, and becomes a MINUTES COUNTER ADVANCE pulse. This S0 pulse also passes through the NAND gate 1120, and its trailing edge toggles the marker bit flip-flop 1116 back into the Q state. This disables the gate 1108 and prevents any other S0 pulses from reaching the minutes counter.

A minutes counter advance push button and pulse forming logic 1102 is included within the marker bit flip-flop and logic 1100. This circuit is not shown in detail, since many circuits for interfacing manually operable switches and high speed logic are known in the art. The circuit 1102 generates a single negative going pulse each time a minutes counter advance push button (not shown) is depressed. This negative going pulse passes through the NAND gate 1104 and becomes a MINUTES COUNTER ADVANCE pulse. If desired, the pulse generated by the circuit 1102 can be synchronized with the system timing pulses in any suitable manner. The logic 1102 provides a way in which the system 100 minutes counter may be manually advanced.

MEMORY FULL FLIP-FLOP AND LOGIC, AND THE OVERLOAD BIT

When a large number of events occur within a very short period of time, the expandable memory 1400 can become full. The expandable memory 1400 then generates a MEMORY FULL signal. As explained above in connection with the descriptions of the assembly shift register control logic 600, this signal halts the data assembly process until there is room for more data within the expandable memory 1400. In the interim period, the individual annunciator circuits are relied upon to keep a complete record of all alarm events which may occur. Since the individual annunciator circuits cannot maintain a record of time, no record is kept of the time when such events occur, and no record is kept of the order in which such events occur.

When there is once again room for more data within the memory 1400, the MEMORY FULL signal terminates, and the assembly of event data recommences. The data collected is inaccurate, however. The time read from the seconds counter 1000 is not the time when the event occurred, but the time when data pertaining to that event was collected.

Event data collections of this type are marked by the addition of an OVERLOAD BIT to the data assembled within the assembly shift register 700. This OVERLOAD BIT accompanies the data through the expandable memory 1400 and into the output logic 1500. As will be explained below, the teleprinter output logic 1500 responds to an OVERLOAD BIT by suppressing the printout of the time in seconds and in fractions of a second. This not only prevents the printout of erroneous time data, but also warns supervisory employees that the printout of events is not necessarily arranged sequentially by time of event occurrance.

The memory full flip-flop and logic 1200 are shown in FIG. 12. When the expandable memory 1400 becomes full, the memory full flip-flop 1204 toggles into the Q state and generates an OVERLOAD BIT signal. The OVERLOAD BIT signal is fed to terminal 13 of the second input to the assembly shift register 700, and causes MARKER BITS to be included in all sets of data assembled by the register 700. The memory full flip-flop remains in the Q state until it is cleared by a 999 pulse. The memory full flip-flop is not cleared until the system 100 has run through a scanning cycle during which no new events were encountered.

When the expandable memory 1400 becomes full, it generates a MEMORY FULL signal. This signal, along with the SCAN INHIBIT signal, enables a NAND gate 1202 within the marker bit flip-flop and logic 1200. The NAND gate 1202 then allows S1 timing pulses to toggle the memory full flip-flop 1204 into the Q state. The Q output of the memory full flip-flop 1204 is the OVERLOAD BIT signal.

The 999 pulses are fed into the clock terminal of a flip-flop 1208. The flip-flop is in the cleared or $\overline{Q}$ state after the occurrance of an event, because the SCAN INHIBIT signal is fed through a NOT gate 1206 to the clear input of the flip-flop 1208. The trailing edge of the next 999 pulse to occur toggles the flip-flop 1208 into the Q state, and the Q output of flip-flop 1208 goes positive as the 999 pulse goes negative. The signal from the Q output of the flip-flop 1208 and the 999 pulse are fed into a NAND gate 1210. Since these two signals are not positive simultaneously, the output of the gate 1210 remains positive. Hence, the first 999 pulse to occur does not clear the flip-flop 1204, but merely toggles the flip-flop 1208 into the Q state. The scanner 300 then continues to scan the annunciator points. If another unacknowledged event is encountered, the SCAN INHIBIT signal again clears the flip-flop 1208, and the next 999 pulse also fails to clear the memory full flip-flop 1204. When a complete scan is finally carried out during which no new or unacknowledged events are encountered, the next 999 pulse passes through the NAND gate 1210 and clears the memory full flip-flop 1204.

MINUTES, HOURS, AND DAYS COUNTERS

Any suitable counting circuits may be used to keep track of the minutes, hours, and days for the purposes of the present invention. FIG. 13 shows one configuration which may be used. Three BCD counters 1302, 1310, and 1318 are used. The output of each counter is presented in binary coded decimal form. The outputs are inverted, but this is done merely to simplify the teleprinter logic and is not a necessary requirement.

The counter 1302 counts from 0 to 59 and then resets. It is used to keep track of the time in minutes. Note that only three bits of the 10's digit BCD code are generated. Since the 10's digit is never greater than 5, the fourth bit is assumed to be 0. The counter 1302 generates an HOURS COUNTER ADVANCE pulse when it resets from 59 to 0. This pulse passes through the gates 1306 and 1308, and advances the hours counter 1310.

The hours counter 1310 counts from 0 to 23 and then resets. It is used to keep track of the time in hours. Only two bits of the 10's digit BCD code are generated, the remaining two bits being assumed equal to zero. When the counter 1310 resets, it generates a DAYS COUNTER ADVANCE pulse that passes through the gates 1312 and 1316, and advances the days counter 1318.

The days counter 1318 counts from 0 to 365 or from 0 to 366, depending upon the position of a leap year switch (not shown) that is a part of the counter 1318. (The leap year switch is an optional feature, and is not essential). The days counter BCD output is carried by ten leads, four representing the 1's digit, four representing the 10's digit and two representing the 100's digit. The last two bits of the 100's digit are assumed to be 0. At the end of the year, a YEAR END pulse is generated. This pulse passes through the NAND gate 1316 and advances the counter 1318 from "000" to "001" on the first day of each new year. If a counter can be obtained that resets to "001" instead of "000", this year end pulse will not be required. The preferred embodiment of the system 100 uses off-the-shelf BCD decade counters that reset to "000", and not to "001".

The two push button and pulse forming logic circuits 1304 and 1314 can be identical to the circuit 1102 (FIG. 11) discussed above, and provide a way in which the hours and days counters may be advanced by depressing manual push buttons.

EXPANDABLE MEMORY

The expandable memory 1400 (FIG. 14) comprises a plurality of identical memory boards (board 1, board 2, ..., board N) which are plugged into the system 100. Each board contains five 32 bit shift registers connected serially to form a single 160 bit shift register. The boards are interconnected as shown in FIG. 14 so that the 32 bit shift registers form a single shift register data path which connects the ASSEMBLED DATA output of the assembly shift register 700 to the MEMORY DATA input of the teleprinter output logic 1500.

Each 32 bit shift register can store the entire 32 bits of data pertaining to a single event, so each memory board can store data pertaining to five separate events. Any number of memory boards can be added to the system 100, although the preferred embodiment provides cabinet space for only six memory boards. Depending upon the number of memory boards used, the preferred embodiment of the system 100 can be arranged to store data pertaining to as few as five events (one board used) or as many as 30 events (six boards used).

The use of an expandable memory means that a single model of the system 100 can be easily adapted to many different monitoring tasks. Since memory boards can be added to the system 100 by untrained personnel, it is possible for the purchaser of a system 100 to start with a single memory board, and then expand the size of the memory to suit his later needs. This significantly lowers the initial cost of the system 100. As noted above, a purchaser can also start with a minimum number of annunciator circuits, and then add more annunciator circuits as his needs grow.

In the paragraphs to follow, a data set pertaining to a single event and stored as a unit within the expandable memory 1500, will be called a "32 bit event data set". Each 32 bit event data set includes the two 16 bit data sets presented respectively to the first and second inputs of the assembly shift register 700 at the time the associated event occurred.

When an event occurs, a 32 bit event data set is assembled by the assembly shift register 700 and is fed into the expandable memory 1400 over the ASSEMBLED DATA line. The same MEMORY SHIFT pulses which shift the data out of the assembly shift register 700 are also applied to the shift registers within the memory 1400 to advance the data set through the memory 1400. Each 32 successive MEMORY SHIFT pulses cause the 32 bit event data set to move out of one shift register and into the next.

In FIG. 14, the five 32 bit shift registers 1408, 1416, 1424, 1432, and 1440 in memory board 1 are shown. These shift registers can be of the type shown in FIG. 7. If the shift register of FIG. 7 were doubled in length, and if the K input to the flip-flop 701 were connected to the J terminal by a NOT gate, then the shift register of FIG. 7 could be used directly as a 32 bit shift register in FIG. 41. The input labelled I on the shift registers of FIG. 14 would then correspond to the J input of the flip-flop 701 in FIG. 7, and the output labelled Q on the shift registers of FIG. 14 would correspond to the Q output of the flip-flop 716 in FIG. 7. The shift pulses terminal labelled SP on the shift registers of FIG. 14 would correspond to the input of the NOT gate 742 in FIG. 7.

In the preferred embodiment, each 32 bit shift register is constructed by serially connecting four eight-bit integrated circuit shift registers. The eight-bit shift registers chosen are model number SN 7491A, manufactured by Texas Instruments, Inc.

Associated with each 32 bit shift register is a control flip-flop. The control flip-flops function as flags indicating whether the associated 32 bit shift register contains a 32 bit event data set. The control flip-flops control the flow of data sets through the memory 1400 in much the same manner that railroad signal lights control the flow of trains along a track. A data set is allowed to advance only so long as room is available up ahead. When the control flip-flops indicate that the data set cannot advance out of a 32 bit shift register, gating logic cuts off the flow of shift pulses to the register and effectively locks the data within the register. When the "track" ahead is once again clear, the flow of shift pulses to the register is allowed to resume, and the 32 bit event data set is allowed to advance.

MEMORY BOARD 1 in FIG. 14 includes the five control flip-flops 1491–1495. These five control flip-flops, as well as the control flip-flops located on the other boards, are interconnected to form a control shift register similar to the shift register of FIG. 7. When a 32 bit event data set is first fed into the first 32 bit shift register in memory board N, an S0 timing pulse causes the MEMORY LOAD signal to be read into the first control flip-flop. The signal, once read into the first control flip-flop, is called a BUSY BIT, because it indicates that the 32 bit shift register associated with that control flip-flop contains data, or is "busy". Successive S0 pulses cause the BUSY BIT to advance through the control flip-flops at the same rate that the 32 bit event data set advances through the 32 b'. shift registers. As is shown by the timing diagram in FIG. 2G, one S0 pulse occurs for every 32 MEMORY SHIFT pulses. After a 32 bit event data set is advanced from one 32-bit shift register to the next, by 32 MEMORY SHIFT pulses, an S0 pulse causes the associated BUSY BIT to advance. The SO pulses are controlled by the same gating logic that control the flow of MEMORY SHIFT pulses to the 32 bit shift registers, so whenever a 32 bit event data set is detained within a 32 bit shift register, the associated BUSY BIT is also detained within the associated control flip-flop. Thus, the BUSY BIT and the associated data set are always kept together.

As is shown on board 1, gating logic controls the flow of MEMORY SHIFT pulses to the 32 bit shift registers, and also controls the flow of S0 pulses to the control flip-flops A control NAND gate, in turn, controls the gating logic. For example, the gating logic for the 32 bit shift register 1432 and the control flip-flop 1492 comprises the gates 1444 and 1472, which are controlled by a control NAND gate 1454. The NAND gate 1444 controls the flow of MEMORY SHIFT pulses to the shift pulse (SP) input of the 32 bit shift register 1432, and the AND gate 1472 controls the flow of S0 pulses to the clock input of the control flip-flop 1492. Input 1 of the gate 1444 and input 2 of the gate 1472 are both connected to the output of the control NAND gate 1454. When the output of the control NAND gate 1454 is positive, the gates 1444 and 1472 are enabled and allow shift pulses to pass; when the output of the control NAND gate 1454 is negative, the gates 1444 and 1472 are disabled, and the flow of shift pulses is halted. The output of any control NAND gate, such as the gate 1454, is called an inverted MEMORY FULL signal. The inverted MEMORY FULL signal at the output of any control NAND gate is at ground potential only when the memory is completely full up to that point.

Identical gates 1446–1450, 1471–1475, and 1470, 1454, 1458, 1462 and 1466 are provided for the other 32 bit shift registers and control flip-flops on memory board 1, as can be seen in FIG. 14. The A section of the AND-NOR gate 1442 can be ignored for now, and the B section of the gate 1442 can be assumed to function in the same manner as the NOR gates 1444 to 1450.

It is the control NAND gates 1470, 1454, 1458, 1462, and 1466 that actually control the flow of data sets through the memory 1500. The second input to each control NAND gate is connected to the Q output of the associated control flip-flop. This second input is at ground potential whenever the associated 32 bit shift register is empty, as indicated by the control flip-flop being in the $\bar{Q}$ state. When the second input to a control NAND gate is at ground potential, the output of the control NAND gate is held positive. Thus, whenever a 32 bit shift register is empty, a data set can always be shifted into the register.

The first input to each of the control NAND gate is connected to a MEMORY FULL signal generated by previous stages of the memory 1400. As mentioned above, the output of each control NAND gate is an inverted MEMORY FULL signal that goes to ground only when that section of the memory and all previous sections are full. NOT gates 1452, 1456, 1460, 1464, and 1468 are provided to invert these signals and produce non-inverted MEMORY FULL signals. These non-inverted MEMORY FULL signals are passed from each section of the memory 1500 into the first input of the control NAND gate within the next section.

When both inputs of a control NAND gate are positive, this indicates that all prior sections of the memory 1500 are full, and that the 32 bit shift register associated with this control NAND gate is also full. The output of the control Nand gate goes negative, disabling the associated gating logic and preventing shift pulses from reaching either the associated 32 bit shift register or the associated control flip-flop. A NOT gate connected to the output of the control NAND gate generates a positive MEMORY FULL signal that is passed on to the next control NAND gate, and so it goes from one section of the memory to the next.

The first input to the control NAND gate 1470 is connected to the positive supply voltage Vcc and is always positive. This is done since there is nowhere for data to go when it leaves the 32-bit shift register 1440, and hence there is no MEMORY FULL signal to feed into the gate 1470. When a first 32 bit event data set enters the shift register 1440, and when the associated BUSY BIT enters the control flip-flop 1491, the control NAND gate 1470 immediately generates a ground level signal and disables the gates 1442 and 1471. The NOT gate 1450 generates a positive level MEMORY FULL signal and feeds it to the control NAND gate 1454. A second data set proceeds only so far as the shift register 1432. When a second data set has entered the shift register 1432 and when the associated BUSY BIT has entered the control flip-flop 1492, the control NAND gate 1454 cuts off shift pulses to the shift register 1432 and to the control flip-flop 1492 and prevents the data set from proceeding any further. The NOT gate 1456 generates a MEMORY FULL signal and feeds it to the control NAND gate 1458. In a similar manner, succeeding 32 bit event data sets are successively stopped and held within the shift registers 1424, 1416, and 1408. When all these shift registers are full, the NOT gate 1468 generates a MEMORY FULL signal and feeds it to the first control NAND gate within memory board 2, so that the next 32 bit event data set will be stopped and held before it leaves memory board 2, in the shift register that corresponds to the shift register 1440 in board 1. This process of stopping and holding data sets continues until the entire expandable memory 1400 is full if necessary. The MEMORY FULL signal generated by the last board (board N) is then fed back to the assembly shift register control logic 600, where it prevents the generation of the LOAD ENABLE signal, and thus stops the compilation of 32 bit event data sets until more room is available within the memory 1400.

When a data set is read out of the memory 1400, all the remaining data sets immediately shift forward one shift register, and the final MEMORY FULL signal drops to ground to allow another next 32 bit event data set to be assembled and fed into the memory 1400.

Data is read out of the expandable memory 1400 at a slow, teleprinter rate of speed. TTY (teleprinter) pulses are continuously applied to the A1 input of the AND-NOR gate 1442. These pulses are the same pulses which are used to control the spacing of bits in the teleprinter output signal. When a DATA SHIFT COMMAND signal is applied to the A2 input of the AND-NOR gate 1442, the TTY pulses are applied directly to the shift pulse input (SP) of the 32 bit shift register 1440, and data is shifted out of the shift register 1440 at the teletype bit rate.

When sufficient data has been read out of the shift register 1440 to complete a given event printout, an inverted LINE ERASE pulse is applied to the clear (*c*) input of the control flip-flop 1491. This pulse shifts the control flip-flop 1491 into the $\bar{Q}$ state and erases the BUSY BIT. The LINE ERASE pulse is an S2 timing pulse and therefore occurs between sets of 32 MEMORY SHIFT pulses.

When the BUSY BIT is erased, the Q output of the flip-flop 1491 goes to ground. This ground level signal is fed into the second input of the control NAND gate 1470. The output of the control NAND gate 1470 goes positive, allowing shift pulses to reach the 32 bit shift register 1440 and the control flip-flop 1491. The MEMORY FULL signal at the output of the NOT gate 1452 goes to ground, indicating that data can now be accepted by the 32 bit shift register 1440. This ground level MEMORY FULL signal is then propogated through the entire memory 1400. It passes through the control NAND gate 1454, the NOT gate 1456, the control NAND gate 1458, the NOT gate 1460, and so on. All the 32 bit shift registers and control flip-flops within the memory 1400 are thus enabled to receive shift pulses. During the next 32 MEMORY SHIFT pulses, each data set within the memory 1400 is shifted forward into the next 32 bit shift register. The next SO pulse then shifts each BUSY BIT forward into the next control flip-flop.

A new 32 bit event data set is shifted into the 32 bit shift register 1440, and a new BUSY BIT is shifted into the control flip-flop 1491. The flip-flop 1491 is now once again in the Q state, and a positive voltage from the Q output is fed to the second input of the control NAND gate 1470. The output of the control NAND gate 1470 goes to ground and disables the gates 1471 and 1442 B, thus locking the new data set within the 32 bit shift register 1440. The NOT gate 1452 generates a positive MEMORY FULL signal, which is once again propogated through the occupied sections of the memory 1400, stopping the various data sets from moving forward.

To provide an indication of when the memory 1400 is completely empty, an AND gate 1496 is included within each memory board. The inputs to this AND gate are the $\overline{Q}$ outputs of the control flip-flops, and the output of the corresponding AND gate in the previous board. When the memory 1400 is empty, no BUSY BITS are present, and the $\overline{Q}$ outputs of all the control flip-flops are positive. The inputs to the AND gates 1496 are therefore positive, and the AND gate outputs are also positive. A positive signal and the output of the AND gate 1496 in memory board 1 is thus an indication that the memory 1400 is entirely empty. The output of this gate is called a MEMORY signal.

The outputs of the control flip-flop 1491 are called the DATA READY and the inverted DATA READY signals. The DATA READY signal is positive only when the 32 bit shift register 1440 contains a 32 bit event data set that is ready to be fed to the teleprinter output logic 1500. The DATA READY signal is used to energize the output logic 1500 and initiate the data printout. This DATA READY signal is the only communicative link between the scanning and data assembling part of the system 100, which has now been fully described, and the teleprinter output logic 1500, which will be described next. The two parts of the system 100 function entirely independently of one another. The printout process thus never interferes with the scanning and data assembly process, and vice versa.

TELEPRINTER OUTPUT LOGIC

FIG. 15 shows the teleprinter output logic 1500 in block diagram form. This logic accepts data from the expandable memory 1400 and prepares a signal that can be fed to the teleprinter 3200.

When a 32 bit event data set reaches the bottom of the expandable memory 1400, the expandable memory 1400 generates a DATA READY signal and feeds this signal to a teleprinter printout format control 1800. The teleprinter printout format control 1800 generates a MOTOR CONTROL signal and transmits this signal to the teleprinter 3200. This signal starts the teleprinter. After a suitable time delay, the teleprinter printout format control 1800 generates an OUTPUT ENABLE signal that initiates the operation of the bit and character counters 1700, and then sequentially generates the three format controlling signals that intiate the various sections of the printout. The three format controlling signals are called the DATE TTY (date teleprinter printout) signal the H/M TTY (hours and minutes teleprinter printout) signal, and the A/N TTY (alarm and return to normal event teleprinter printout) signal. The A/N TTY signal is often called the event location and time in seconds teleprinter printout signal.

The DATE TTY signal is generated first. This signal is fed to a teleprinter signal generating logic 2400 along with timing signals from the bit and character counters 1700. The teleprinter signal generating logic 2400 uses these signals, and also the information coming over the data lines from the days counter 1318 (FIG. 13) to form a TELEPRINTER OUTPUT signal that causes the teleprinter 3200 to print: the letter D (for DATE); and a number representing the number of days which have passed since December 31st. The H/M TTY signal is generated next. This signal is fed to the teleprinter signal generating logic 2400 along with the timing signals from the bit and character counters 1700. The logic 2400 uses these signals and also information coming over the data lines from the minutes counter 1302 and from the hours counter 1310 to form a TELEPRINTER OUTPUT signal that causes the teleprinter 3200 to print: the letter T; the time in hours; and the time in minutes. Finally the A/N TTY signal is generated and fed to the teleprinter signal generating logic 2400 along with the timing signals. The logic 2400 uses these signals, and also information retrieved from the uppermost 32 bit event data set in the expandable memory 1400, to form a TELEPRINTER OUTPUT signal that causes the teleprinter to print: either the letter A (for an alarm event), or the letter N (for a return to normal event); the number of the variable that gave rise to the event; and the time in seconds and in fractions of a second when the event occurred.

The A/N TTY signal is also fed to a data shift command generator 2200. The data shift command generator 2200 generates a DATA SHIFT COMMAND signal which is fed to the expandable memory 14. As explained above, this signal causes data to be fed out of the memory 1400. The DATA SHIFT COMMAND signal is also fed to the teleprinter signal generating logic 2400 so that the logic 2400 knows when data is flowing into it from the expandable memory 1400.

When the expandable memory 1400 is empty, a MEMORY EMPTY signal is generated by the memory 1400 and is applied to the teleprinter printout format control 1800. This signal terminates the printout and causes the OUTPUT ENABLE signal to return to ground.

A counter reset circuit 1900 resets the bit and character counters 1700 when a particular teleprinter line of printout is completed. The circuit 1900 is necessary because the lines printed out differ in length, and therefore require differing numbers of character counts. Five reset signals come directly from the teleprinter printout format control 1800. These signals are labelled RESET A, RESET B, and RESET C, and they respectively cause the bit and character counters to reset at the termination of the date TTY printout, the H/M TTY printout, and when the memory 1400 is empty. The two remaining reset signals are labelled RESET D and FIND NEXT SUMMARY. The RESET D signal is generated by an overload bit detector 21. When an OVERLOAD BIT flows from the memory 1400, the overload bit detector 2100 generates a NULL TELEPRINTER signal to suppress the printout of the first digit in the time in seconds printout, and simultaneously generates the RESET D signal to reset the bit and character counters, thereby preventing the printout of the remaining digits in the time in seconds printout. In this manner, printout of the time in seconds and in fractions of a second is suppressed whenever a 32 bit event data set includes an OVERLOAD BIT. The FIND NEXT SUMMARY signal is generated by a code number translator 2300 whenever the code number part of a 32 bit event data set indicates the current printout is a summary or maintenance mode printout. This signal also suppresses the printout of the time in seconds and in fractions of a second by resetting the bit and character counters early.

When a MARKER BIT flows from the expandable memory 1400, an update pulse generator 2000 immediately generates an UPDATE pulse. This UPDATE pulse is fed through the marker bit flip-flop and logic 1100 (FIG. 11) to the minutes counter 1302 (FIG. 13), as was explained above. The UPDATE pulse is also fed to the teleprinter printout format control 1800, where it terminates the A/N TTY signal and reinitiates the H/M TTY signal, so that a new hours and minutes time printout is initiated. Thus, whenever a MARKER BIT is encountered, the minutes counter is advanced, and the updated time in hours and minutes is reprinted.

In order to prevent the memory data shift command generator 2206 from attempting to shift the MARKER BIT out of the memory 1400 a second time after it has once been fed into the update pulse generator 2000, the update pulse generator 2000 generates an INHIBIT FIRST BIT READOUT signal. This signal is fed to the data shift command generator 2200 and inhibits the readout of the MARKER BIT when the system once again starts reading data from the memory 1400.

It will be remembered that a three bit code number is used to represent the type of printout, and that this code number includes the first three bits of the teleprinter code for a letter that is actually printed out. A code number translator 2300 examines the code number and generates the additional two bits needed to complete the letter code. Two signals are generated, a SUMMARY signal and a SUMMARY OR ALARM signal. The SUMMARY signal causes the fifth bit in the code to be a "1" when the summary code number is encountered, and the SUMMARY OR ALARM signal causes the fourth bit in the code to be a "0" whenever the summary or the alarm code numbers are encountered. In all other cases, the fourth bit is a "1" and the fifth bits is a "0". A FIND NEXT SUMMARY signal is also generated by the code number translator 2300 whenever a summary or maintenance code number is encountered. The FIND NEXT SUMMARY signal is used during summary mode operations to reinitiate summary scanning at the completion of a summary printout, as will be explained.

The teleprinter signal generating logic 2400 is an array of logical gates which combine the various data signals with the bit, character, and format signals to generate the TELEPRINTER OUTPUT signal. The teleprinter signal generating logic 2400 contains no memory elements or flip-flops, but only simple logical gates.

A teleprinter timing clock 1600 generates the proper timing signals for coordinating the various sections of the teleprinter output logic 1500. The connections between the teleprinter timing clock 1600 and other elements of the logic 1500 are not shown in FIG. 16. The clock 1600 is synchronized with the high frequency clock 200.

The bit and character counters 1700 are two simple counting circuits. The bit counter keeps track of the particular bit within a character that is being generated, and the character counter keeps track of the particular character within a line that is being generated. These two counters run freely whenever the OUTPUT ENABLE signal generated by the teleprinter printout format control 1800 is positive, and are reset by the counter reset circuit 1900. The connections between the character and bit counters 1900 and other elements of the logic 1500 are not shown in FIG. 15.

TELEPRINTER TIMING CLOCK

FIG. 16 shows the teleprinter timing clock 1600. The clock 1600, like the high-frequency clock 200, runs continuously. Basically, the clock 1600 comprises a counter that counts 317 pulses of the DIVIDE BY 36 signal and then resets itself to zero. The clock 1600 includes two decade counters 1602 and 1604, and two binary flip-flop counters 1606 and 1608. The decade counters and flip-flop counters are arranged as shown in FIG. 16 to form a BCD counter capable of counting to 400. An AND gate 1610 is used to reset the counters when the count reaches 317. As shown in FIG. 16, the inputs of the AND gate 1610 are the outputs from the various counter sections which are positive when the count is 317. The output signal generated by the gate 1610, which is fed to the clock input of a flip-flop 1620, is normally at ground. It goes positive when the count reaches 317. When the count reaches 318, the output of the gate 1610 returns to ground and toggles the flip-flop 1620 into the Q state. The Q and $\bar{Q}$ outputs of the flip-flop 1620 are fed back to the reset terminals of the counters 1602 and 1604, and to the clear terminals of the flip-flops 1606 and 1608, resetting the counting circuit to zero count. The flip-flop 1620 is then cleared by the next inverted SO pulse generated by the high frequency clock 200 (FIG. 1). A new counting cycle then begins.

The basic output of the clock 1600 is the Q output of the flip-flop 1608. This square wave signal is called the TTY (teleprinter) signal. The pulses making up this wave are called TTY pulses. Inverted TTY pulses appear at the $\bar{Q}$ output of the flip-flop 1608.

When the flip-flop 1608 toggles into the Q state, the $\bar{Q}$ output applies a negative level change to the clock terminal of a flip-flop 1622, momentarily triggering the flip-flop 1622 into the Q state. The flip-flop 1622 is immediately cleared by an inverted SO pulse which is applied to the flip-flop 1622 clear input. The Q output of the flip-flop 1622 is a narrow pulse called the TTY SYNC pulse.

The TTY signal goes to ground when the count advances from 317 to 0. During the 316th count a TTY RESET pulse and an inverted TTY RESET pulse are generated by a NAND gate 1612 and a NOT gate 1618. The NAND gate 1612 generates a pulse during the 316th count in the same manner that the AND gate 1610 generates a pulse during the 317th count. The TTY RESET pulse is suppressed except during the eleventh bit of each teleprinter character by a B 11 signal supplied by the bit counter 1702 (FIG. 17A).

A MEMORY LINE CLEAR timing pulse is generated by the clock 1600 when the count reaches 314, but again only during the eleventh bit of each teletype character, and only for the duration of a single S 2 pulse. The counter output leads which are positive when the count reaches 314 are fed into an AND gate 1614, along with the S 2 timing pulse signal and a B 11 (bit eleven) signal generated by the bit counter 1702 (FIG. 17). A NOR gate 1616 combines the two least significant bit outputs of the counter 1604 and applies the resultant signal to an input of the AND gate 1614. The output of the NOR gate 1616 is at ground potential during the 315th, 316th, and 317th counts. The NOR gate 1616 thus suppresses pulses which would otherwise appear at the output of the AND gate 1614 during those counts. The MEMORY LINE CLEAR timing pulse causes the character counter reset circuit 1900 (FIG. 19) to generate an inverted LINE ERASE pulse whenever it is desired to erase the remainder of a 32 bit event data set within the expandable memory 1400. As explained above, the inverted LINE ERASE pulse erases the data set nearest the output end of the memory, and allows all other data sets to shift forward and fill the gap left by the erasure.

BIT AND CHARACTER COUNTERS

The bit and character counters 1700 are shown in FIG. 17A. The counter 1702 generates 11 sequential bit pulses B1 to B11, and the character counter 1704 generates 13 sequential character pulses C1 to C13. Inverted TTY pulses are fed through an AND gate 1701 to the count input of the counter 1702. The counter 1702 advances each time the count input goes positive, so the count changes each time the count within the teleprinter clock 1600 advances from 317 to zero. Each time the bit counter 1702 advances from B11 to B1, a CARRY pulse advances the character counter 1704. Both normal and inverted outputs are provided from the two counters. Both counters have RESET inputs for receiving COUNTER RESET pulses from the counter reset circuit 1900. The OUTPUT ENABLE signal is fed to a second input of the AND gate 1701, so the counters 1702 and 1704 do not function when the OUTPUT ENABLE signal is at ground.

FIG. 17B shows a simple NAND gate flip-flop 1706–1708 which, together with a NAND gate 1718, generates special character (C) rate timing signals. The output of the NAND gate 1708 is positive during character counts C4 through C10, and during character counts C12 and C13. The output of the NAND gate 1718 is positive during character counts C4 through C13.

FIG. 17C shows a similar circuit that is used to generate special bit (B) rate timing signals. Two NAND gate flip-flops 1710–1712 and 1714–1716 are used. The various outputs of this circuit are positive during the bit counts indicated, and are negative at all other times.

The circuits shown in FIG. 17B and 17C are not essential to the present invention, since simple gating logic circuitry can be used without flip-flops to form these same output signals. The use of flip-flops in these circuits saves on the quantity of NAND gates required to generate the desired signals.

TELEPRINTER PRINTOUT FORMAT CONTROL

The four parts of FIG. 18 include the logic circuitry for generating the three format controlling signals, and the logic circuitry for generating the MOTOR CONTROL and OUTPUT ENABLE signals.

FIG. 18A includes the logic circuitry for generating the DATE TTY signal, the MOTOR CONTROL signal, and the COUNTER RESET A signal. The DATE TTY signal appears at the Q output of a flip-flop 1816, the MOTOR CONTROL signal appears at the output of a NAND gate 1824, and the COUNTER RESET signal appears at the output of a NAND gate 1822.

Operation of this circuit is initiated by the DATA READY signal. The DATA READY signal is generated by the last control flip-flop 1491 in the expandable memory 1400 (FIG. 14) when a 32 bit event data set is ready to be fed out of the memory 1400. The DATA READY signal passes through the NAND gate 1808 during an S2 pulse and toggles the NAND gate flip-flop 1802–1804. The output of the NAND gate 1802 goes to ground and toggles the flip-flop 1810 into the Q state, and initiates the printout procedure. When the printout is completed and the expandable memory 1400 is empty, an inverted DATA READY signal passes through the NAND gate 1806 during an S2 pulse and toggles the NAND gate flip-flop 1802–1804 back into its rest state. S2 pulses are supplied to the third inputs of the NAND gates 1806 and 1808. An inverted OUTPUT ENABLE signal is applied to the first inputs of the gates 1806 and 1808 to prevent the NAND gate flip-flop from resetting before a printout is completed when the memory 1400 becomes momentarily empty.

The $\overline{Q}$ output of the flip-flop 1810 goes to ground when the NAND gate flip-flop 1802–1804 is toggled by the DATA READY signal. This ground level signal is applied to the second input of a NAND gate 1824, and causes the MOTOR CONTROL signal at the output of the NAND gate 1824 to go positive. The MOTOR CONTROL signal starts the teleprinter motor. When the flip-flop 1810 toggles back into the $\overline{Q}$ state, the MOTOR CONTROL signal is maintained for the duration of the printout by the inverted OUTPUT ENABLE signal, which is fed into the first input of the NAND gate 1824.

The flip-flops 1810, 1812, 1814, and 1816 have their Q-$\overline{Q}$ outputs and their J-K inputs interconnected in shift register fashion. The flip-flop 1810 is toggled into the Q state by the DATA READY signal, as explained above. The remaining flip-flops 1812, 1814, and 1816 are then sequentially toggled into the Q state by negative level changes applied to their respective clock inputs. The DATA TTY signal goes positive when the flip-flop 1816 toggles into the Q state.

In order to allow time for the teleprinter motor to reach operating speed, it is necessary to provide a delay between the time when the flip-flop 1810 is toggled into the Q state and the time when the flip-flop 1816 is toggled into the Q state. This delay is provided by a divide by 80 scaler 1818. The divide by 80 scaler is a counter circuit that gives one output pulse for every 80 TTY input pulses. Any suitable scaler or counter circuit can be used as the scaler 1818. The output of the divide by 80 scaler 1818 is fed to the clock terminal of the flip-flop 1812, and also to the clock terminal of the flip-flop 1814 through the second input of an AND gate 1820. The first input of the AND gate 1820 is connected to the Q output of the flip-flop 1812 to prevent pulses generated by the divide by 80 scaler 1818 from reaching the flip-flop 1814 when the flip-flop 1812 is in the $\overline{Q}$ state. After the flip-flop 1810 has toggled into the Q state, the next output pulse from the divide by 80 scaler toggles the flip-flop 1812 into the Q state. The flip-flop 1814 is toggled into the Q state by the next output pulse from the scaler 1818. This pulse comes exactly 80 TTY pulses later. Thus, the teleprinter motor has a time span of at least 80 TTY pulses during which to reach operating speed. The next TTY pulse triggers the flip-flop 1816 into the Q state and initiates the DATE TTY signal and the date printout.

The date printout includes six teletype characters: A LINE FEED character; a carriage return character; the letter D, which stands for DATE; and a three digit number which represents the particular day of the year. After the six characters have been transmitted to the teleprinter 3300, the character and bit counters 1700 are reset by the COUNTER RESET A signal generated by the NAND gate 1822. The inputs to the NAND gate 1822 are the DATE TTY signal, the C 6 character pulse, and the TTY RESET pulse. The TTY RESET pulse preceeds the trailing edge of each TTY pulses by a very short time interval. The output of the NAND gate 1822 is normally positive. It goes to ground when it receives a TTY RESET signal, just before the termination of the six character in the date printout. This ground level signal is used clear of the flip-flops 1810, 1812 and 1814, as well as to activate the counter reset circuit 1900. The flip-flop 1816 toggles into the Q state and terminates the DATE TTY signal at the end of the sixth character. It is again toggled by the trailing edge of a TTY pulse.

FIG. 18B includes the circuitry for generating the H/M TTY signal which appears at the Q output of a flip-flop 1834, and the COUNTER RESET B signal which appears at the output of a NAND gate 1836. This circuit is activated by a negative going level change which appears at the Q output of the flip-flop 1810 in FIG. 18A at the end of the date printout. This negative going level change is called the H/M ENABLE PULSE. It is applied to the clock input of a flip-flop 1832 just prior to the completion of the sixth character in the date printout, and it toggles the flip-flop 1832 into the Q state. The flip-flop 1834, which is connected to the outputs of the flip-flop 1832 in shift register fashion, is then quickly toggled into the Q state by the trailing edge of a TTY pulse applied to the flip-flop 1834 clock input. This is the same TTY pulse that terminated the DATE TTY signal, so the H/M TTY signal commences simultaneously with the termination of the DATE TTY signal at the start of the first character in the H/M TTY printout.

The hours and minutes time printout (H/M TTY) includes eight characters: A LINE FEED character; a carriage return character; the letter T which stands for time; a two digit number representing the time in hours; a colon; and a two digit number representing the time in minutes. After the printout of the eighth character, the bit and character counters 1700 are reset by the COUNTER RESET B signal generated by the NAND gate 1836. The NAND gate 1836 has three inputs: the H/M TTY signal; the C 8 character pulse from the character counter; and the TTY RESET signal. The output of the NAND gate 1836 is normally positive. It goes to ground when a TTY RESET pulse is received during the eighth character of the hours and minutes time printout. The COUNTER RESET B signal clears the flip-flop 1832 and also activates the counter reset circuit 1900. The flip-flop 1834 then toggles back into the $\overline{Q}$ state when it is toggled by the trailing edge of a TTY pulse, and terminates the H/M TTY signal at the termination of the eighth character in the hours and minutes time printout.

FIG. 18C includes the circuitry for generating the A/N TTY signal which appears at the Q output of a flip-flop 1844, and the COUNTER RESET C signal which appears at the output of a NAND gate 1846. Operation of this circuit is initiated by a negative level change which appears at the Q output of the flip-flop 1832 (FIG. 18B) just before the completion of the final character in the hours and minutes time printout. This negative level change, which is called the A/N ENABLE pulse, is applied to the clock terminal of a flip-flop 1842, and causes the flip-flop 1842 to toggle into the Q state. The flip-flop 1842 and the flip-flop 1844 are interconnected to form a shift register. The trailing edge of a TTY pulse applied to the clock terminal of the flip-flop 1844 then toggles the flip-flop 1844 into the Q state and initiates the A/N TTY signal. The H/M TTY signal is terminated by the same TTY pulse trailing edge which initiates the A/N TTY signal, so the last character of the hours and minutes time printout is followed immediately by the first character of the event location and time in seconds printout.

The event location and time in seconds printout includes up to 13 characters: A LINE FEED character; a carriage return character; the letter A (for alarm), N (for return to normal), S (for summary), or M (for maintenance); a three digit number representing the event location or variable number; two blank spaces; a two digit number representing the time in seconds; a decimal point; and a two digit number representing the time in hundredths of a second.

Since the event location and time in seconds printout is usually a 13 character printout, and since the character counter automatically returns to 0 after counting to 13, no counter reset signal is required. The A/N TTY signal remains positive, and the bit and character counters are allowed to run free so long as there are 32 bit event data sets ready to be fed out of the expandable memory 1400.

When all of the 32 bit event data sets have been fed out of the expandable memory 1400, a MEMORY EMPTY signal is generated by the expandable memory and is applied to the first input of a NAND gate 1846. This signal enables the gate 1846 and allows the next TTY RESET pulse to pass through the gate 1846, clear the flip-flop 1842, and generate the COUNTER RESET C signal. The trailing edge of the next TTY pulse then toggles the flip-flop 1844 back into the $\overline{Q}$ state, terminating the A/N TTY signal and also terminating the printout procedure.

FIG. 18D includes only the circuitry used to generate the OUTPUT ENABLE signal. The signal appears at the output of a NAND gate 1852. The input signals to the NAND gate 1852 are the inverted DATE TTY signal, the inverted H/M TTY signal, and the inverted A/N TTY signal. The output of the NAND gate 1852 is negative only when all three of the input signals are positive, that is, when no printout is in progress. The OUTPUT ENABLE signal is positive whenever a printout is in process. An inverted OUTPUT ENABLE signal is generated by a NOT gate 1854.

When it is desired to suspend the event location and time in seconds printout and to reprint the time in hours and minutes, an inverted UPDATE PULSE is generated by the update pulse generator 2000. This inverted pulse is timed to coincide with the TTY RESET pulse at the end of the second character (carriage return character) of the event location and time in seconds printout, thus terminating the printout after the carriage return but before anything is printout out. The inverted UPDATE PULSE is applied to the set (S) input of the flip-flop 1832 (FIG. 18B) and shifts this flip-flop into the Q state. The flip-flop 1834 then toggles into the Q state at the end of the character, and once again generates a positive H/M TTY signal. The next character generated, then, is the third character (the letter T) in the hours and minutes printout. The hours and munutes printout then proceeds as usual, and the event location and time in seconds printout recommences in the usual manner. The character and bit counters are not reset.

When the flip-flop 1832 is shifted into the Q state by the inverted UPDATE pulse, the $\overline{Q}$ output of the flip-flop 1832 goes to ground. This ground level signal is applied to the clear (C) input of the flip-flop 1844 and thus terminates the A/N TTY signal just before the H/M TTY signal recommences. This ground level signal is called the A/N CLEAR pulse.

The Q output of the flip-flop 1842 in FIG. 18D is called the A/N ENABLE signal. This signal is used in the update pulse generator 2000.

COUNTER RESET CIRCUIT

FIG. 19 shows the character and bit counter reset circuit 1900. This circuit includes a flip-flop 1904 which is normally in the $\overline{Q}$ state. The clock input to this flip-flop 1904 is connected to the output of a NAND gate 1902. Normally all six inputs of the NAND gate 1902 are positive, and the output is at ground potential. Whenever any input to the NAND gate 1902 goes to ground and returns to a positive level again, a positive pulse is generated by the NAND gate 1904. The trailing edge of this pulse toggles the flip-flop 1904 into Q state. The flip-flop 1904 remains in the Q state for a very short time. It is reset by an inverted SO pulse which is applied to the clear (C) input of the flip-flop. The pulse which appears at the Q output of the flip-flop 1904 is called the COUNTER RESET pulse, and it is used to reset the bit and character counters 1700.

The six input signals to the NAND gate 1902 include the inverted A, B, and C COUNTER RESET signals generated by the teleprinter printout format control 1800, the inverted D COUNTER RESET signal generated by the overload bit detector 2100, the inverted FIND NEXT SUMMARY signal generated by the code number translator 2300, and an inverted C13 pulse. The purpose of the inverted A, B, and C reset signal has already been explained. The inverted D signal is used to reset the bit and character counters 1700 after the sixth character of an event location and time in seconds printout when an OVER-LOAD BIT accompanies a 32 bit event data set, indicating that a printout of the time in seconds is not desired. The FIND NEXT SUMMARY signal performs a similar function, supressing the printout of the time in seconds during summary or maintenance mode printouts. The C 13 signal resets the character counter in every case after a 13th character is printed.

As an additional function, the counter reset circuit 1900 is used to generate an inverted LINE ERASE pulse which erases that part of a 32 bit event data set which remains in the expandable memory 1400 when a printout is terminated prematurely, as when the time in seconds is not to be printed out.

An inverted LINE ERASE pulse is also generated after the 13th character of a normal printout, to erase the BUSY BIT from the control flip-flop 1491 (FIG. 14) when a 32 bit event data set has been completely read out of the expandable memory 1400. The inverted LINE ERASE pulse allows all the remaining 32 bit event data sets within the memory 1400 to shift towards the MEMORY DATA output end of the memory, and thus allows a new 32 bit event data set to be positioned at the end of the memory 1400.

A gate 1908 generates an inverted LINE ERASE pulse whenever it is enabled to pass a MEMORY LINE CLEAR timing pulse by a MEMORY CLEAR signal. The MEMORY CLEAR signal is generated by a gate 1906 in response to the inverted COUNTER RESET D, FIND NEXT SUMMARY, or C13 signals.

UPDATE PULSE GENERATOR

FIG. 20 shows the update pulse generator 2000. This circuit generates an inverted UPDATE pulse whenever a 32 bit event data set is encountered that includes a MARKER BIT. The MARKER BIT is the first bit in a data set, so it is the bit that first appears at the MEMORY DATA output of the memory 1400. This MEMORY DATA signal, together with the A/N ENABLE signal and the C2 character count signal, enable an AND gate 2002 to pass a TTY RESET pulse during the second character of an event location and time in seconds printout, but only if the MARKER BIT displayed by the MEMORY DATA signal is a "1." The flip-flop 2004 is initially in the $\bar{Q}$ state, and the $\bar{Q}$ output of the flip-flop 2004 normally enables a NAND gate 2006. Therefore, if a TTY RESET pulse passes through the AND gate 2002, it also passes through the NAND gate 2006 and becomes an inverted UPDATE pulse. The UPDATE pulse is generated during the last portion of the eleventh bit of the second character in an event location and time in seconds printout, but only if the data being printed out includes a MARKER BIT. The UPDATE pulse passes through the marker bit flip-flop and logic 1100 (FIG. 11), updates the minutes, hours, and days counters 1300, and initiates a new printout of the time in hours and minutes.

The output of the AND gate 2002 is applied to the clock input of the flip-flop 2004. The trailing edge of a TTY RESET pulse which passes through the gate 2002 and becomes an UPDATE pulse toggles the flip-flop 2004 into the Q state. This disables the NAND gate 2006 and prevents a second update pulse from being generated in response to the same MARKER BIT. The Q output of the flip-flop 2004 is called the inverted INHIBIT FIRST BIT READOUT signal. This signal prevents the data shift command generator 22 from attempting to shift the same MARKER BIT out of the expandable memory twice, as will be explained.

The flip-flop 2004 is reset during the sixth character of the next event location and time in seconds printout by an inverted pulse that is applied to the flip-flop 2004 clear (c) terminal. The pulse is developed by feeding appropriate timing signals into a NAND gate 2008. An appropriate set of signals would be the A/N TTY signal, the C6 character timing signal, and the TTY SYNC signal. The former two signals enable the NAND gate 2008 at the appropriate time, and the latter signal passes through the gate 2008 and clears the flip-flop 2004.

OVERLOAD BIT DETECTOR

The overload bit detector 2100 is shown in FIG. 21. This circuit detects the presence of an OVERLOAD BIT on the MEMORY DATA line coming from the expandable memory 1400, and generates signals which terminate the printout after the eighth teleprinter character has been formed and before the time in seconds has been printed out.

When an OVERLOAD BIT is detected, the NAND gate 2102 passes a TTY SYNC pulse and allows the pulse to set a NAND gate flip-flop 2104–2106. The flip-flop 2104–2106 then generates an inverted COUNTER RESET D signal which is fed to the counter reset circuit 1900. Resetting of the bit and character counters 1700 actually occurs when the leading edge of an inverted B1 bit timing pulse resets the flip-flop 2104–2106 and terminates the inverted COUNTER RESET D signal. This prematurely terminates the printout after the completion of the ninth character. The eighth character printout is suppressed in a manner to be described below.

The OVERLOAD BIT appears upon the MEMORY DATA line during the time interval when the fifth bit of the ninth character is being fed to the teleprinter 3300. The OVERLOAD BIT enables the gate 2102 to pass a TTY SYNC pulse. The gate 2102 is completely disabled during all other time intervals by either the C8 character timing signal or by the B5 bit timing signal, and thus no other memory bit other than an OVERLOAD BIT can enable the gate 2102.

Bits 2 through 4 of the ninth character in the printout have already been fed to the teleprinter 3500 when the OVERLOAD BIT is detected by the detector 2100. It is necessary to null out this partially formed character so that it is not printed. To accomplish this, the output of the NAND gate 2104 is fed into a NAND gate 2108, enabling the gate 2108 to pass one pulse of the B5–B8 bit timing signal. The output of the gate 2108 is called the inverted NULL TTY signal. The inverted NULL TTY signal is fed to the teleprinter signal generating logic 2400, inverted, and fed to the teleprinter 3300 as bits 5 through 8 of the ninth character. The ninth character is then interpreted by the teleprinter 3200 as a blank space, in accordance with the standard teleprinter code. Thus, there is no printout of the ninth character.

DATA SHIFT COMMAND GENERATOR

FIG. 22 is a logic diagram of the data shift command generator 2200. This circuit generates the DATA SHIFT COMMAND signal which allows one bit of memory data to shift out of the expandable memory 1400 at the end of each TTY pulse.

The DATA SHIFT COMMAND signal appears at the output of a NAND gate 2230 which is normally at ground level. The signal goes positive whenever it is desired to have the TTY pulse shift data out of the memory 1400. The signal is fed to the expandable memory 1400, and also to the teleprinter signal generating logic 2400. The NAND gate 2230 has three inputs, each of which is used to control the shifting of certain bits from the expandable memory 1400. These inputs are all normally positive. When any of the three inputs is negative, the output of the NAND gate 2230 goes positive, and a bit is shifted from the memory 1400 in response to the trailing edges of the TTY pulses. The DATA SHIFT COMMAND signal is generated only during an A/N TTY (event location and time in seconds) printout.

The first bit to be shifted out of the memory 1400 is the MARKER BIT. The MARKER BIT, it will be remembered, is detected by the update pulse generator 2000 during the generation of the 11th bit in the second (carriage return) character. The DATA SHIFT COMMAND signal is positive during the generation of this bit, so the MARKER BIT is shifted out of the memory 1400 at the completion of this bit. A NAND gate 2206 generates an inverted MARKER BIT MEMORY READOUT pulse which is applied to the second input of the NAND gate 2230 and which becomes this part of the DATA SHIFT COMMAND signal.

The next three bits to be read from the memory 1400 are the three bits which comprise the code number. These three bits are respectively shifted out of the memory 1400 at the termination of the generation of the second, third, and fourth bits of the third (code letter) character. As explained above, these three bits are fed directly through the teleprinter signal generating logic 2400 to the teleprinter 3300 and becomes the second, third, and fourth bits in the output code for the third character. A NAND gate 2208 generates an inverted CODE NUMBER MEMORY READOUT pulse which is applied to the third input of the NAND gate 2230 and which forms this part of the DATA SHIFT COMMAND signal. NOT gate 2232 inverts this signal and feeds it to the code number translator 2300 (FIG. 23) to enable the translator to translate the code number while the code number is shifted from the memory 1400.

The final 28 bits to be read from the memory 1400 are seven 4 bit BCD coded digits. The first three of these digits comprise together an event location number or variable number, and the remaining four digits comprise together the time in seconds and in hundredths of a second. These 28 bits are shifted out of the memory 1400 in four bit groups at the termination of the second, third, fourth, and fifth bits of the fourth , fifth, sixth, nineth, 10th 12th and 13th characters. As in the case of the three code number bits, these bits are fed directly to the teleprinter 3200 and actually become the second, third, fourth, and fifth bits in the output code for the above-mentioned seven characters. A NAND gate 2204 generates a series of seven inverted LOCATION TIME MEMORY READOUT pulses which are applied to the first input of the gate 2230 and which form this part of the SHIFT COMMAND signal.

The signals fed to the three gates 2204, 2206, and 2208 are the timing signals necessary to generate the above-mentioned output signals. An A/N TTY signal is applied to all three of the gates to prevent any memory data shift during a date printout or an hours and minutes time printout. The B2–B5 bit timing signal is applied to the two gates 2204 and 2208 to prevent any memory data shift from being initiated by these two gates except during the generation of the second through fifth bits of a character, and an inverted B5 signal is applied to the gate 2208 to prevent any memory data shift from being initiated by this gate during the fifth bit of a character. The C4–C10, C12–C13 timing signal applied to an input of the gate 2204 limits memory data shifts initiated by the gate 2204 to the fourth through 10th and the 12th and 13th characters. The inverted C7 and C8 timing signals, which are combined by AND gate 2202 and applied to an input of the gate 2204, prevent any memory data shift from being initiated by the gate 2204 during the seventh and eighth characters. The C3 timing signal applied to the input of the gate 2208 limits shifts initiated by this gate to the third character. The C2 and B11 timing signals applied to two inputs of the gate 2206 limit memory shifts initiated by this gate to the 11th bit of the second character.

As explained above, an UPDATE pulse prematurely terminates an event location and time in seconds printout, but only after the MARKER BIT is shifted out of the memory 1400. It is necessary to prevent the memory data shift command generator 2200 from attempting to shift the MARKER BIT out of the memory a second time when the event location and time in seconds printout recommences. This is done by having the update pulse generator 20 generate an INHIBIT FIRST BIT READOUT signal. This signal is fed into the fourth input of the NAND gate 2206. When an UPDATE pulse is generated, this signal goes to ground and disables the gate 2206, thereby preventing a second attempt to shift the MARKER BIT out of the memory 1400.

CODE NUMBER TRANSLATOR

The code number translator 2300 is shown in FIG. 23. This circuit analyzes the second and third bits in the code number, and thereby determines the nature of the printout. The circuit comprises basically two NAND gate flip-flops 2306–2308 and 2310–2312. These flip-flops are normally cleared during the first character printed out by an inverted C1 character timing pulse which is applied to the input of the NAND gates 2308 and 2310. When a code number readout occurs, the flip-flop 2306–2308 sets if and only if the second bit of the code number is a "1", and the flip-flop 2310–2312 sets if and only if the third bit of the code number is a "1."

The flip-flop 2306–2308 is set by a negative going pulse generated by a NAND gate 2302. The input signals to the gate 2302 are the CODE NUMBER READOUT signal, the MEMORY DATA signal, the TTY SYNC signal, and the B3 bit timing signal. During the generation of the third bit of the character during which the code number is being read out, the gate 2302 is enabled and allows a TTY SYNC pulse to set the flip-flop 2306–2308. It is necessary to prevent the memory data shift command generator 2200 from attempting to shift the MARKER BIT out of the memory a second time when the event location and time in seconds printout recommences. This is done by having the update pulse generator 20 generate an INHIBIT FIRST BIT READOUT signal. This signal is fed into the fourth input of the NAND gate 2206. When an UPDATE pulse is generated, this signal goes to ground and disables the gate 2206, thereby preventing a second attempt to shift the MARKER BIT out of the memory 1400.

CODE NUMBER TRANSLATOR

The code number translator 2300 is shown in FIG. 23. This circuit analyzes the second and third bits in the code number, and thereby determines the nature of the printout. The circuit comprises basically two NAND gate flip-flops 2306–2308 and 2310–2312. These flip-flops are normally cleared during the first character print out by an inverted C1 character timing pulse which is applied to the input of the NAND gates 2308 and 2310. When a code number readout occurs, the flip-flop 2306–2308 sets if and only if the second bit of the code number is a "1," and the flip-flop 2310–2312 sets if and only if the third bit of the code number is a "1."

The flip-flop 2306–2308 is set by a negative going pulse generated by a NAND gate 2302. The input signals to the gate 2302 are the CODE NUMBER READOUT signal, the MEMORY DATA signal, the TTY SYNC signal, and the B3 bit timing signal. During the generation of the third bit of the character during which the code number is being read out, the gate 2302 is enabled and allows a TTY SYNC pulse to set the flip-flop 2306–2308, but only if the MEMORY DATA signal is a "1". The NAND gate 2304 is similarly connected to be enabled only during the time interval when the fourth bit of this same character is generated, and only if the MEMORY DATA signal is a "1". The second and third bits of the code number respectively appear upon the MEMORY DATA line during the generation of these two bits, and therefore the flip-flops 2306–2308 and 2310–2312 set or do not set in accordance with the criteria set out above.

The code number translator serves two purposes. First, it generates the two bits which must be added to the three bit code number to form the proper letter code for each printout, as explained above. The output signal from the NAND gate 2310, which is called the ALARM OR SUMMARY PRINTOUT signal, is positive if the code number represents either an alarm (A) or a summary (S) printout. In either case the fifth bit in the printout must be a "0." In all other cases this sixth bit must be a "1". The ALARM OR SUMMARY PRINTOUT signal is inverted by the teleprinter signal generating logic 2400 and becomes the fifth bit of the third character in the event location and time in seconds printout. The outputs of the NAND gates 2306 and 2310 are both positive only in the case of a summary printout. Summary printout and only summary printout requires a "1" in the sixth bit position. Therefore the outputs of the two NAND gates 2306 and 2310 are combined by a NAND gate 2314 to produce an inverted SUMMARY PRINTOUT signal. This signal is inverted by the teleprinter signal generating logic and becomes the sixth bit of the third character in the event location and time in seconds printout.

Secondly, it generates an inverted FIND NEXT SUMMARY signal. The FIND NEXT SUMMARY signal is generated whenever a summary or maintenance mode printout occurs, and serves two purposes. First, it suppresses the printout of the time in seconds and fractions of a second during summary printout by applying a ground level signal to the counter reset circuit 1900 at the start of the sixth character of the printout. Secondly, it sets a flip-flop in the summary mode control logic 2600 and causes the system 100 to recommence summary scanning when the current printout is complete, as will be explained below. The output of the NAND gate 2314 is negative whenever a summary printout is in progress. A second NAND gate 2316 having inputs connected to the outputs of the NAND gates 2308 and 2312 is used to generate a signal that is negative whenever a maintenance printout is in progress. These two signals are combined by a NAND gate 2318 to form a signal that is positive during either a summary or a maintenance printout. This positive going signal is then combined with a C6 character timing signal by a NAND gate 2320 to form the inverted FIND NEXT SUMMARY signal.

TELEPRINTER SIGNAL GENERATING LOGIC

The teleprinter signal generating logic 2400 is fully disclosed in FIGS. 24A–24C. This logic utilizes the bit (B), character (C), and mode (DATE TTY, etc.) timing signals to sample various sources of data (the minutes, hours, and days counters and the MEMORY DATA signal) and to form an appropriate string of output characters for the teleprinter 3200. Forty-two different signals are generated and fed into a single teleprinter output AND gate 2499 (FIG. 24C). The signal generated by the AND gate 2499 is called the TELEPRINTER OUTPUT signal. The timing signals are so connected that only one of the 42 signals is transmitting data at any one moment. If any one of the 42 signals is at ground, a "0" is generated by the teleprinter output AND gate 2499; otherwise a "1" is generated.

Forth of the 42 signals are generated by NAND gates. When all of the inputs to any single NAND gate are positive, an "0" is transmitted to the teleprinter.

The first of the 42 signals (FIG. 24A) is the inverted NULL TTY signal generated by the overload bit detector 2100 (FIG. 21). This signal is normally positive. It goes negative at certain times to null out or stop the printout of a character that has been partially transmitted, as explained above.

Signals 2 through 27 (FIG. 24A) each transmit one bit of information from one of the counter outputs. Signals 2 through 12 supply bits 2 through 5 of characters 4, 5, and 6 of the date printout, deriving information from the output of the days counter 1318 (FIG. 13). Signals 21 through 27 supply bits 2 through 5 of characters 4 and 5 of the hours and minutes time printout, deriving information from the output of the hours counter 1310 (FIG. 13). Signals 13 through 20 supply bits 2 through 5 of characters 7 and 8 of the hours and minutes time printout, deriving information from the output of the minutes counter 1302 (FIG. 13). The gates 12, 20, and 27 fill in the missing zeros not supplied by the various counters but needed to fill out the teleprinter BCD characters.

Signals 28, 29 and 30 (FIG. 24B) generate the LINE FEED and CARRIAGE RETURN characters that are respectively the first and second characters of every printout. Signal 28 supplies "0"s during bits 6 through 8 of both characters. Signal 29 supplies a "0" during the third bit of the first (LINE FEED) character. Signal 30 supplies "0"s during the second and fourth bits of the second (CARRIAGE RETURN) character. The remaining bits in both characters are "1"s.

Signals 31–33 form the letter "D" as the third character of a date printout, and the letter "T" as the third character of the hours and minutes time printout. Signal 31 supplies "0"s during the sixth and seventh bits of the character representing the letter "D". Signal 32 supplies "0"s during the second, third, and fifth bits of both characters, and signal 33 supplies a "0" during the seventh bit of the character representing the letter T. The remaining bits in both characters are "1"s.

Signal 34 carries all the bits supplied by the MEMORY DATA signal. Signal 34 is active whenever the DATA SHIFT COMMAND signal is high, except during the eleventh bit of the second character when the MARKER BIT is read out of the memory. This signal is in use only during the second through fourth bits of the third character (code letter printout), and during the second through fifth bits of the fourth, fifth, sixth, nineth, 10th 12th and 13th characters (number printouts) of an event location and time in seconds (A/N TTY) printout.

Signal 35 supplies "0"s to bits 2 and 4 of the sixth character (colen) in an hours and minutes time printout. This signal, together with signal 41 which supplies a "0" to bit 8, forms the colen that separates the two digit number representing the time in hours from the two digit number representing the time in minutes.

Signal 37 supplies "0"s to bits 2 and 6 of the 11th character in an event location and time in seconds printout, to form the decimal point that separates the two digit number representing the time in seconds from the two digit number representing the time in 10ths and 100ths of a second.

Signals 38–40 generate the third character of an event location and time in seconds printout. It will be remembered that this character is an A (alarm event), N ( return to normal event), M (maintenance), or S (summary), depending upon what is being printed out. Bits 2–4 of this character come directly from the expandable memory 1400 as part of signal 34. Bits 5 and 6 of this character are generated by the code number translator 2300. Bit 5 is called the ALARM OR SUMMARY PRINTOUT signal, and becomes signal number 40. Bit 6 is called the inverted SUMMARY PRINTOUT signal, and becomes signal number 38. Signal number 39 supplies a "0" to the seventh bit position. Bit eight then automatically becomes a "1".

Signal 41 supplies "0"s to the eighth bit of all printed characters that are not letters. This includes all characters from the fourth character and on in all the printouts.

Signal 42 supplies a "0" to the first bit of all characters. This first bit is the teleprinter start signal, and is required in all characters.

MAINTENANCE AND SUMMARY MODE LOGIC

FIG. 25 is a block diagram showing additional elements of the system 100 that do not appear in FIG. 1. These elements are used only for summary and maintenance operations. In FIG. 25, elements of the system 100 which have been explained above are shown enclosed by broken lines. The four new elements are shown enclosed by solid lines.

As explained above, the system 100 can print out a summary listing of all variables which are abnormal without interferring with the normal event monitoring functioning of the system 100. Such summary mode operations of the system are controlled by a summary mode logic 2600, and a summary printout is initiated by depressing a pushbutton within the logic 2600. In summary mode, the system 100 goes through the entire set of annunciator circuits and prints out a complete listing of all annunciator points that are in an acknowledged alarm state. The scanner 300 proceeds serially through the annunciator circuits until it finds one which is in the acknowledged alarm state. A 32 bit event data set for this annunciator circuit is assembled and fed into the memory 1400 along with the code number for summary operation, and a printout is initiated in the usual manner. The contents of the scanner 300 are then stored within a comparator 2900, and the summary mode control logic 2700 relinquishes all control over the system 100 and allows the usual scanning for events to resume. The expandable memory never contains more than one summary 32 bit event data set at any one time, and is therefore always available for the reception of 32 bit event data sets relating to events which may arise. If a new alarm or return to normal event does arise during the summary printout process, summary printout is immediately terminated.

Shortly before the end of a summary printout, the code number translator 2300 generates a FIND NEXT SUMMARY signal and feeds it to the summary mode control logic 2600. MEMORY EMPTY signal from the expandable memory 1400 is also fed to the summary mode control logic 2600. When the summary mode control logic receives both of these signals, it regains control of the system 100. When the scan next reaches the variable number which is stored in the comparator 2900, summary scanning again resumes.

When the scanner 300 reaches the 999th annunciator circuit, the 999 pulse causes a maintenance and summary reset logic 2800 to generate a SUMMARY RESET signal. This SUMMARY RESET signal is fed to the summary mode control logic 2600, and terminates the summary printout. The maintenance and summary reset logic 2800 also terminates the summary printout whenever an ALARM on RETURN TO NORMAL pulse is generated by the event logic 500.

The system 100 also has a maintenance routine which it may be put through. The maintenance routine produces a listing of annunciator circuits which do not respond in the proper manner, and which are probably defective. The maintenance mode of operation is initiated by pressing a pushbutton within the maintenance mode control logic 2700. At the start of the maintenance mode the logic 2700 generates an ANNUNCIATOR TEST signal. This signal is applied to the annunciator circuit and logic 400 and puts all of the annunciator circuits into the unacknowledged alarm state by clearing all of the annunciator circuit flip-flops (such as the flip-flops 444 and 445 in FIG. 4D). The maintenance mode control logic 2700 then allows the scanner 300 to go through several cycles, during which time all of the artificially induced alarms are acknowledged, all of the annunciator circuits which have no real alarms are returned to normal, and the annunciators which have returned to normal are also acknowledged. During this time the maintenance mode control logic 2700 generates various suppression and inhibit signals to prevent any printout other than printouts indicating that certain annunciators are not in the proper state at the proper time. The maintenance mode control logic 2700 then allows the scanner to make a normal scan looking for any annunciator circuits which are in an unacknowledged state. Since all annunciator circuits should have been acknowledged by the above procedure, any circuits unacknowledged at this time are defective, and a list of these defective circuits is printed out. When this is completed, the maintenance mode control logic 2700 generates a MAINTENANCE SUMMARY signal which initiates a normal summary mode printout. By comparing this special summary mode printout to a normal summary mode printout, it is possible to locate more defective annunciator circuits. At the end of this summary printout, the maintenance and summary reset logic 2800 generates reset signals which return the system 100 to its normal operating state.

Both the summary mode control logic 2600 and the maintenance mode control logic 2700 generate signals which are applied to the code number generator 800. During a summary mode printout, the code number generator 800 generates a code that is translated by a teleprinter output logic 1500 into the letter S. This is printed out during summary mode beside the location number of each variable that is in an acknowledged alarm state. During maintenance mode operation, the code number generator 800 generates a code number which is translated into the letter M. The presence of a maintenance mode signal overrides the presence of a summary mode signal, as explained above, so all printouts during the maintenance mode of operation are accompanied by the letter M.

One additional checking facility is provided in the system 100. The monitor switch associated with the 000th annunciator circuit is a manually operable pushbutton called the "system check" pushbutton. By depressing and releasing this pushbutton, it is possible to create a return to normal event and an alarm event. If the system 100 is working properly, a printed "return to normal" event record is formed each time this pushbutton is depressed, and a printed "alarm" event record is formed each time this pushbutton is released. The system check pushbutton normally remains in the alarm state so that the variable "000" is included in each alarm summary printout. If no other variables are in an alarm state, the variable "000" will still be listed as proof that the summary search was carried out.

SUMMARY MODE CONTROL LOGIC

The summary mode control logic is illustrated in FIGS. 26A–26D. Only four flip-flops and 10 gates are needed to control summary mode operations.

FIG. 26A shows the circuitry that controls summary mode operation. A summary mode pushbutton and pulse forming logic 2602 generates a positive going pulse in response to the depression of a summary mode pushbutton. This pulse is inverted by a gate 2604 and applied as a negative pulse to the first input of a NAND gate 2606. This same negative pulse is also used to reset the comparator 2900. The second input to the NAND gate 2606 is normally positive, so a positive pulse appears at the output of the NAND gate 2606 and toggles a flip-flop 2608 into the Q state. This initiates the summary mode operation. The Q output of the flip-flop 2608 is the SUMMARY MODE signal, while the $\overline{Q}$ output of the flip-flop 2608 is inverted SUMMARY MODE signal. Summary mode operations continue until an inverted SUMMARY RESET pulse is applied to the clear terminal of the flip-flop 2608.

A summary read procedure begins with the first $P_R$ pulse to come after summary mode operations have begun. This $P_R$ pulse is combined with the SUMMARY MODE signal by a NAND gate 2610, as shown in FIG. 26B, to generate a negative going pulse which is applied to the first input of a NAND gate 2612. The second input of the NAND gate 2612 is normally positive, so a positive pulse appears at the output of the gate 2612 and is applied to the clock terminal of a flip-flop 2614. This positive pulse toggles the flip-flop 2614 into the Q state. The negative going pulse generated by the NAND gate 2610 is also inverted by a NOT gate 2616 and applied to the clock terminal of a flip-flop 2618. The flip-flop 2618 toggles into the Q state. The ground level signal from the $\overline{Q}$ terminal of this flip-flop disables the NAND gate 2610 and prevents any more $P_R$ pulses from toggling the flip-flop 2614 until the summary mode operation is finished, when the SUMMARY MODE signal terminates and clears the flip-flop 2618.

The Q output of the flip-flop 2614 is the SUMMARY READ signal. The SUMMARY READ signal initiates the summary scanning process. When the summary scanning process is to be stopped, an inverted STOP SUMMARY READ pulse is applied to the clear terminal of the flip-flop 2614. An inverted RESTART SUMMARY READ pulse is applied to the second input of the NAND gate 2612 to restart the summary scanning process.

FIG. 26C shows the circuitry that stops the summary scanning process whenever the scanner locates an annunciator point that is in the acknowledged alarm state. As was explained in the section describing the event logic 500, when the system 100 is in the summary mode, not only do events of the usual type result in a generation of a SCAN INHIBIT signal, but a SCAN INHIBIT signal is also generated whenever an annunciator circuit is found which is in the acknowledged alarm state. The SCAN INHIBIT signal is combined with the SUMMARY READ signal by a NAND gate 2620 to produce an inverted signal that is fed into an AND gate 2622. A second input to the AND gate 2622 receives an inverted SUMMARY RESET signal, which is normally positive. Thus, when a scan inhibit occurs, the output of the NAND gate 2622 goes to ground and generates an inverted STOP SUMMARY READ signal. This signal is inverted by a NOT gate 2624 and becomes the LOAD COMPARATOR BUFFER signal, which is used to load the comparator buffer with the current value of the scan. As noted above, the reason for storing this number within the comparator 2900 is so that normal scanning for unacknowledged alarm and return to normal events can continue while summary information is being printed out, and so that the summary scanning process can recommence after the printout is completed at the same point where it left off.

FIG. 26D shows the circuitry used to generate the inverted RESTART SUMMARY READ pulse. At the heart of this circuit is a NAND gate flip-flop 2634–2636. This flip-flop is set by the inverted STOP SUMMARY READ signal. So long as the flip-flop 2634–2636 remains set, it disables an AND gate 2638 which in turn disables a NAND gate 2640 and prevents an inverted RESTART SUMMARY READ signal from being generated.

The flip-flop 2634–2636 is cleared by the inverted FIND NEXT SUMMARY signal generated by the code number translator 2300. The inverted FIND NEXT SUMMARY signal is reinverted by a NOT gate 2632 and is applied to the third input of a NAND gate 2630. The remaining inputs of the NAND gate 2630 are connected to the B11 timing signal and to the TTY SYNC signal. Thus, when the FIND NEXT SUMMARY signal is generated, the flip-flop 2634–2636 is reset by the TTY SYNC pulse that occurs during the 11th bit of the character currently being generated by the teleprinter output logic 1600. The flip-flop 2634–2636 then enables the AND gate 2638. When a positive MEMORY EMPTY signal is received from the expandable memory 1400, this signal passes through the AND gate 2638, and is fed to the first input of a NAND gate 2640. When the scan advances to the count that is stored within the comparator 2900, the comparator generates a SUCCESSFUL COMPARISON signal which is applied to the third input of the NAND gate 2640, enabling the gate. The next T3 pulse applied to the second input of the NAND gate 2640 passes through the gate and becomes an inverted RESTART SUMMARY READ pulse. Note that this RESTART SUMMARY READ pulse is generated when the scanner contains a count equal to the number stored in the comparator. The pulse occurs simultaneously with a T3 pulse, and the T4 pulse which follows increments the scanner counter by one. Therefore, the summary mode scanning process then recommences with a scanner count one greater than the count where the summary scanning process stopped before the printout.

That completes the description of the special circuitry used during a summary mode operation. The maintenance and summary reset logic 2800 which terminates summary mode operations will be explained below.

MAINTENANCE MODE CONTROL LOGIC

FIG. 27 shows the logic circuitry used to control the system 100 when it is in the maintenance mode of operation. To initiate a maintenance mode annunciator check, the operator depresses a maintenance mode pushbutton which is included within th᾽ maintenance mode pushbutton and pulse forming logic 2702. This logic includes circuitry for generating a pulse in response to the depression of a pushbutton and for synchronizing this the pulse with the reset of the system 100 timing. The pulse generated by the logic 2702 is applied to the clock terminal of a flip-flop 2704 and toggles the flip-flop 2704 into the Q state. The Q output of this flip-flop is called the MAINTENANCE MODE signal. This signal remains positive throughout the maintenance mode operation. The $\overline{Q}$ output of this flip-flop is called the inverted MAINTENANCE MODE signal. A pulse generated by the logic 2702 is also inverted by a NOT gate 2706, and is called an inverted RESET COMPARATOR pulse. This pulse is used to reset the comparator 2700.

FIG. 27B shows the circuitry used to time and coordinate the various parts of the maintenance mode operation. Briefly this circuitry includes a counter 2714 that advances one count with each 999 pulse, and that determines what operation takes place during each of the four successive maintenance mode scanning cycles. The counter 2714 is similar to the character and bit counter described above and shown in FIG. 17A. The counter includes five output leads all of which save one are normally positive. Initially the $\overline{O}$ lead is at ground potential and all the remaining leads are positive. As the count progresses, the other leads go sequentially to ground — first the $\overline{1}$ lead, then the $\overline{2}$ lead, and so on. After the $\overline{4}$ lead goes to ground, the counter resets itself and the $\overline{0}$ lead goes to ground once again.

The first four output leads from the counter 2714 are fed to the input of a NAND gate 2718. The output of the NAND gate 2718 is combined with the MAINTENANCE MODE signal by a second NAND gate 2720 to form an inverted A/N EVENT SUPPRESS signal. This signal is normally positive when the system 100 is not in the maintenance mode. When the system 100 is in the maintenance mode, and when one of the first four outputs of the counter 2714 is a ground potential, the inverted A/N EVENT SUPPRESS signal goes to ground and suppresses the printout of information relating to any alarm or return to normal event. The inverted A/N EVENT SUPPRESS signal is fed to the event logic and event flip-flop 500 shown in FIG. 5 where it prevents the T3 timing pulses from passing through the AND gate 505 and enabling the two NAND gates 502 and 504. Thus, whenever the inverted A/N EVENT SUPPRESS signal is present, there can be no printout of information relating to alarms or returns to normal.

When a pulse is first generated by the logic 2702 to initiate a maintenance operation, it is inverted by the NOT gate 2706 and applied to the clock terminal of a flip-flop 2710 through a NAND gate 2708. The remaining input to the gate 2708 is normally positive. The flip-flop 2710 toggles into the Q state and enables a gate 2712 to pass a T3 timing pulse to the counter 2714 during the 999 pulse generated at the end of the current scanning cycle.

In response to this T3 pulse the $\overline{1}$ terminal of the counter 2714 goes to ground. The signal generated by this terminal is called an inverted INHIBIT $P_R$ signal. It is used to suppress the occurrence of the $P_R$ pulse at the start of the next scanning cycle. The inverted INHIBIT $P_R$ signal is fed back to the scanner 300 to the gate 303. This same signal is inverted by a NOT gate 2724 and is applied to the first input of an AND gate 2726. The second input of the gate 2726 is connected to the 999 pulse source, and a third input to the gate 2726 is connected to the T4 pulse source. The AND gate 2726 generates an ANNUNCIATOR TEST signal which places all the flip-flops within the various annunciator circuits in the unacknowledged alarm state, as though alarm conditions arose simultaneously in every monitored variable. Since the inverted INHIBIT $P_R$ signal begins with the trailing edge of a T3 pulse, the immediately following T4 pulse goes through the NAND gate 2726 and becomes the ANNUNCIATOR TEST signal. The system 100 then runs through a normal scanning cycle, acknowledging each annunciator circuit. There are no printouts, however, since the inverted A/N EVENT SUPPRESS signal generated by a NAND gate 2720 is present.

With the next 999 pulse, another T3 pulse passes through AND gate 2712 and advances the decimal counter 2714. The $\overline{1}$ lead now returns to a positive potential and the $\overline{2}$ lead goes to ground potential. The $\overline{2}$ signal is also called the inverted INHIBIT $P_I$ signal, and is used to inhibit the generation of the $P_I$ pulses and prevent these pulses from interrogating the annunciator circuits, thereby preventing any acknowledgement of returns to normal which were initiated by the $P_R$ pulse at the start of this scanning cycle. With the next 999 pulse, another T3 pulse is applied to the counter 2714. The $\overline{2}$ output returns to a positive level and the $\overline{3}$ output goes to ground. During this third scanning cycle, all of the return to normals which may have occurred are acknowledged. Again, printout is suppressed by the inverted A/N EVENT SUPPRESS signal.

The next 999 pulse allows a T3 pulse to advance the counter 2714 so that the $\overline{4}$ signal goes to ground, and another scanning cycle is run. During this scanning cycle, the printout of events is not suppressed, so a listing of all annunciator circuits which are in an unacknowledged state is printed out. All such annunciators are defective, since all the circuits should have been acknowledged during the $\overline{3}$ maintenance scanning cycle. The next 999 pulse allows a T3 pulse to reset the counter 2714, regenerating the $\overline{0}$ ground level signal.

During the $\overline{4}$ maintenance scanning cycle, the $\overline{4}$ output signal is inverted by a NOT gate 2728 and is used to enable a NAND gate 2722, so that the next T3 pulse to reach the counter 2714 can pass through the gate 2722 and become an inverted MAINTENANCE SUMMARY pulse. This pulse passes through the NAND gate 2708 and resets the flip-flop 2710, and is also fed to the summary mode control logic 2600 where it initiates a normal summary mode scan. During the summary scan, a complete list of all flip-flops still in the acknowledged alarm state is printed out. This list can be compared with a normal summary printout list. Any discrepencies between the two lists then indicates a malfunctioning annunciator circuit. As mentioned above, an M is printed out along with all printouts which occur during a maintenance mode operation.

Alternatively the system 100 could have been designed to place the system annunciator circuits into the alarm state and then to print a list of all annunciator circuits which did not go into the alarm state. This could be done by simply adding another gate similar to the gate 506 to the event logic 500 which would initiate a printout of all circuits not in the alarm state. Other similar minor modifications of the maintenance routine and logic can also be made to suit particular applications.

MAINTENANCE AND SUMMARY RESET LOGIC

FIG. 28 shows the circuitry used to reset the system 100 at the completion of the maintenance or summary modes of operation. An AND gate 2802 combines the inverted ALARM and the inverted RETURN TO NORMAL signals and forms a SUMMARY INTERRUPT signal which is passed through an AND gate 2804 and becomes an inverted SUMMARY RESET signal for resetting the summary mode flip-flop 2608 (FIG. 26A). A second input to the AND gate 2804 is fed by the NAND gate 2806. The NAND gate 2806 detects the end of a summary scan. Its inputs are the 999 pulse, the SUMMARY READ signal, the SUMMARY MODE signal, a T4 pulse, and an inverted SCAN INHIBIT signal. It generates a pulse during the T4 part of the 999th annunciator circuit scan, during a summary scan when no SCAN INHIBIT signal is present. The signal generated by the NAND gate 2806 is also inverted by a NOT gate 2808 and is called the COUNTER RESET signal. This signal is fed to the maintenance mode control logic counter 2714 reset terminal, and is also inverted by a NOT gate 2716 and fed to the clear terminal of the flip-flop 2710. This signal insures that the counter 2714 and the flip-flop 2710 are both cleared at the end of the maintenance scans. This COUNTER RESET signal is also combined with the SUMMARY MODE signal by a NAND gate 2810 and is used to generate a MAINTENANCE MODE RESET signal that clears the maintenance mode flip-flop 2704 (FIG. 27A) at the end of a maintenance procedure.

COMPARATOR

The comparator 2900 is shown in FIGS. 29A and 29B. The comparator includes a buffer memory into which the numerical contents of the scanner 300 can be gated, and comparison logic for comparing the contents of the buffer memory with the contents of the scanner 300.

The buffer memory comprises twelve flip-flops 2902–2924, and twelve NOT gates 2942–2964. The BCD output from the scanner 300 is fed into the J inputs of the flip-flops, and the NOT gates connect the J inputs of the flip-flops to the K inputs of the flip-flops. When a LOAD COMPARATOR BUFFER pulse is applied to the clock terminals of the twelve flip-flops, the number presented by the BCD output from the scanner is shifted into the buffer memory and is stored within the flip-flops.

The comparison logic includes six 4-input AND - NOR gates 2982–2992, and an output AND gate 2994. The output of the gate 2994 is normally negative, and goes positive only when the number within the buffer memory is identical to the number presented by the scanner BCD output. If any bit does not match up, one of the AND gate inputs to an AND - NOR gate transmits a positive signal to the NOR gate output, and causes the output of the AND - NOR gate to go to ground. This ground level output is fed into the AND gate 2994, causing the output of the gate 2994 to remain negative. Thus, the output of the gate 2994 goes positive only when every bit in the buffer memory matches every bit presented by the scanner 300. The output of the gate 2994 is called the SUCCESSFUL COMPARISON signal.

The comparator buffer memory can be cleared by either of two inverted RESET COMPARATOR signals. These signals are fed through an AND gate 2998 to the clear (C) terminals of the flip-flops 2902–2924. When either inverted RESET COMPARATOR signal goes to ground, the buffer memory is cleared.

The SUMMARY MODE signal (FIG. 29B) is fed into the gate 2994 (FIG. 29A) to suppress the SUCCESSFUL COMPARISON signal when the system 100 is not in summary mode.

EVENT LIGHT

FIG. 30 shows a logic diagram of the event light circuitry. The inverted OUTPUT ENABLE signal is applied to one side of a NAND gate flip-flop 3002–3004. When this signal goes negative it sets the flip-flop 3002–3004 and generates a positive voltage at the output of the gate 3002. This positive voltage causes a lamp driver circuit 3006 to illuminate an event lamp 3008. The lamp 3008 stays illuminated until a negative pulse is applied to the NAND gate 3004 by depression of an acknowledgement pushbutton 3010. To suppress transients, the acknowledgement pushbutton 3010 is bypassed by a 0.02 microfarad capacitor and a 1,000 ohm resistor, as shown in FIG. 30. The purpose of the event lamp is to attract the attention of a supervisory employee and to maintain a record of whether or not a new event has been brought to someone's attention. In addition to the lamp 3008, it is often desirable to use a horn or other audible alarm device to alert supervisory employees of possible trouble existing within the monitored system.

SYNCHRONIZING CIRCUIT

FIG. 31 shows circuitry that can be used to synchronize a number of systems such as the system 100, so that the clocks of the various systems run synchronously and so that the printed records from the various systems can be readily compared and used to determine the exact time sequence in which events occur at different locations. Each system to be synchronized is equipped with an output pulse amplifier 3102, an input reed relay pulse amplifier 3104, and a switch 3106 for determining whether this system clock is to be the master clock or a slave clock. FIG. 31 shows the switch 3106 thrown to make the system clock function as the master clock. The HOURS COUNTER ADVANCE pulse is fed to the pulse amplifier 3102 and is fed out to the remaining systems. The output of the reed relay pulse amplifier 3104 is not used. If the switch 3106 is thrown to the other position, the HOURS COUNTER ADVANCE pulse is not used, and when some other unit applies an HOURS COUNTER ADVANCE pulse to the common line, the pulse is amplified by the reed relay pulse amplifier 3104 and is fed into the system 100 as an inverted SYNC pulse. This inverted SYNC pulse is used to reset the minutes and seconds counters, thus synchronizing this system clock with the clock of the system designated the master system. Synchronization can be very helpful in places where a number of separate systems are used to monitor various aspects of a single industrial process or manufacture.

I claim:

1. A variable monitoring system comprising:

a plurality of annunciator circuits each associated with a monitored variable and able to generate signals indicating the state of the monitored variable and also indicating a change in the state of the monitored variable;

scanning means, including a scanner counter, connected to the condition responsive circuits for extracting signals from each of the condition responsive circuits sequentially as the scanner counter advances;

event logic means for analyzing the extracted signals and for initiating a data collection each time an condition responsive circuit is found to be generating signals indicating a change in the state of the monitored variable;

a clock;

an assembly shift register in which data can be collected having parallel inputs and a serial output, said parallel inputs including inputs from the scanner counter and from the clock;

assembly register control means activated by said event logic for controling the loading of data into said assembly shift register;

a shift register memory connected to the output of said assembly shift register; and output logic means for feeding data out of the shift register memory at a low speed and for recording the data permanently.

2. A variable monitoring system in accordance with claim 1 and including a code number generator connected to the event logic and to the inputs of the assembly shift register for adding a record of the variable state to the data assembled within the assembly shift register.

3. A variable monitoring system in accordance with claim 1 wherein the event logic generates a scan inhibit signal that stops the scan until after data has been assembled.

4. A variable monitoring system in accordance with claim 3 wherein the scan inhibit signal is generated by an event flip-flop, said event flip-flop being set by an event pulse generated by the event logic means, and said event flip-flop being cleared by the assembly register control means after data has been assembled.

5. A variable monitoring system in accordance with claim 1:
wherein the shift register memory generates a memory full signal which is fed back to the assembly register control means to stop the data assembly process when the shift register memory is full.

6. A variable monitoring system in accordance with claim 5 and including a memory full circuit that is enabled by the memory full signal to add a marker bit to data assembled within the assembly shift register at a later time.

7. A variable monitoring system in accordance with claim 6 and including means for terminating the operation of the memory full circuit after a complete scan during which no data is assembled.

8. A variable monitoring system in accordance with claim 1 in which the states of the monitored variables are represented by a plurality of variable monitoring switches, and which includes a plurality of interconnecting circuits connecting said condition responsive circuits to said variable monitoring switches, each of said interconnecting circuits including closely matched resistive and capacitive elements, and each of said interconnecting circuits establishing a uniform time delay at the input to each condition responsive circuit to equalize the response times of all the condition responsive circuits.

9. A variable monitoring system in accordance with claim 8 wherein one of the matched capacitive elements includes the input capacity of an active amplifying device.

10. A variable monitoring system in accordance with claim 9 wherein the active amplifying device is a transistor.

11. A variable monitoring system comprising:
a plurality of condition responsive circuit means for monitoring a plurality of variables;
scanning means for periodically and serially scanning the condition responsive means;
data collection and storage means for collecting and for storing data relating to the monitored variables;
output means for generating an output signal bearing data retrieved from said data collection and storage means;
summary mode logic means for causing said data collection and storage means to collect and store data whenever said scanning means scans an annunciator means associated with a variable that is in the alarm state; said data collection and storage means including means for temporarily disabling said summary mode logic means each time data is collected and stored; and said output means including means for generating a find next summary signal to re-enable said summary mode logic means when said output means ceases to generate an output signal.

12. A variable monitoring system in accordance with claim 11 and further including:
a buffer into which a variable number supplied by the scanning means is stored whenever the summary mode logic means is temporarily disabled;
comparator means for comparing the variable number stored in said buffer with the variable number presented by the scanning means, and for generating a successful comparison signal when the two numbers are the same; and
re-enable delay means for preventing the find next summary signal from re-enabling the summary mode logic means until the successful comparison signal is generated.

13. A variable monitoring system in accordance with claim 11 wherein the summary mode control means is automatically disabled whenever the scanning means encounters an condition responsive circuit means associated with a variable that has changed its state since the last previous scan.

* * * * *